June 17, 1930.  H. B. SMITH  1,764,358
MACHINE FOR MAKING PAPER BOX BLANKS AND BOXES
Filed Jan. 3, 1924  23 Sheets-Sheet 1
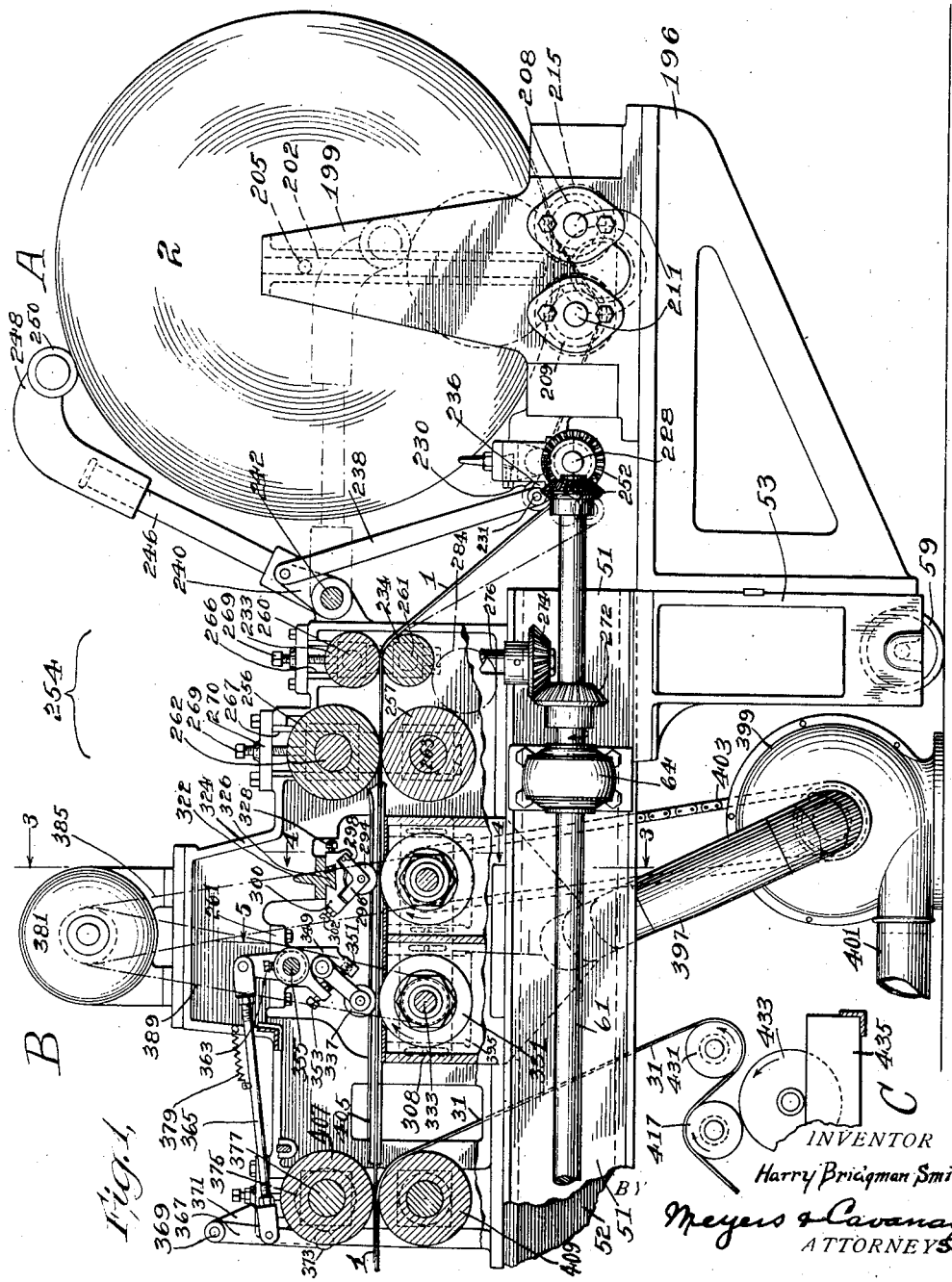

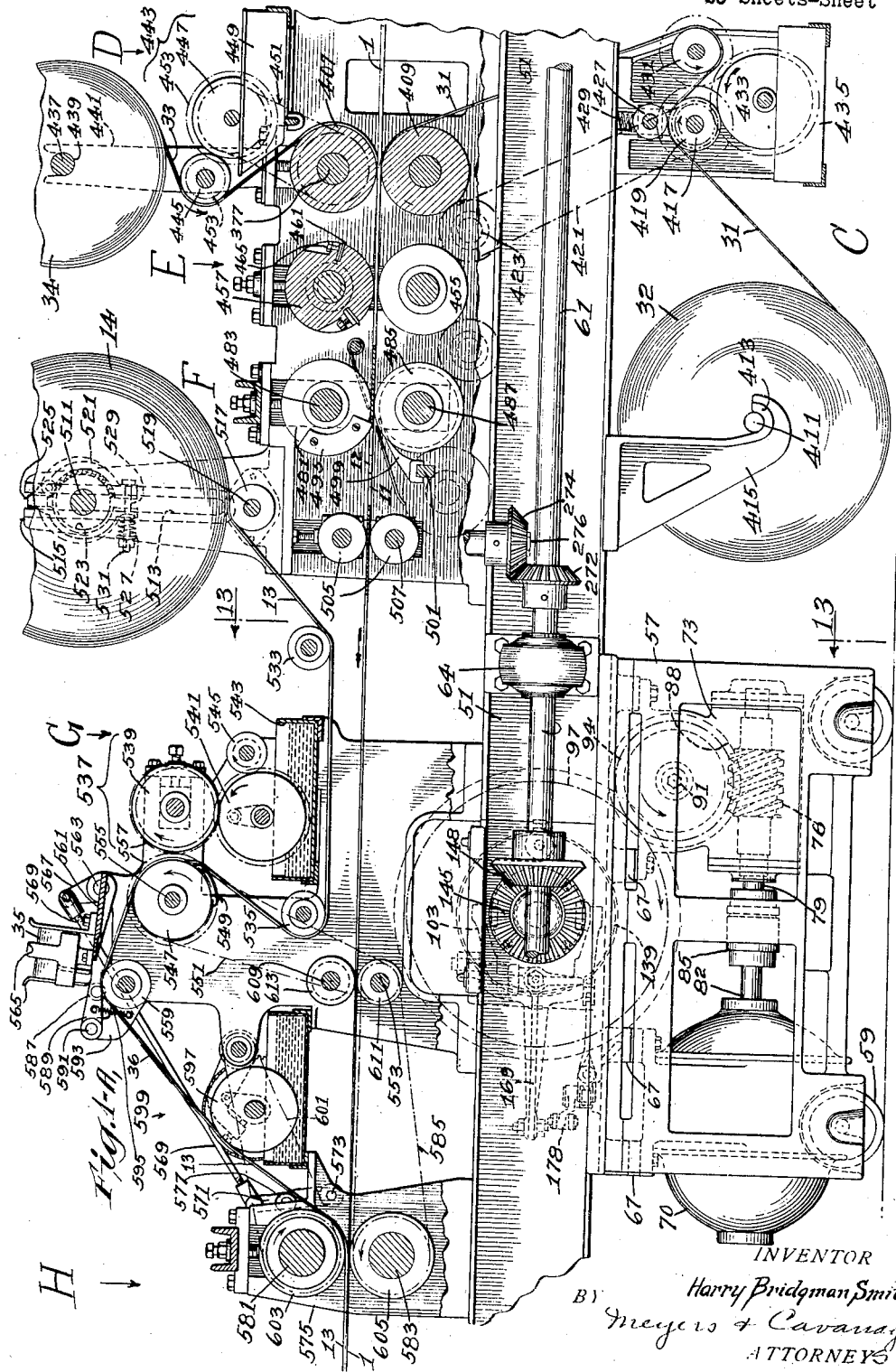

June 17, 1930.  H. B. SMITH  1,764,358
MACHINE FOR MAKING PAPER BOX BLANKS AND BOXES
Filed Jan. 3, 1924   23 Sheets-Sheet 3

INVENTOR
Harry Bridgman Smith
BY Meyers & Cavanagh
ATTORNEYS

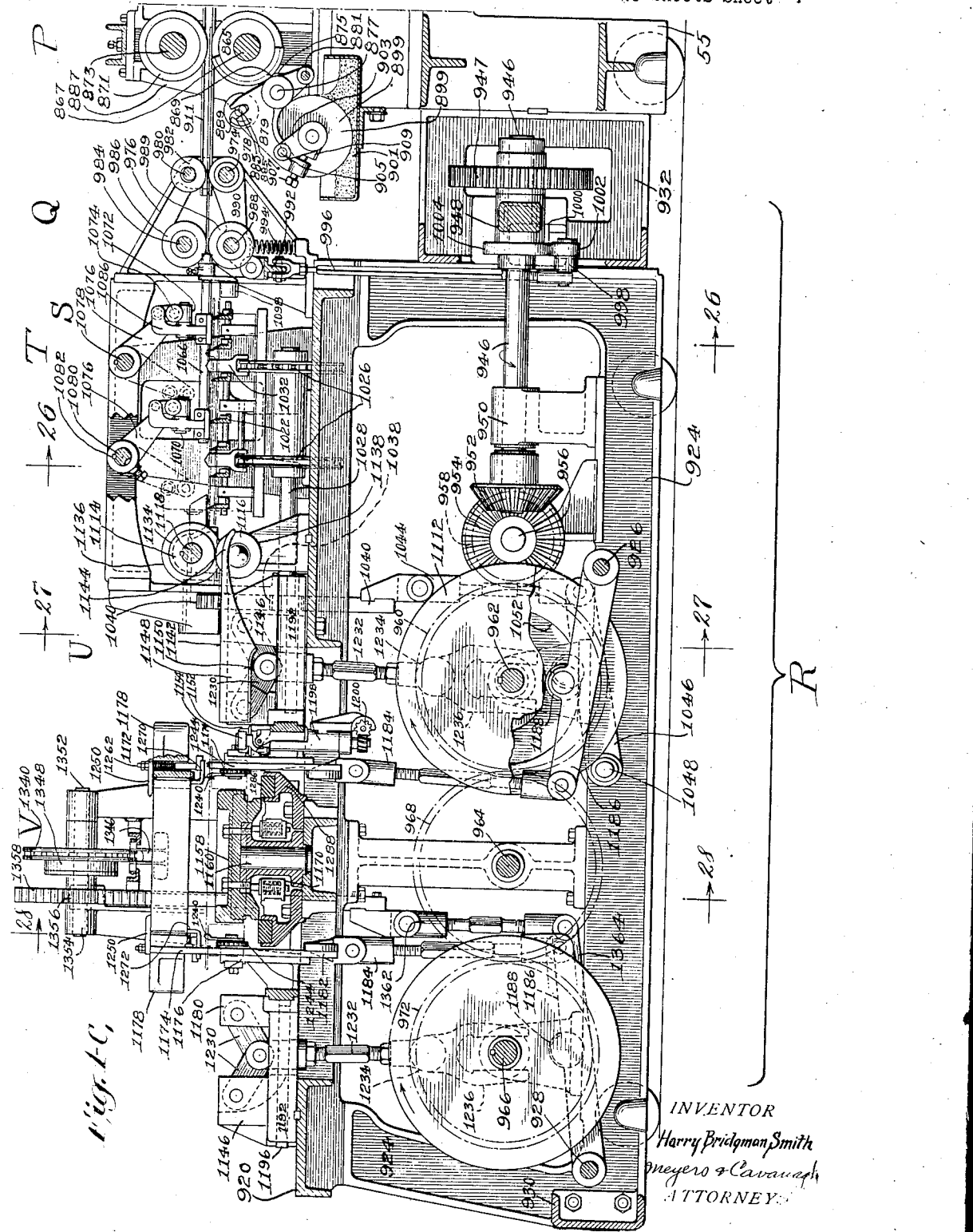

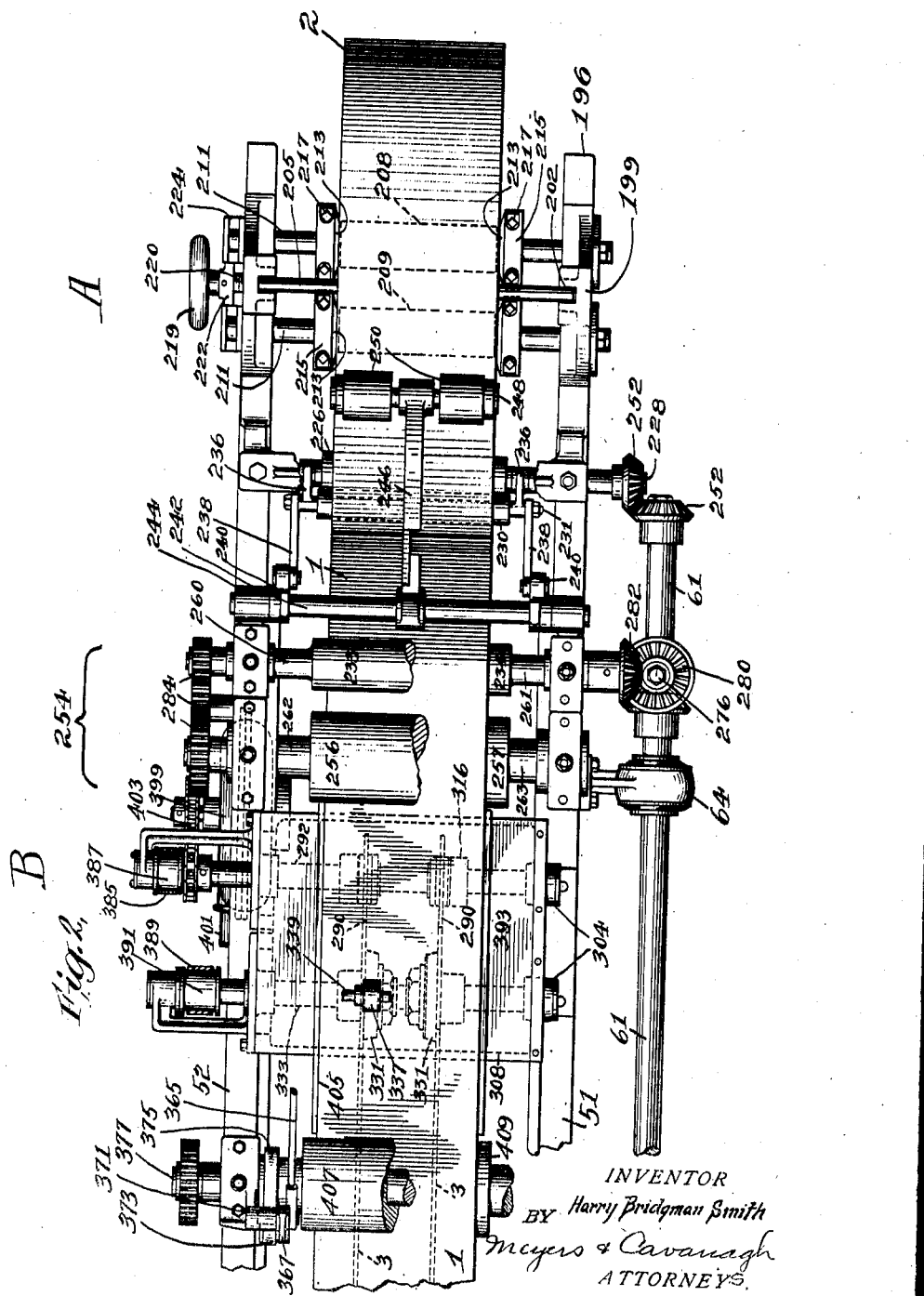

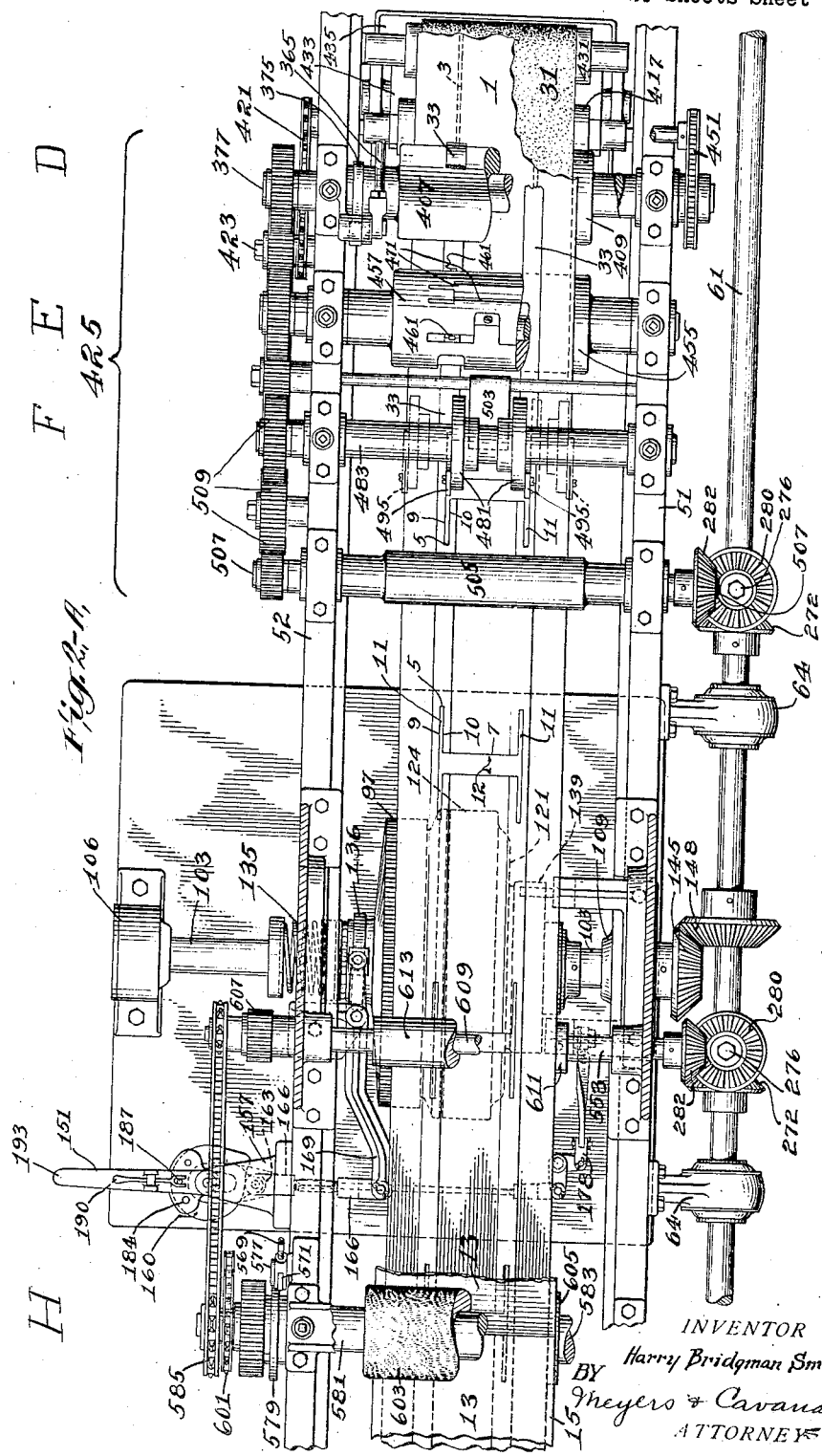

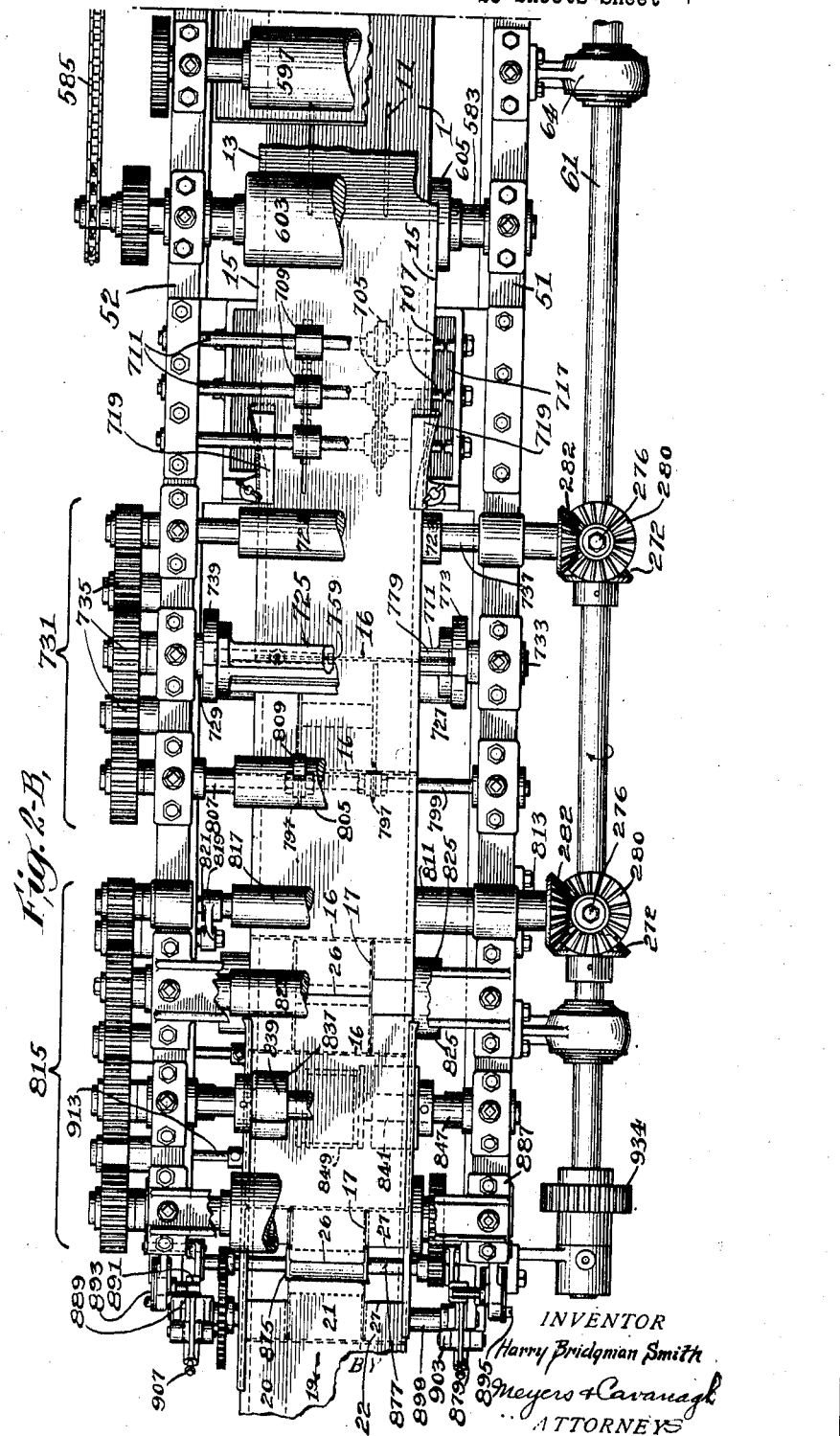

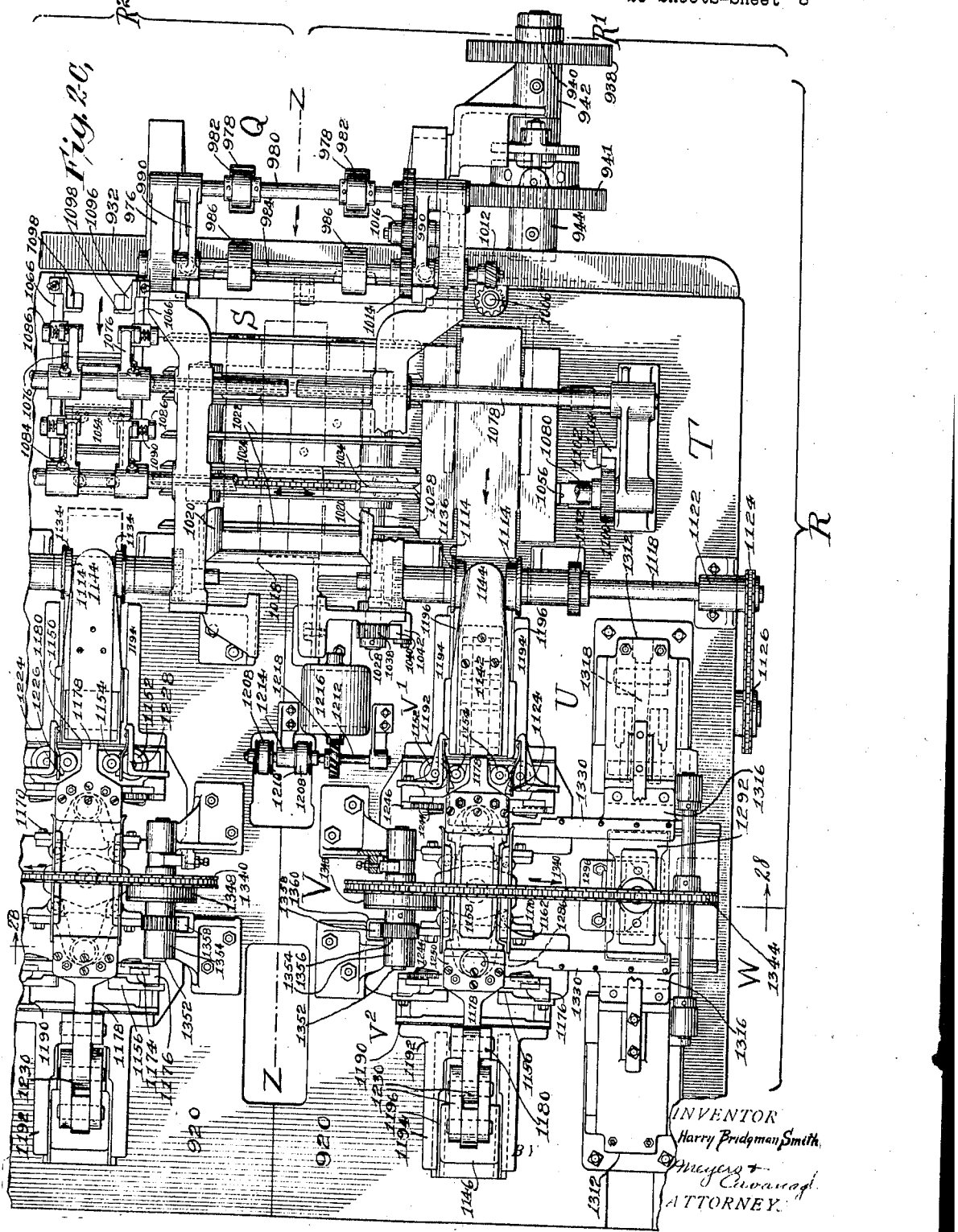

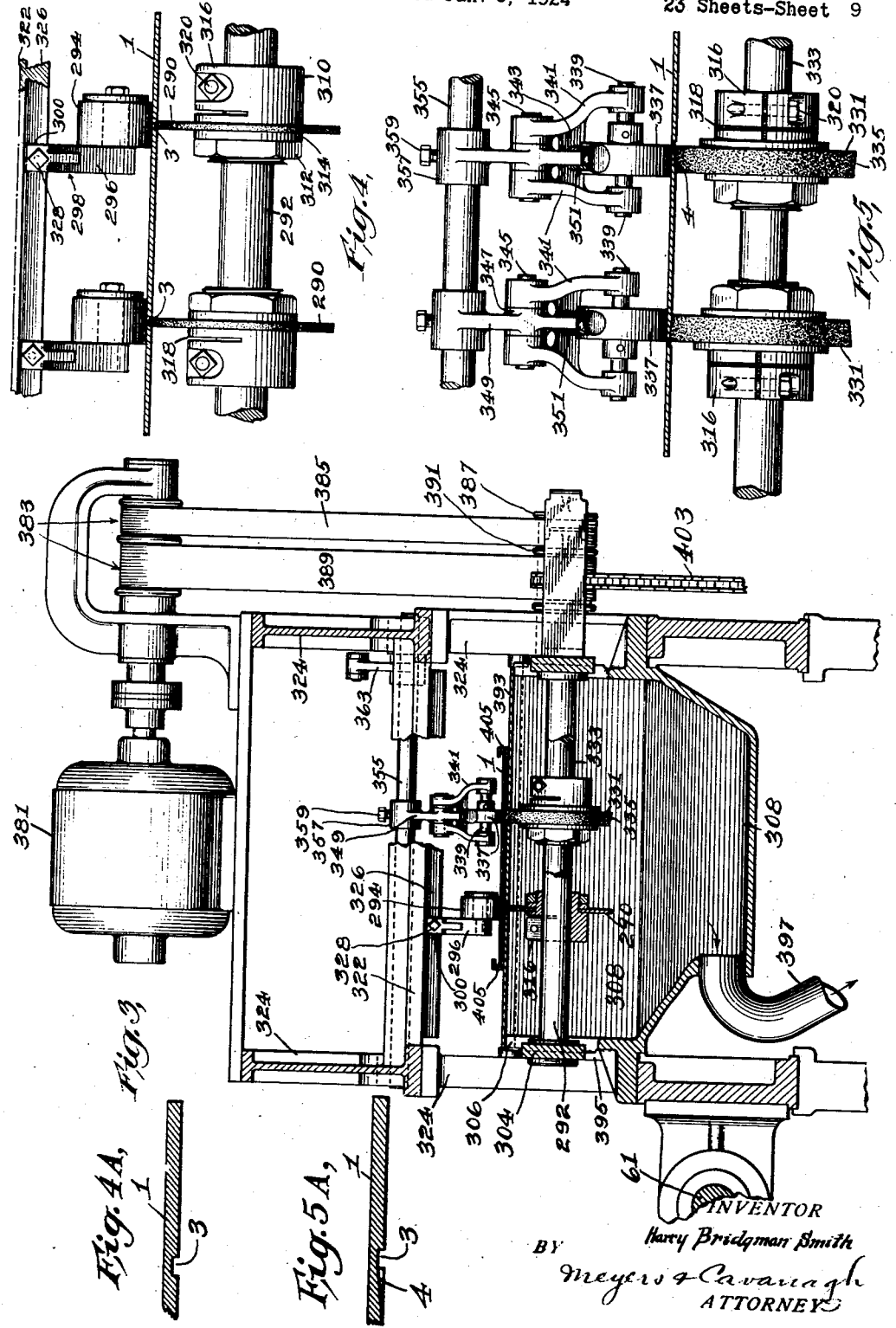

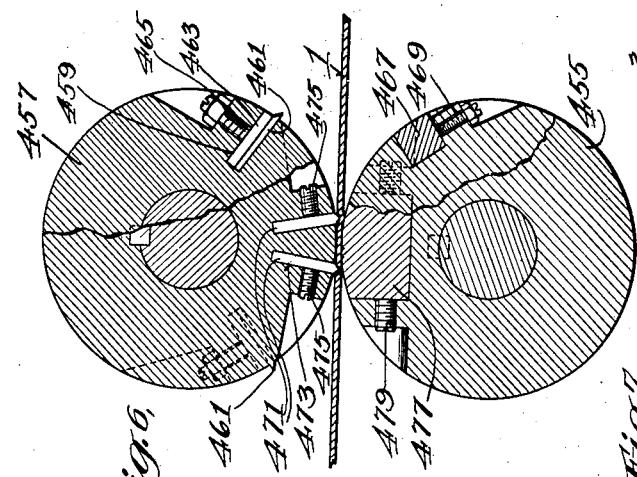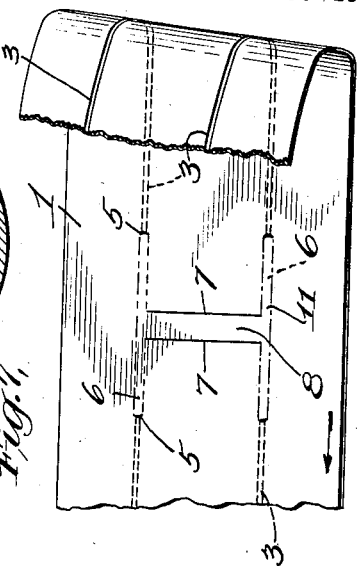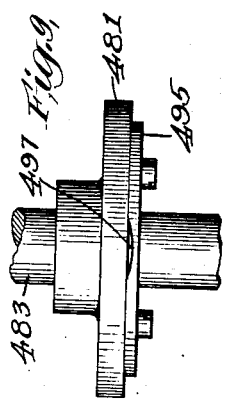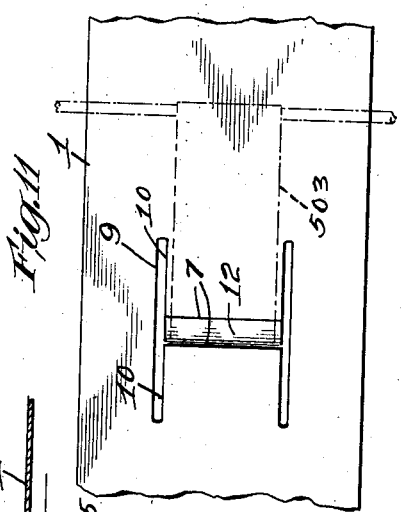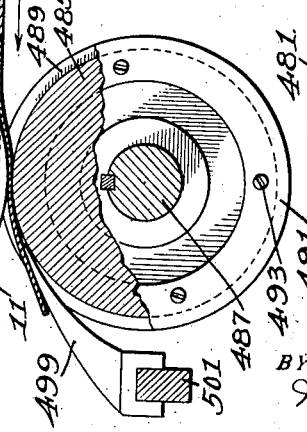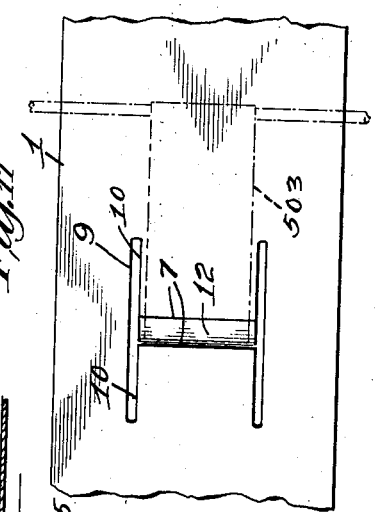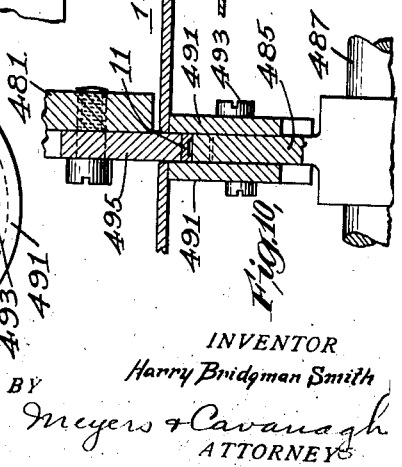

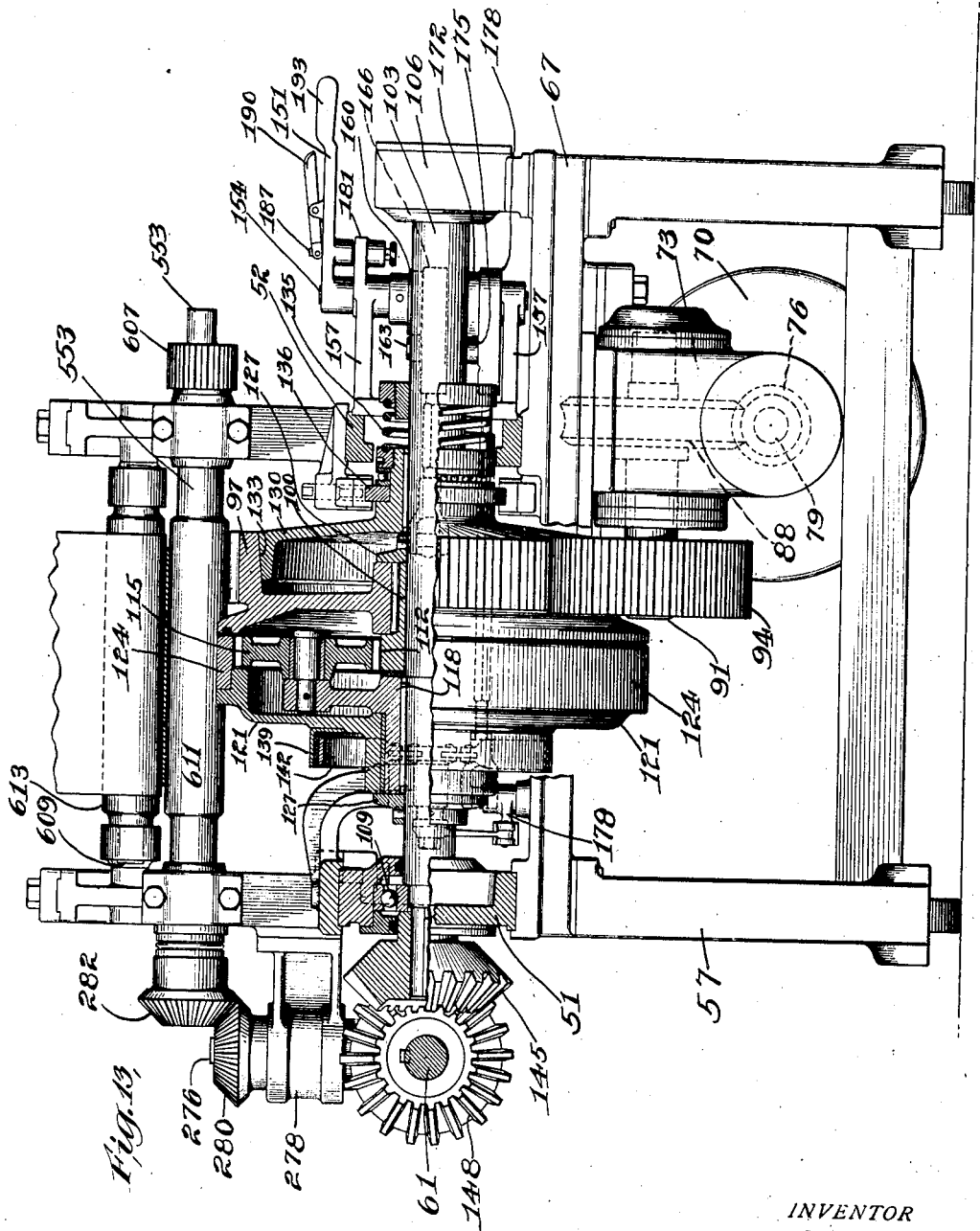

June 17, 1930.                H. B. SMITH                1,764,358
           MACHINE FOR MAKING PAPER BOX BLANKS AND BOXES
                      Filed Jan. 3, 1924         23 Sheets-Sheet 12
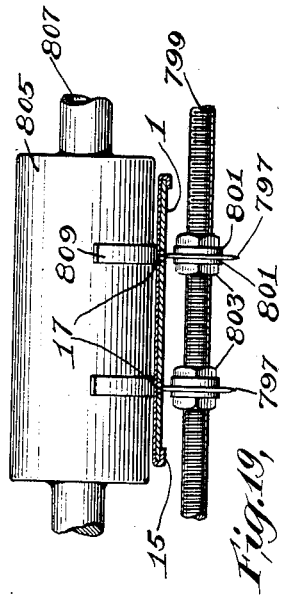
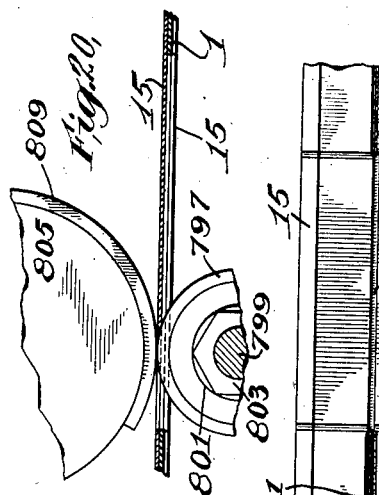
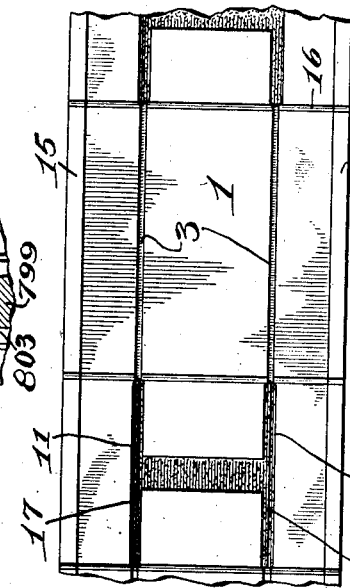
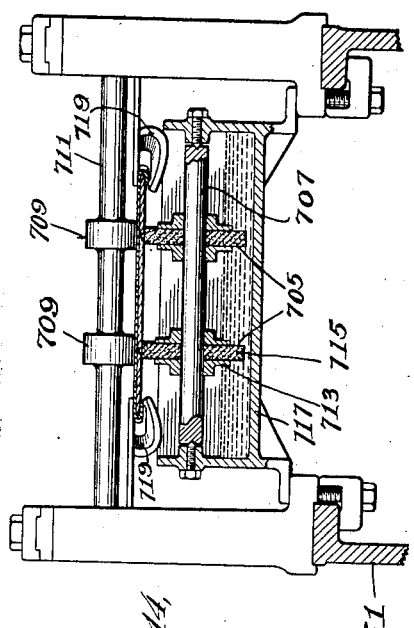
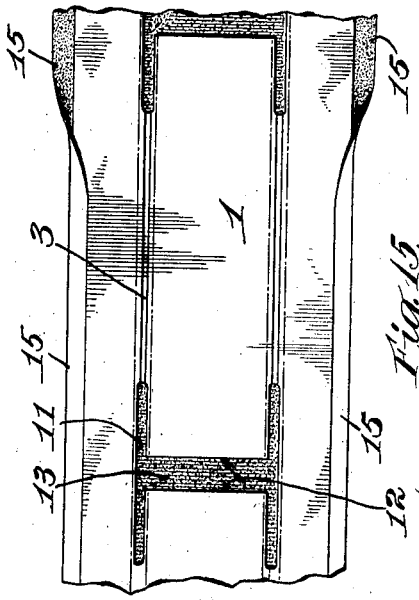
INVENTOR
Harry Bridgman Smith
BY
Meyers & Cavanagh
ATTORNEYS

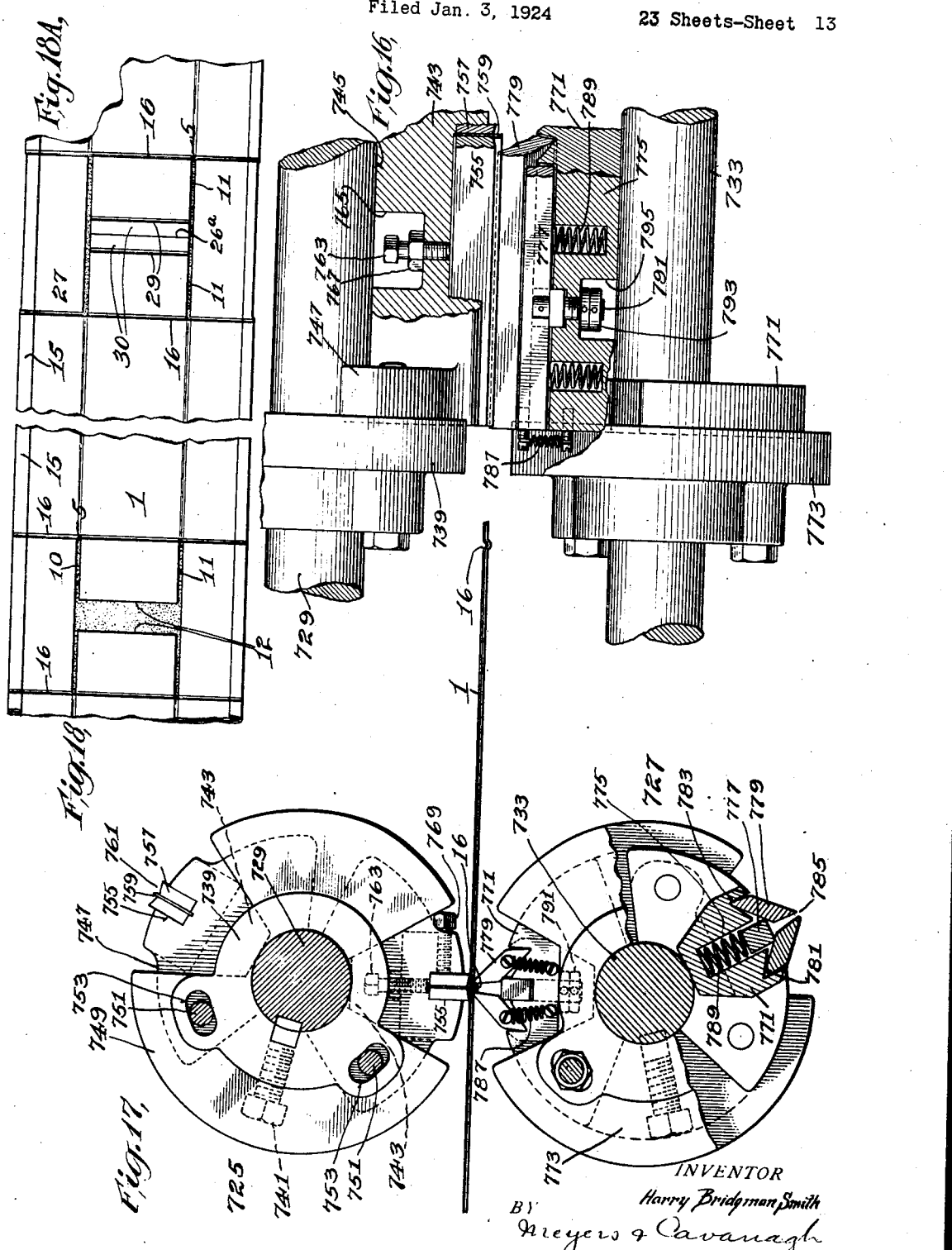

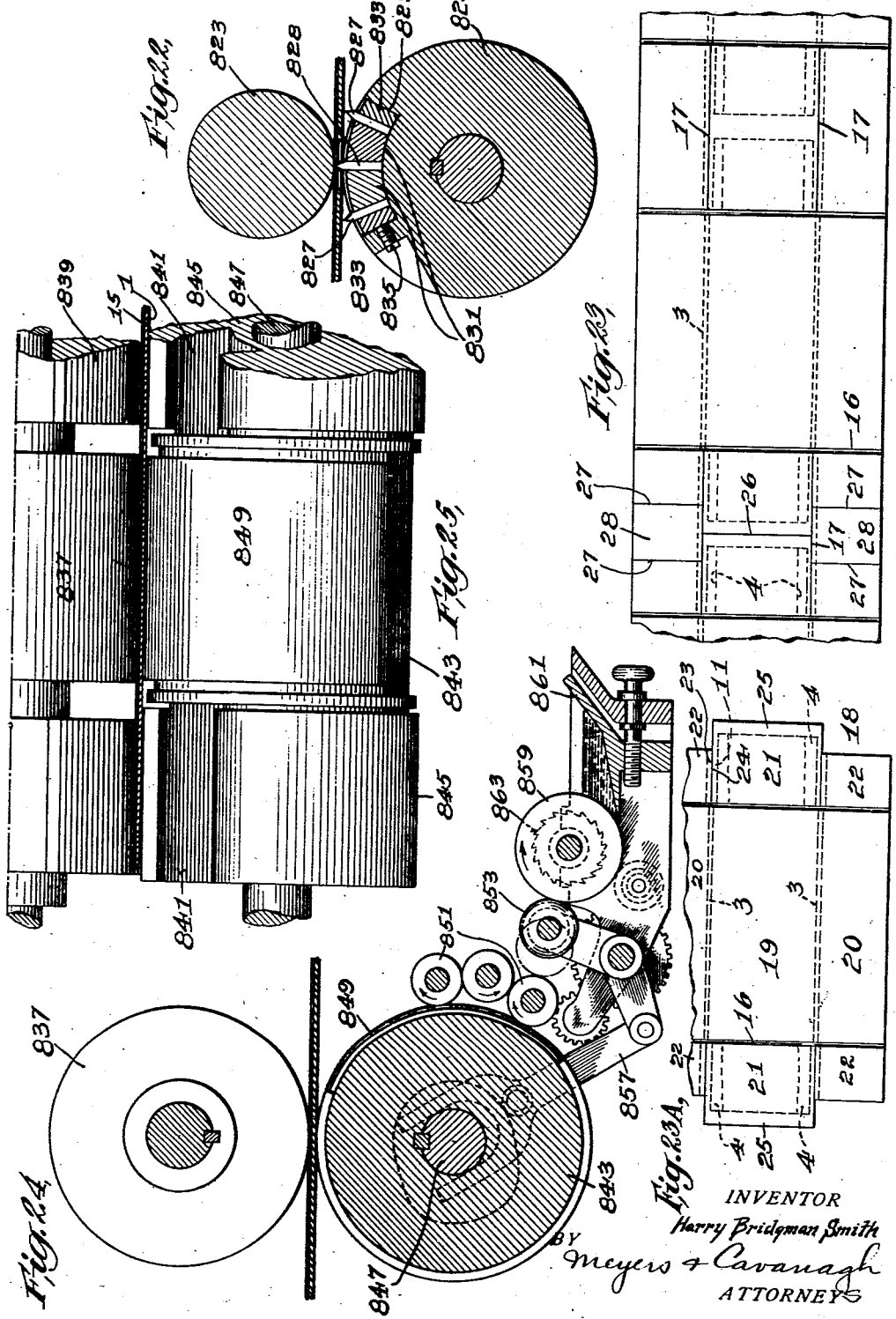

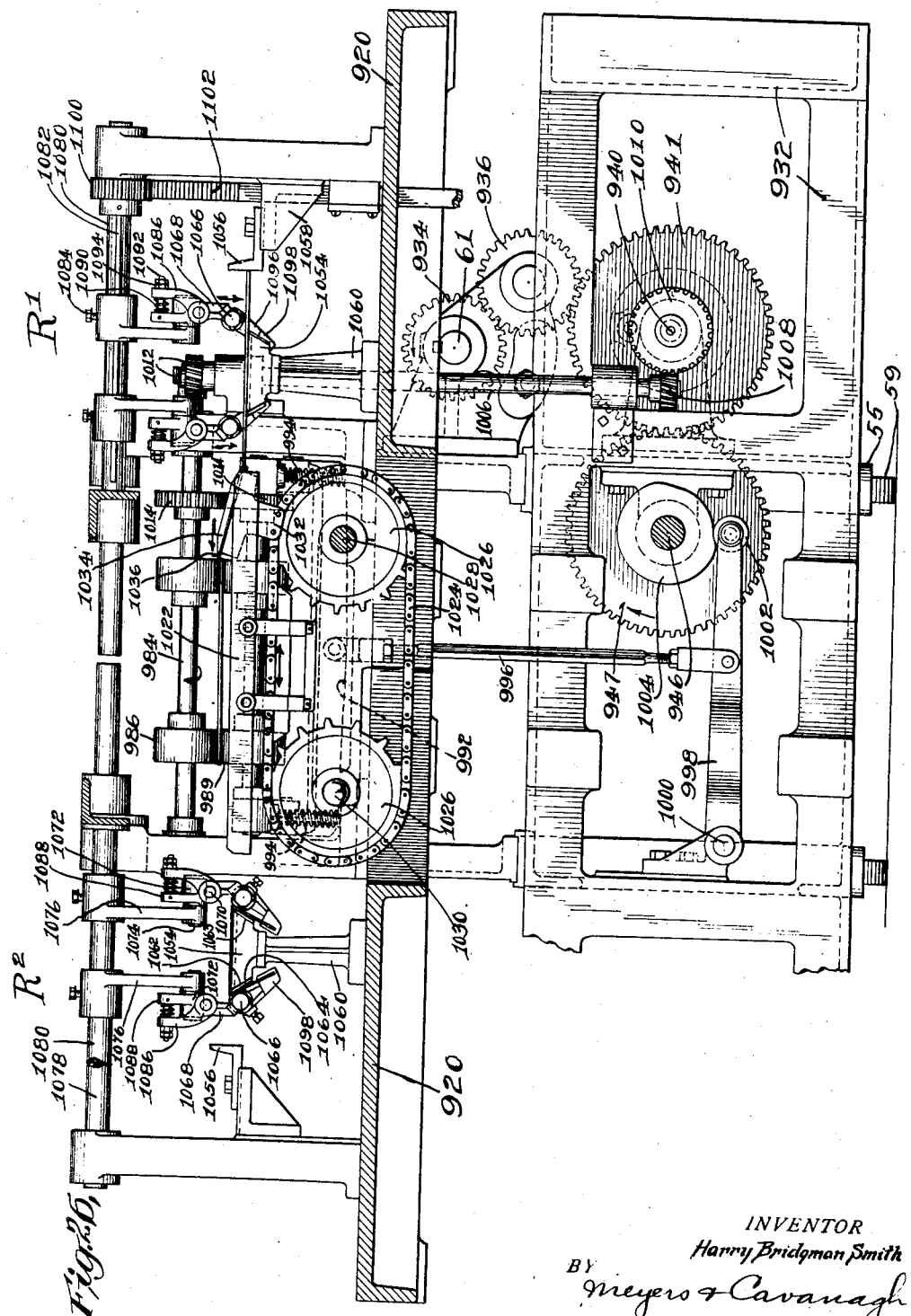

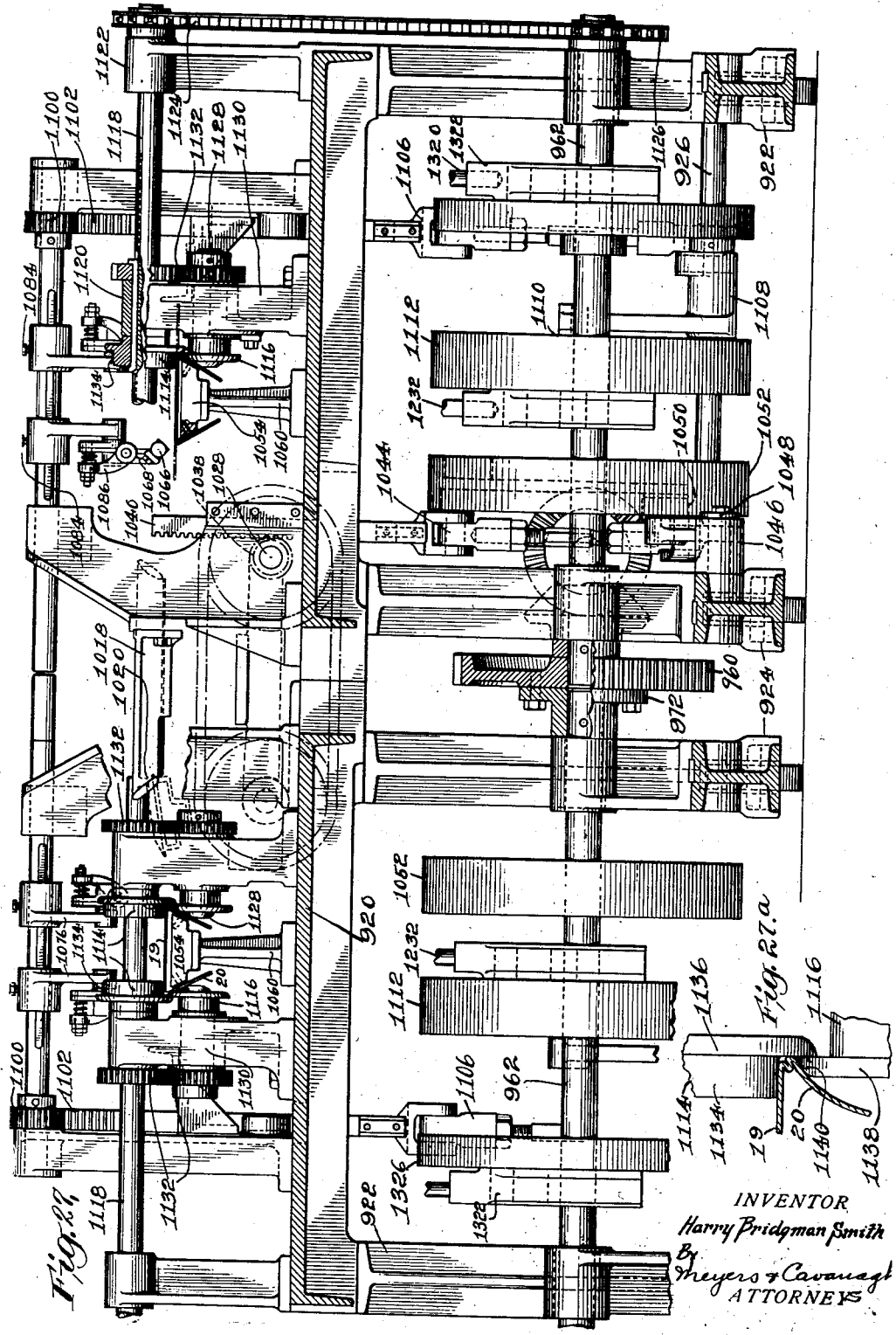

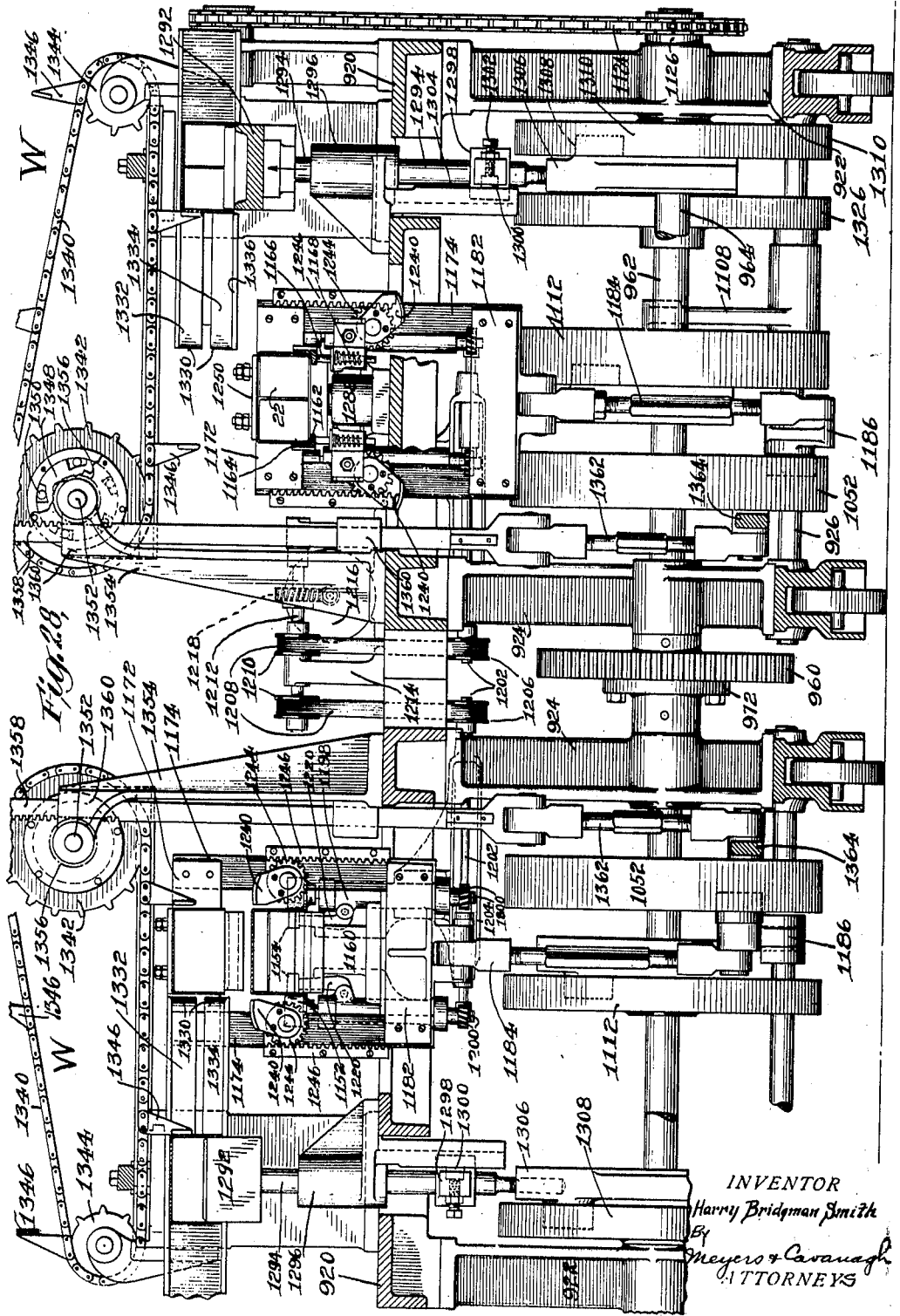

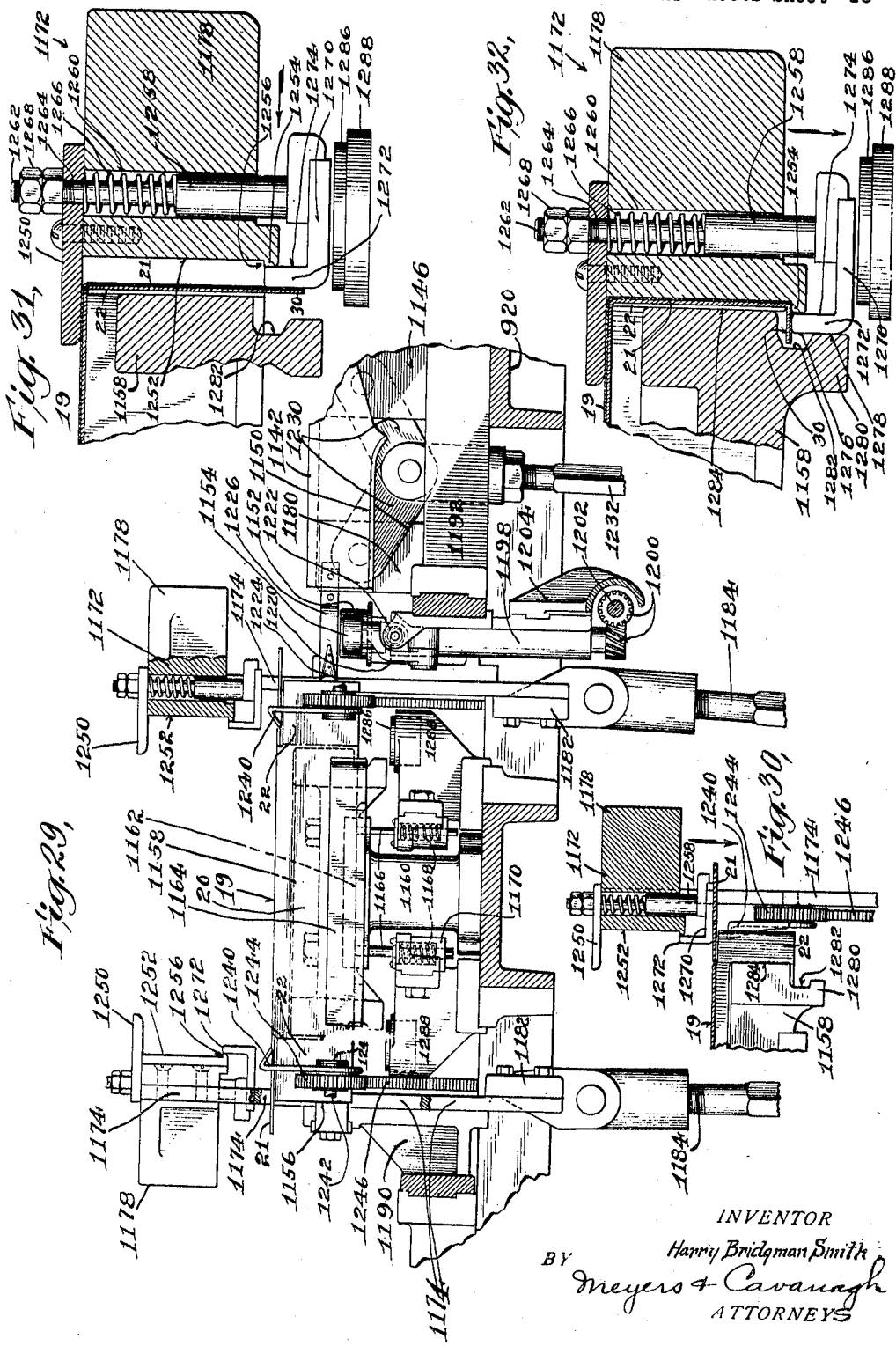

June 17, 1930.  H. B. SMITH  1,764,358
MACHINE FOR MAKING PAPER BOX BLANKS AND BOXES
Filed Jan. 3, 1924   23 Sheets-Sheet 19
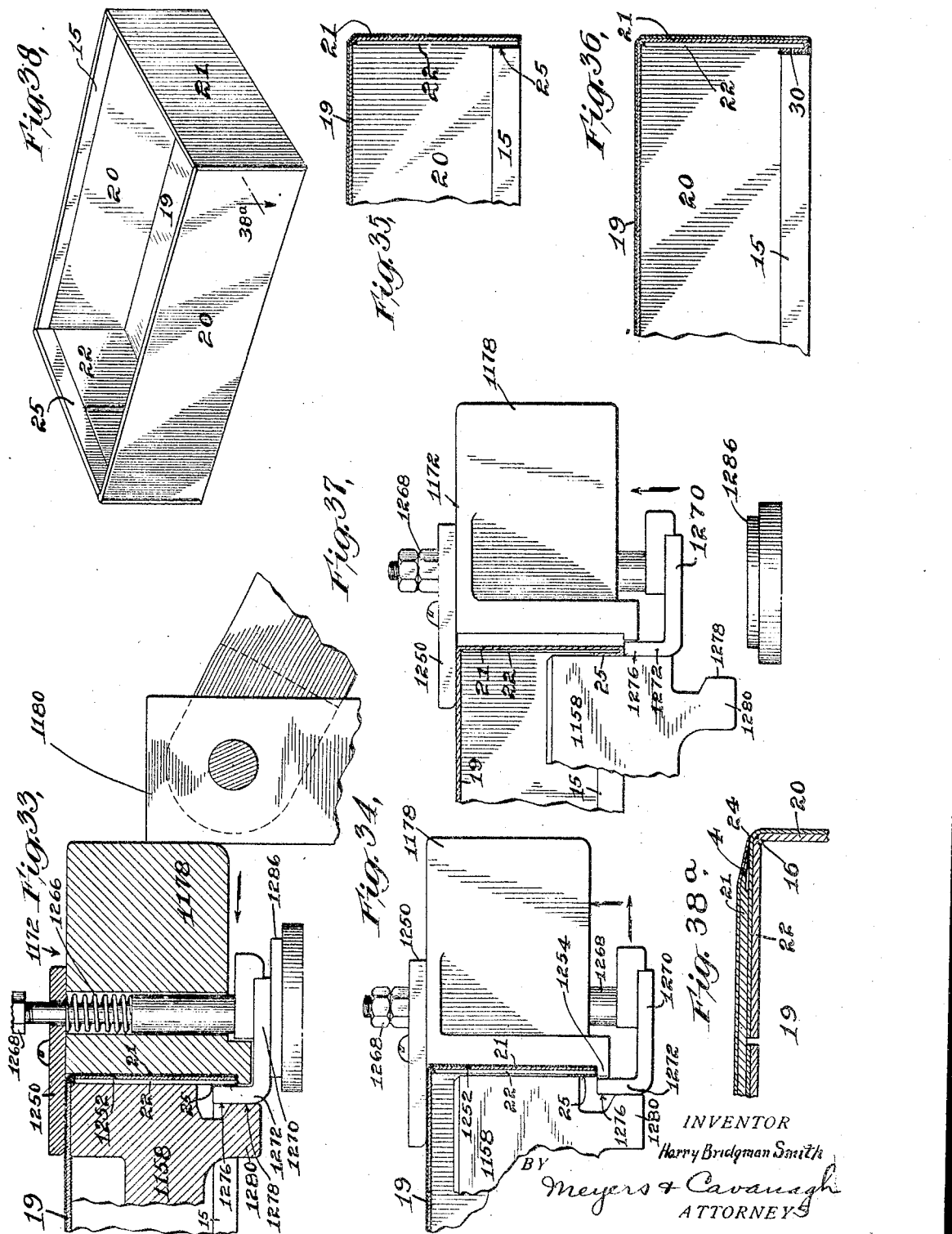

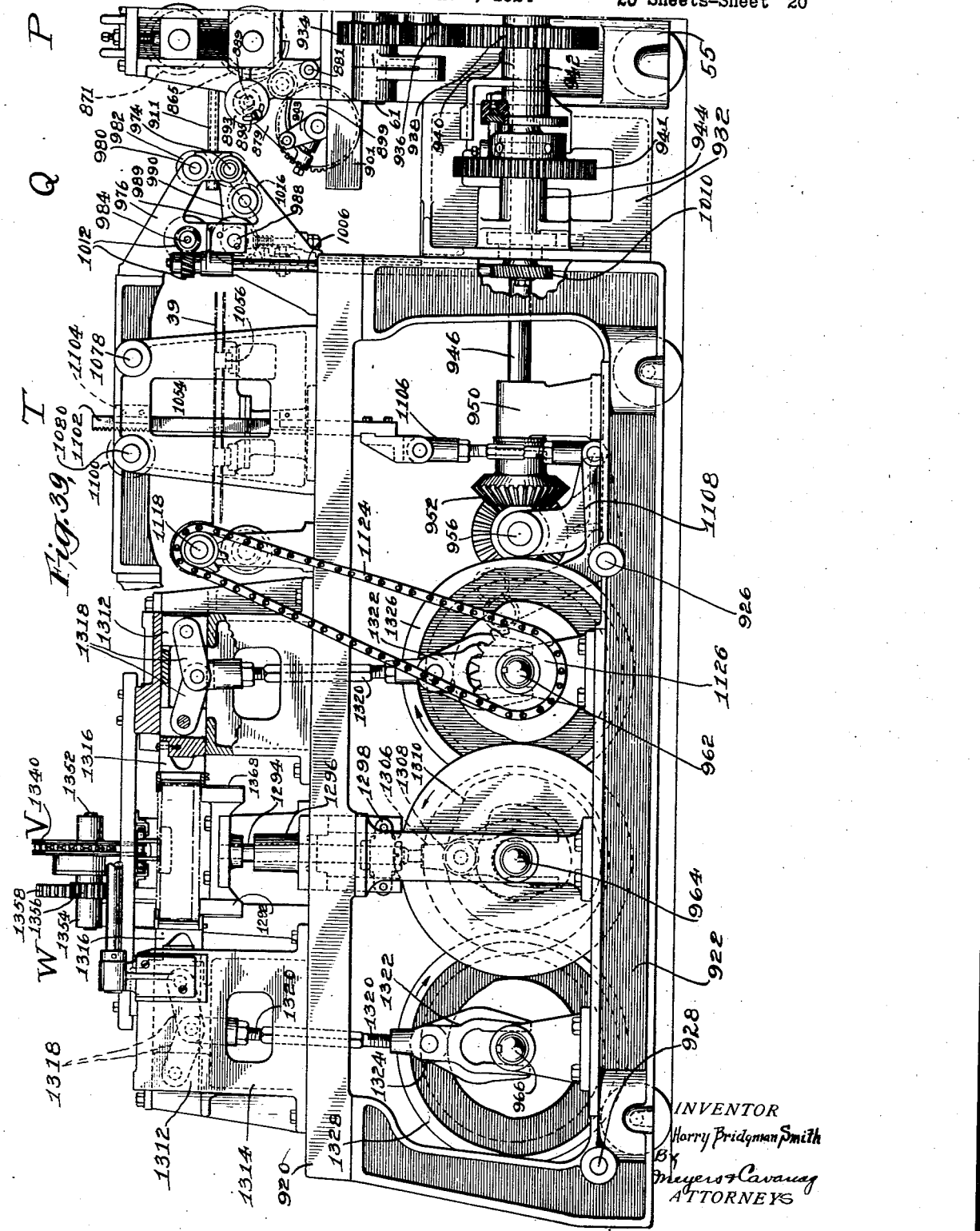

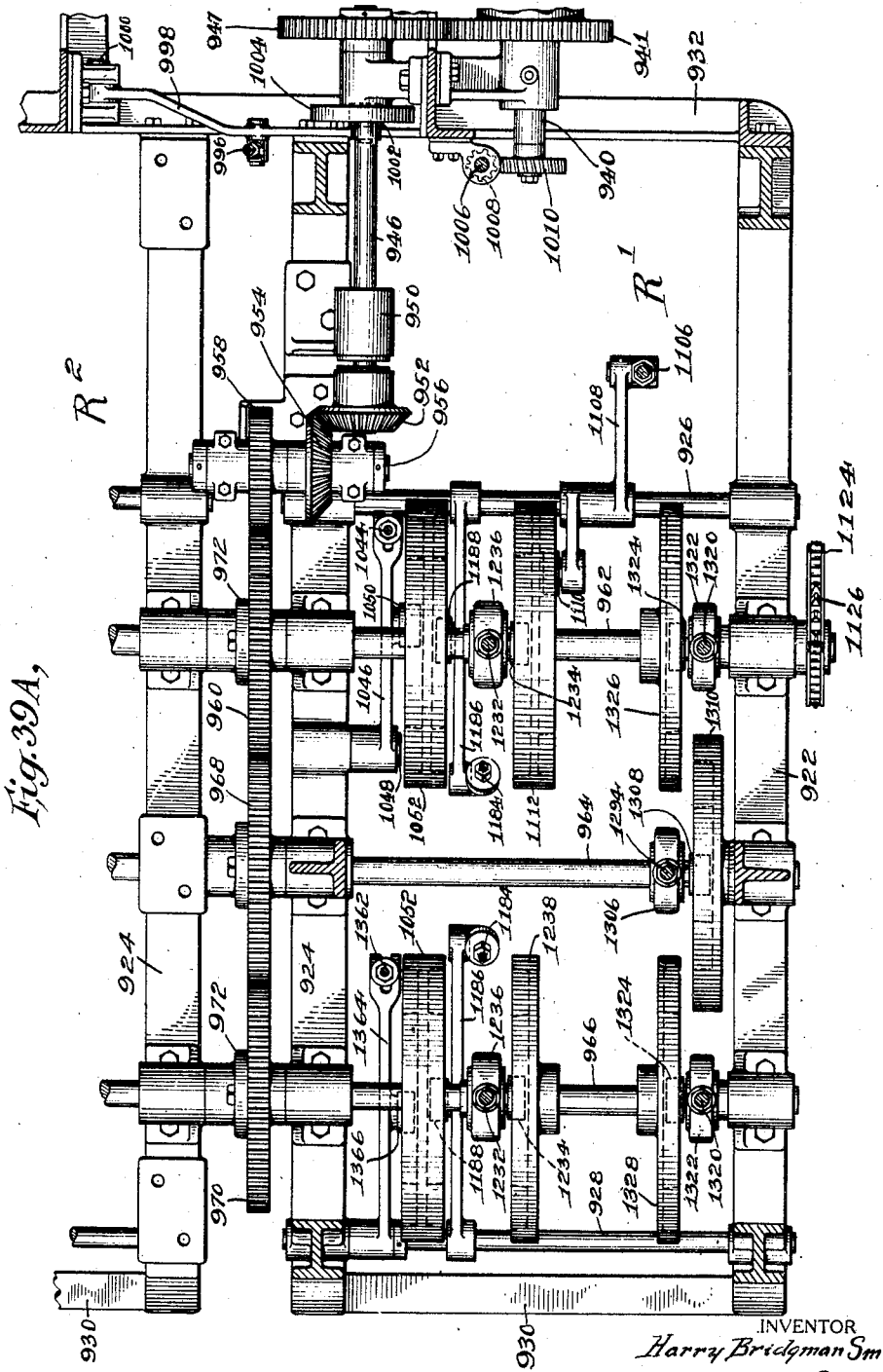

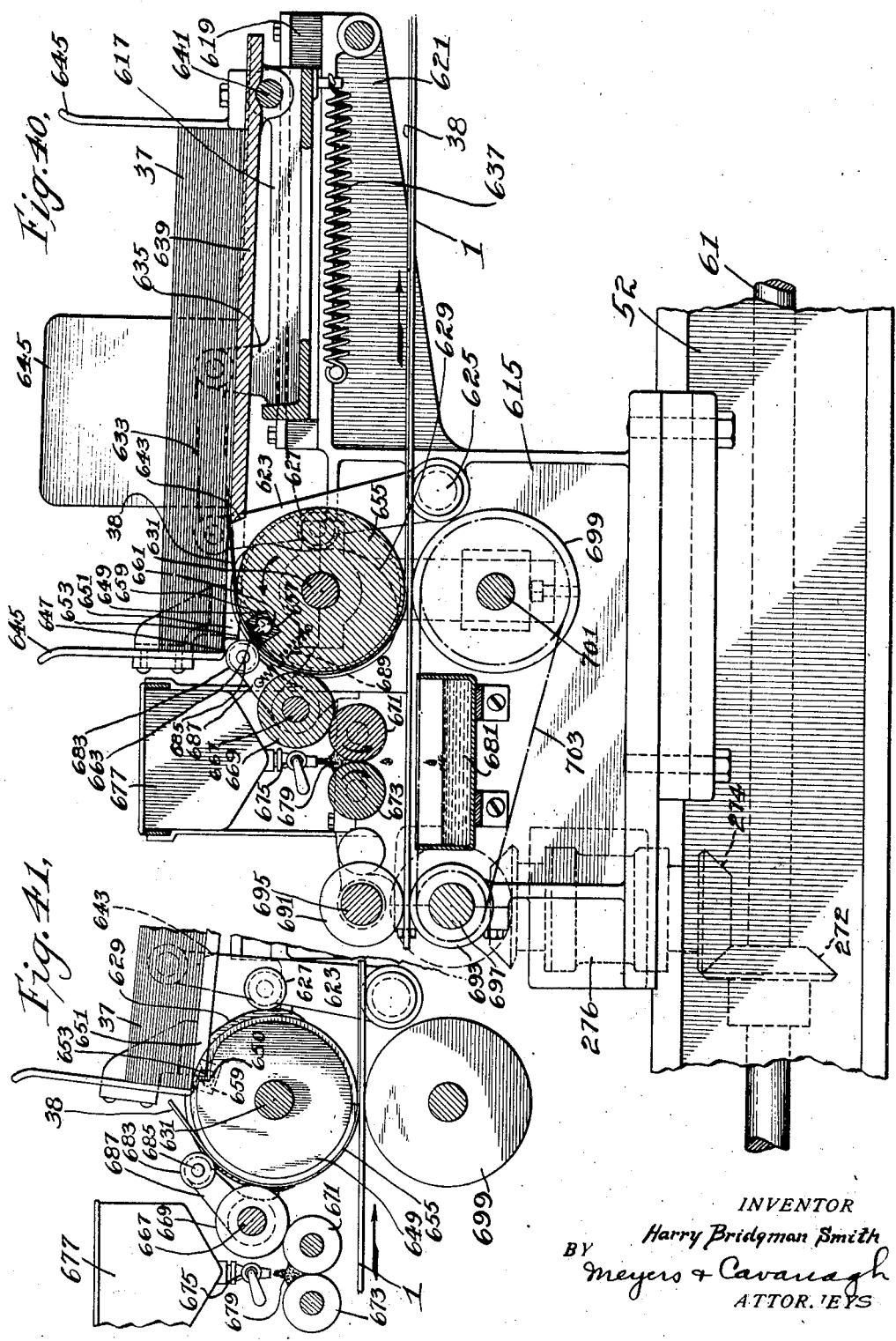

June 17, 1930.  H. B. SMITH  1,764,358
MACHINE FOR MAKING PAPER BOX BLANKS AND BOXES
Filed Jan. 3, 1924  23 Sheets-Sheet 23

INVENTOR
Harry Bridgman Smith
BY Meyers & Cavanagh
ATTORNEYS

Patented June 17, 1930

1,764,358

UNITED STATES PATENT OFFICE

HARRY BRIDGMAN SMITH, OF BROOKLYN, NEW YORK, ASSIGNOR, BY MESNE ASSIGNMENTS, TO HOAGUE-SPRAGUE CORPORATION, OF LYNN, MASSACHUSETTS, A CORPORATION OF MASSACHUSETTS

MACHINE FOR MAKING PAPER BOX BLANKS AND BOXES

Application filed January 3, 1924. Serial No. 684,116.

This invention relates to machines or mechanism for producing boxes, and specially covered boxes, box parts, or box blanks, of cardboard, paper and analogous sheet materials.

The general object of the invention is to provide mechanism operating in general accordance with what I call "continuous" production methods of my invention, some of which are disclosed in various of my issued patents and pending applications, to produce box blanks and boxes of my invention, as disclosed in various of my patents and pending applications, as well as other known or desirable forms of box blanks or boxes. Since the machine includes means for handling cardboard and paper, and other component materials when necessary, in the form of continuous webs or strips drawn from rolls, or when separate blanks or pieces of material are included, advancing such pieces and the other materials in a generally continuous course and without any, or any considerable, interruption in the progress of the materials, until the necessary operations are completed, the machine is capable of operating at high speed to produce a large number of finished box blanks or boxes in a given time and at a very low labor cost. A further object is to provide mechanism which is readily adaptable for producing blanks or box parts of different types or having different characteristics, and further, to provide mechanism which is readily adjustable or capable of being easily modified for operating on materials of different dimensions or for producing blanks or boxes having different dimensions.

To realize the above mentioned and other objects, the mechanism comprises the following principal parts, sub-combinations or instrumentalities, some or all of which may be used cooperatively, depending upon the characteristics of the product desired: Means for supporting and advancing sheet material such as paper and cardboard from rolls, means for suitably supplying other materials such as reenforcing strips or cords, means for advancing separate blanks or pieces of sheet material, means for performing various operations, such as producing creases or fold lines upon certain of the materials, means for routing or skiving certain of the materials, means for cutting, slitting or excising portions from certain of the materials before or after partial or complete assembly thereof, means for bringing the component materials into assembly contact and so securing them, the result of the stated operations being usually the production of a continuous assembly suitable for box blanks or similar purposes; means for severing portions successively from the continuous assembly, and means for manipulating the severed portions or blanks rapidly and accurately to form them into boxes or box parts.

The present mechanism is similar in some respects to that disclosed in my Patent No. 1,402,259, January 3, 1922, including, however, many modifications, improvements and added features, including means for supporting, guiding and regulating the rolls of material and especially the rolls of shell and cover material; means for straightening the shell web; different and improved means for producing fold and wing formations in the shell web; means for advancing and incorporating reenforcing material in the composite continuous blank; means for applying cover material in the form of separate blanks or sheets as an alternative to applying the cover material in continuous web form; means for supplying and incorporating individual labels in the continuous assembly in positions corresponding to the individual blanks to be produced; means for moistening the assembly to facilitate folding; improved means for producing transverse fold lines and especially fold-creases of a particular character; means for slitting the cover material at intervals on parallel longitudinal lines to effect end wing and corner lap separation; improved means for applying adhesive to restricted areas of the individual blanks; radically new and improved means for folding the successive blanks into box form, this means being preferably arranged as a plurality of more or less distinct folding mechanisms, with means for properly distributing to them in regular order the individual blanks produced from the continuous assembly; and completely organized and coordinated driving mechanism or connections for the automatic operation of the entire machine.

I have also heretofore invented, constructed and used automatic machines of another type, for producing covered paper boxes, substantially as disclosed in my prior application, Serial No. 501,088 of September 11, 1921. Such automatic machines utilize individual blanks of shell and cover material and associate and fold these blanks into box form, and the organization and mode of operation of such machines are radically different from machines constructed in accordance with the present invention, which utilize principally or entirely, continuous strips or webs of material, and associate them to form a continuous assembly, which is then severed to produce individual blanks and the blanks are then folded into box form by mechanism constructed and operating in accordance with the particular conditions incident to the continuous assembly production method. While the present invention provides, in certain cases, for the employment of preformed or independent blanks, these blanks are incorporated in the continuous assembly, as by application to one of the continuous webs, such as the cover web, and therefore the utilization of such independent or preformed blanks does not involve a departure from the general plan of continuous assembly production.

The characteristics and advantages of the invention are further sufficiently explained in connection with the following detail description of the accompanying drawings, which show certain representative embodiments of the invention. After considering these embodiments, persons skilled in the art will understand that many variations may be made, and I contemplate the employment of any structures that are properly within the scope of the appended claims.

Figures 1, 1ᴬ, 1ᴮ and 1ᶜ, taken together, show a complete automatic machine embodying the invention in one form, these views being partly in elevation and partly in vertical section on longitudinal planes.

Figures 2, 2ᴬ, 2ᴮ and 2ᶜ show the machine mainly in plan but with certain parts in section or broken away.

Figure 3 is a transverse section at 3—3, Fig. 1.

Figure 4 is a section at 4—4, Fig. 1.

Figure 42:
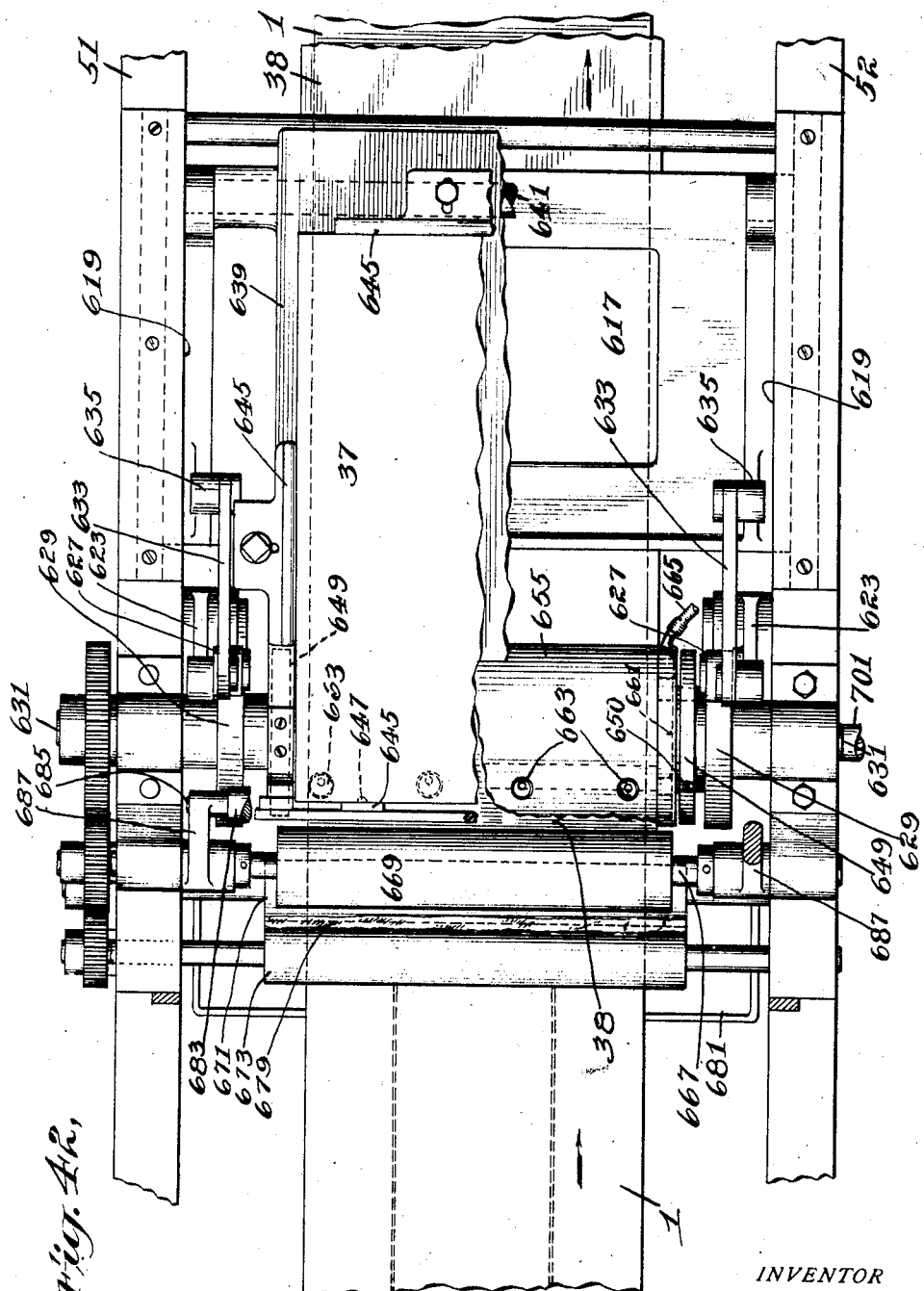

Figure 4ᴬ is a fragmentary cross section of the shell web after fold channel production.

Figure 5 is a section at 5—5, Fig. 1.

Figure 5ᴬ is a fragmentary transverse section of the shell web after the beveling operation.

Figure 6 is an enlarged detail section of co-operating transverse slitting, and punching or pricking rolls, in operative relation to a strip of shell or body material.

Figure 7 is a plan view of a strip of shell material after treatment by the slitting and pricking rolls.

Figure 8 is a detail in vertical, longitudinal section of co-operating longitudinal cutting or slotting rolls and a co-operating scrap-stripping device.

Figure 9 is a bottom plan view of an upper cutting roll of Fig. 8.

Figure 10 is a vertical section in the axial plane of co-operating portions of the slotting rolls or cutters.

Figure 11 is a plan view of the cardboard shell or body strip after treatment by the slotting cutters and showing also the operation of a scrap ejecting device.

Figure 12 is a view in vertical, longitudinal section of a strip as acted upon by the ejecting device just mentioned.

Figure 13 is a section at 13—13, Fig. 1ᴬ.

Figure 14 is a section in the plane 14, Fig. 1ᴮ.

Figure 15 shows an associated body web and cover web, after the operation of folding over and securing projecting margins of the cover web.

Figure 16 is a section in the plane 16, Fig. 1ᴮ, showing co-operating portions of upper and lower transverse crimp-creasing devices.

Figure 17 is a view in elevation from the left of Fig. 16, with certain parts in section or broken away.

Figure 18 shows the continuous assembly after the transverse creasing operation.

Figure 18ᴬ shows a modification of the assembly, particularly with regard to end wing extensions.

Figure 19 is a detail in plane 19, Fig. 1ᴮ.

Figure 20 is an elevation from the left of Fig. 19, showing the longitudinal slitters of Fig. 19 in operative relation to the continuous assembly.

Figure 21 shows the assembly adjacent to the slitters and after the slitting operation.

Figure 22 is an enlarged detail in vertical longitudinal section of transverse cutting, or corner lap cutting, devices.

Figure 23 shows the continuous assembly after the transverse slitting and corner lap cutting operations.

Figure 23ᴬ shows substantially one-half of a completed, severed blank.

Figure 24 is a detail view in a vertical longitudinal plane, sufficiently illustrating printing mechanism for applying imprints to the continuous assembly, arranged specifically in this instance for printing on the surface of the assembly which is to be an inside surface of the completed blank or box part.

Figure 25 is an enlarged detail of corner lap scrap ejecting means in the plane 25, Fig. 1ᴮ.

Figure 26 is a vertical transverse section at 26—26, Fig. 1ᶜ, showing blank shifting mechanism and other individual blank manipulating and folding devices.

Figure 27 is a section at 27—27, Fig. 1ᶜ.

Figure 27ᴬ is a detail of side wing folding or longitudinal corner creasing devices.

Figure 28 is a section at 28—28, Figs. 1ᶜ and 2ᶜ.

Figures 29 to 34 inclusive, are detail views of the folding or forming mechanism sufficiently showing different operative positions.

Figures 35 and 36 show portions of different box parts representative of those produced by the folding mechanism.

Figure 37 is an additional positional view of the folding mechanism showing particularly a box part ejecting device and operation.

Figure 38 is a plan view of a completed box part.

Figure 38ᴬ is a section of the same at 38ᴬ, Fig. 38.

Figure 39 is a side elevation of the rear portion of the machine or folding mechanism.

Figure 39ᴬ is a horizontal section of one of the folding mechanisms in a plane above the cam shafts, to show the cams and connections for driving various parts of the mechanism.

Figure 40 is a detail vertical longitudinal section of label or cover blank feed mechanism, which may be employed in some cases and is adapted for ready application to the machine.

Figure 41 is a positional detail of the same.

Figure 42 is a top plan of the same, with some parts removed for illustrative convenience.

I will first describe a series of operations, as representative of the general method in which the mechanism in its present embodiment operates to produce certain representative styles or types of blanks and box parts. A web 1 of suitable box shell or body forming material, which may vary considerably in character but is sufficiently described, for most of the purposes of this invention, as cardboard, is drawn from a roll 2, Fig. 1, and preferably this web is advanced in continuous form up to the point where individual blanks are produced by transversely severing the web; and preferably also, the movement of the web is continuous and the speed is constant, although in the broader aspect of the invention in some cases the rate of movement of the web may vary, and it may even be brought to rest at one or more points without departing from the principal idea of continuous assembly or blank production. At a suitable point longitudinal fold lines are produced in the web and these fold lines may be in the form of scores or creases, but in the present specific example they are in the form of channels 3 (Figs. 3 and 7) produced by routing or grinding operations on the under surface of the web. When desired, beveled surfaces 4 may be produced adjacent to the fold lines by skiving or grinding operations (Fig. 5ᴬ). Thereafter perforations or "pricks" 5 are produced along the fold lines, defining the ends of narrow strips 6 defined by dotted lines in Fig. 7, which are to be subsequently produced by longitudinal cutting or slitting and removed, and transverse slits or cuts are also made to define the ends of the end wings in certain cases, these cuts 7 when in spaced relation, as shown in Fig. 7, defining waste pieces or scraps 8 which are to be subsequently removed. Thereafter longitudinal parallel cuts 9 and 10 are made, definitely defining the slot strips 6 as indicated in dotted lines in Fig. 7 and connecting the pricks or punch holes 5, these cuts connecting with the transverse cuts 7. The slot strips 6 with the center scrap pieces 8 are then removed, leaving the continuous shell or body blank 1, provided at intervals with openings which, in the present specific embodiment, include the slots 11 connecting with center openings 12 (Fig. 11). The longitudinal dimension of the openings 12 may be varied in accordance with the dimensions or character of the box, or they may be omitted in some cases, (further explained below in connection with Fig. 18ᴬ), and in such cases any transverse central cut, such as 7 may be entirely omitted at the stage of operations indicated in Figure 7.

A strip or web 13 of suitable cover material is advanced from a roll 14 and adhesively coated on one surface and the adhesive surface of the cover strip is applied to one surface (in this case the upper surface) of the shell web, with margins 15 of the cover projecting beyond the edges of the shell web. These margins are then turned or folded about the edges of the shell web and adhesively secured to the under surface margins or the shell web, Fig. 15, which is a bottom plan of the associated shell and cover webs, which I conveniently identify as a continuous assembly. Glued portions of the cover web appear in the central spaces of the shell web, namely, the spaces or openings 11 and 12. The assembly is now suitably treated to provide transverse fold lines 16, and these may be of any suitable character, such as scores, channels or creases, but are preferably in the form of crimp creases in order to secure the best results in folding, especially with cheaper grades of body material, such as strawboard.

Longitudinal cuts 17 (Fig. 21) are now made in the cover material overlying slots 11, and the assembly is then cut transversely to produce individual composite box blanks 18, Fig. 23ᴬ, each consisting of a central or body section 19, side wings 20, end wings 21, and corner laps 22, all these portions consisting of combined shell and cover material, and with narrow portions 23 and 24 of the cover material produced by the longitudinal cuts 17, projecting in the spaces between the adjacent corner laps and end wings, these spaces being produced by the shell slots 11, and with cover end wing margins 25 projecting beyond the ends of the shell end wings, all these projecting cover margins being adhesively coated in the original coating of a surface of the cover web. The cover sheet covers the entire outer (upper) surface of the shell blank, and the cover margins 15 turned or folded and secured as above described, cover the longitudinal edges of the side wings 20 and corner laps 22, and margins of the inner (under) surface of the shell adjacent to the longitudinal edges. The severed composite web section 18 may be identified as an individual box blank or composite blank, or otherwise as an individual box forming assembly.

In some cases, where the nature or dimensions of the box to be produced permit it, the individual assemblies may be severed by a single transverse cut. In the present particular example, several distinct cuts are made, including a central transverse cut 26 through the cover paper overlying the central opening 12, this producing the cover margins 25 just mentioned; and other cuts 27, longitudinally spaced apart are produced in outward portions of the continuous assembly, beyond the longitudinal fold lines, these cuts intersecting the longitudinal cuts or slits 17 previously mentioned, and defining waste or scrap pieces 28, the cutting or excision of these scraps producing the proper end formation of the corner laps 22. The composite blank 18 may or may not have beveled or skived shell end wing margins 4, produced as previously described.

Many variations may be made in the particular form or characteristics of the blanks produced by the continuous operations of the machine. Figure 18$^A$ sufficiently indicates certain variations, in accordance with which no central openings 12 are produced in the shell web, but the longitudinal openings or slots 11 are produced as previously described before contact of the cover web with the shell web; the combined webs are operated upon substantially as in the previous description, including the formation of the transverse fold lines or creases 16, and additional central transverse fold lines or creases 29 are also produced, which, after the central portion of the blank is cut transversely along the line 26$^a$, define end wing extensions 30, each consisting of combined shell and cover material, the cuts 26$^a$ being made in this case through the combined materials. The end wing extensions 30 are to be turned over the inturned corner laps, in the formation of the complete box part, and secured to the inner marginal portions of the corner laps, to produce a strongly reinforced box end structure, substantially as the projecting cover margins 25, Fig. 23$^A$, are to be turned or folded over and secured to form another type or style of box.

The pricking or punching, and slotting and transverse cutting of the shell web, prior to application of the cover paper, are conveniently referred to as "pre-punching", cutting or slotting operations, and in some cases the excision of all materials which are to be cut from the shell web may be so performed; otherwise for different types of boxes and especially those in which certain edges of the shell material are not concealed by cover paper, excision of material may be performed after application of the cover paper, and in that case portions of the combined cover and shell material are removed at the same time. A sufficient example of this may be understood from Fig. 18, where the slots 11 may be made through the combined shell and cover material after the cover is applied to the shell web.

The continuous assembly formation may be varied considerably as to the character or number of component materials, for instance, in some cases a lining web may be applied to the inner (under) surface of the shell web and reinforcing strips may be applied along longitudinal fold lines or otherwise. These variations are sufficiently described hereafter in the detail description of the machine.

The exact manner of folding the individual composite blanks into box form may vary considerably in the broader aspect of the invention. The mechanism as here shown is especially arranged to automatically handle the individual blanks and fold them into box form substantially as shown in Figs. 35, 36, 38 and 38$^A$. The plan of operation is such that the side wings 20 with the corner laps 22 extending from the ends thereof, are first folded along the longitudinal fold lines 3, and preferably these members are folded beyond a right-angle position, so that the fold line or crease is well "broken" or set in the desired direction, and then the parts are straightened out again substantially at right angles to the body section 19. At a suitable stage of operations, which may be before or after the individual blanks are severed, adhesive is applied to inner (under) surface of the end wings 21. The corner laps are now folded in at right angles to the side wings, and the end wings are folded down at right angles to the body section 19 and adhesively secured to the outer surfaces of the corner laps, and the projecting cover margins 25 in the case of the blank shown in Fig. 23$^A$, or the end wing extensions 30 in the case of the blank shown in Fig. 18, are turned in over the upper edges of the corner laps and adhesively secured against inner margins of the corner laps, as sufficiently shown in Figs.

35 and 36 respectively. Figure 38 sufficiently shows in perspective the appearance of a completed box part made from either blank, this box part presenting the desired completely covered appearance, with the outer surfaces, inner margins, and all edges of the shell material completely covered by portions of the cover paper. The covering of vertical edges of the shell end wings 21 is provided for in this particular example, as shown in Fig. 38$^A$, by the cover margins 24, which are adhesively secured to outer surfaces of the corner laps near the fold lines or corners 16, these cover margins entirely covering and concealing the adjacent edges of the shell, which is in this instance, shown as being provided with skived or beveled portions 4, produced in the manner previously described, so that the outer edges of these portions are very thin and may be easily pressed down and secured without producing any noticeable bulge or crease on the outer end surface of the finished box.

While the general arrangement or organization of the machine may vary considerably in the broader aspect of the invention, it desirably may be arranged, as in the present embodiment, in two main parts or sections, one main section, as shown in Figs. 1, 1$^A$, 1$^B$, 2, 2$^A$, 2$^B$, constituting the mechanism for producing the continuous assembly and also for producing therefrom the individual composite blanks, and the other main section, as shown in Figs. 1$^C$ and 2$^C$, consisting of mechanism for handling and folding the individual blanks into box form. While these main sections are capable of being, and in some cases may be, separately operated, they are, in the present preferred embodiment of the invention arranged as parts of a complete machine, which takes in materials in continuous roll form, with or without additional material in the form of individual pieces or blanks, manipulates and assembles them in general accordance with the above description, severs the continuous assembly to produce individual composite blanks, and automatically folds the individual blanks into box form and ejects them, by entirely automatic operations at very high speed, and with very great accuracy and economy.

The machine may be further considered for descriptive purposes as consisting of various subordinate sections, stations or departments, sufficiently described as follows:

Section A, Figs. 1 and 2, mechanism for handling, straightening, and feeding the shell web.

Section B, means for producing longitudinal fold lines or channels and for beveling portions of the shell when that operation is desired.

Section C, Figs. 1 and 1$^A$, means for feeding, gluing and applying a lining web when that is desired.

Section D, Figs. 1$^A$ and 2$^A$, means for feeding, gluing and applying reinforcing strips.

Section E, means for pricking or "prepunching" the shell web.

Section F, means for longitudinally slotting the shell web and removing shell scrap.

Section G, Fig. 1$^A$, means for feeding, gluing, and applying labels to the continuous cover web when that is desired.

Section H, Fig. 1$^A$, means for embossing the cover web when that is desired, or otherwise for pressing it in position on the shell web.

Section I, means for moistening the shell web along longitudinal fold lines.

Section J, means for folding over and securing cover web margins.

Section K, means for producing transverse fold lines or creases.

Section L, means for longitudinally slitting the cover paper.

Section N, means for transversely severing the continuous assembly by cutting or slitting transversely the cover or combined materials.

Section O, means for removing waste pieces or scrap.

Section P, means for gluing to certain individual blank portions such as inner surfaces of the end wings.

Section Q, Figs. 1$^C$ and 2$^C$, means for rapidly advancing individual blanks.

Section R, the main folding or forming section of the machine, which, as best understood in Fig. 2$^C$, is preferably, although not necessarily, arranged in duplicate, one of the two complete folding or forming mechanisms R$^1$ and R$^2$ being at each side of the dot-and-dash line z—z, in that figure.

Common to the two folding mechanisms is blank transfer mechanism S.

Each folding or forming mechanism comprises a section or station T for bending or "breaking down" the assembly side wings, a station or section U for partially straightening them out again, a section V for completing the box formation including the turning in of the corner laps, turning down the end wings, and inturning and securing projecting end wing cover margins, and a section W for repressing the formed box part.

The first main section of the machine, for producing the continuous blank assemblies, and also including means for separating the individual blanks or box forming assemblies from the continuous composite web, generally illustrated in Figs. 1, 1$^A$, 1$^B$, 2, 2$^A$, 2$^B$, is built upon and around a frame which includes side rails 51 and 52, connected by suitable cross pieces which it is unnecessary to describe except with reference to some particular parts of the mechanism. The side rails are supported on various legs or pedestals such as 53 and 55, and a central under frame which includes side plates 57. Desirably the pedestals 53 and side plates 57 are provided with rollers 59 to facilitate the location or movement of the machine.

Most of the moving parts are driven from a longitudinal shaft 61 supported in bearing casings 64, which are secured to the side rail 51. The main drive shaft 61, may be driven in various ways and provisions may be made for driving it fast and slow, for instance, by suitably sized pulleys from a countershaft; but preferably, as here shown, suitable change-speed gearing is provided, with suitable controlling mechanism, for driving shaft 61 at low and high speeds, and the shaft is driven through this gearing by an electric motor arranged as a part of the machine, so that in a preferred construction the driving mechanism, as well as all other features of the machine, forms a part of the substantially unitary or self-contained structure.

For these purposes the central supporting frame structure including the side members 57 above mentioned, is provided with cross members 67 and an electric motor 70, which in the present embodiment, is the prime mover of the machine, is hung from certain of these cross members. A worm gear casing 73 is supported from other of the cross members. In this casing is a worm 76 on a shaft 79, which is in line with motor shaft 82 and connected to it by a suitable flexible or universal coupling 85. A worm gear 76 engages a worm gear 88 within the casing, mounted on shaft 91. On this shaft outside the casing is a pinion 94, Fig. 13, engaging a gear 97, keyed to a hub 100, which is revolubly mounted on a transverse shaft 103 carried in bearings 106 and 109. On hub 100 is a pinion 112 engaging planet pinions 115 revolubly mounted in a spider, the hub 118 of which is keyed to shaft 103. Revolubly mounted on the spider hub is a gear carrier 121 carrying a ring gear 124 engaging the outer peripheries of planet pinions 115. The hubs of gear 97 and pinion 112, spider hub 118, and hub of gear carrier 121, are properly located longitudinally of shaft 103 by bushings 127, pinned or otherwise secured to the shaft. A clutch drum 130 is slidably splined on shaft 103 and has a conical clutch surface 133 engaging a complemental clutch surface formed at the inner periphery of gear 97. Clutch 130 is urged to engagement by a spring 135 and is provided with a shifting collar 136 and thrust bearing, as usual in clutches of this type. Gear carrier 121 is provided with a clutch drum 139 and cooperating with this is a fixed expansible clutch band 142, and any known or suitable mechanism for operating the band clutch may be provided as usual in clutches of this type. A bevel gear 145 is keyed on the left end of shaft 103 and this engages a similar gear 148 keyed on the main drive shaft 61.

At a convenient point adjacent to shaft 103 is controlling mechanism comprising a lever 151 fixed to a vertical shaft 154 which is mounted in bracket arms 157. A cam 160 fixed on shaft 154 operates a cam roller 163 mounted on a link 166, connected to a lever 169 which acts on the cone-clutch shifting collar 136. Also secured on shaft 154 is another cam 172 which actuates a cam roller 175 carried by a link 178, which forms a part of suitable linkage connected to the operating mechanism of the expansible clutch band 142. Lever 151 moves adjacent to a horizontal detent segment 181 provided with three latch holes 184, and a latch pin 187 carried by the lever is arranged to cooperate with the holes and is operated by a latch lever 190 pivoted on a lever 151 adjacent to its handle 193. By the described arrangement, when lever 151 is in one of its three positions, clutch member 130 is retracted against its spring 135 and clutch band 142 is contracted, and the gearing therefore runs free, while motor 70 is running, without driving shaft 61 or any part of the machine. In another position of lever 151, clutch band 142 is expanded while cone clutch 130 is still held retracted; the gear 124 is thus held stationary and shafts 103 and 61 are driven at low speed through the planet pinions 115, to permit convenient adjustment of various parts of the machine or to facilitate the operations of threading the different materials through the machine, or for slow running while inspection of operation is necessary and for various other reasons. With the lever in its third position, clutch band 142 is contracted and spring 133 is permitted to advance the cone clutch member 130 into engagement with gear 97, thereby in effect locking the planetary gearing as a rotative unit and driving shaft 61 at high or normal running speed of the machine, which may, of course, be further varied as necessary by regulating the speed of motor 70.

While the gearing and control arrangement described is satisfactory and preferred in many cases, in the broader aspect of the invention it is only representative of any known or suitable gearing or other driving mechanism which may be employed for the purposes stated.

At the front end of the machine (at the right, Figs. 1 and 2), frame brackets 196 support uprights 199, which have inner vertical channels 202, and shaft 205 which serves as a center for roll 2 of shell material, has its ends located in the channels to guide the roll center vertically as its diameter decreases while the web 1 is drawing from it. The roll rests on spaced supporting rolls 208 and 209 revolubly mounted on shafts 211. Beveled guide members 213 for the opposite faces of roll 2 are arranged on blocks 215 which may be adjusted longitudinally on shafts 211 and secured by clamping devices controlled by set screws 217, so that the face guides may be adjusted for different web widths. Shafts 211 may then be moved longitudinally to properly aline the roll in the machine by a handwheel 219 operating a screw 220 and provided with a cross piece 222, engaging shifter members 224 on adjacent ends of the shafts.

The web 1 of cardboard or similar shell material may be led in any suitable way from roll 2, usually from the lower side of the roll, to the initial web feed rolls. It is, however, preferred to treat the web to substantially or entirely straighten it or eliminate the curvature imparted to it while it is in roll form. For this purpose the web is drawn from roll 2 as it passes over the supporting roller 208 and is passed under roller 209, and is then drawn over a roll 226, of moderate diameter located on a shaft 228, which is supported in fixed bearings, and the web is then led under a roll 230 mounted on a shaft 231, and then passes between rolls 233 and 234. Roll shaft 231 is carried by arms 236 pivotally mounted about the axis of shaft 228, and shaft 231 is connected by links 238 to short arms 240 on a rock shaft 242, mounted in bearings 244. A lever arm 246 is secured centrally to shaft 242, and a shaft 248 is fixed in the curved end of this lever, and on the shaft are mounted rolls 250 which bear on the periphery of shell roll 2. Desirably, roll 226 is positively driven by the connection of its shaft 228 with shaft 61 through bevel gears 252, and desirably also rolls 233 and 234 are positively driven by means explained hereafter. The rolls last named, together with other web driving or traction rolls which may be provided, as also explained hereafter, together with roll 226, when it is positively driven as above, provide sufficient tractive effort to draw the web from roll 2 and advance it to the point in the machine where actual operations upon the web are commenced.

Rolls 250 arranged as described, act as a variable drag or retarder operating upon the periphery of the web roll, which has relatively small effect when a new roll of large diameter is placed in the machine, the retarding or drag effect of the rolls 250 increasing as roll 2 diminishes in size, until when the roll is nearly exhausted, as shown in dotted lines, Fig. 1, the rollers 250 bear with considerable weight upon the periphery of roll 2, owing to the changing angularity of arm 246. The rolls 250, therefore, sufficiently retard the web roll and tension the web with varying effect as the web roll diameter varies. Rolls 250 with their lever arm 246 also act as a web roll follower or gauge, and as an actuator for the movable web bending roll 230, serving to hold roll 230 in an upper position, as shown in full lines in Fig. 1, when the web roll is large, and to progressively depress roll 230 as the web roll decreases in size, until finally roll 230 is located considerably below the axis of roll 226 when the web roll is nearly exhausted. This varying position of roll 230 serves to increase the reverse bending effect upon the web, as the size of the web roll diminishes, this being appropriate to the greater set or curvature imparted to the web lying near the web roll center. In other words, the movable roll 230 is adjusted to give a greater straightening effect to portions of the web which have a greater initial set or curvature. As the web roll diminishes in size, its centering shaft 205 drops vertically in the guide channels 202 and prevents any displacement of the web roll longitudinally of the machine. In the particular arrangement described, roll 234 in addition to acting as one of a pair of positive feed rolls, is of small diameter and therefore serves as an additional straightening roll, since the web is given a substantial reverse curvature as it passes over roll 234. From that point on, the shell web proceeds, preferably in a straight line, to the point where the individual box blanks are produced by transverse severing operations. Instead of bringing the web off of roll 2 after it passes over supporting roll 208, it may stay on roll 2 until it passes over roll 209, also, and may then be directed over roll 230 and so on, as previously described.

Rolls 233 and 234 are arranged in the present embodiment of the invention as a part of a roll group designated as a whole by reference numeral 254, Fig. 2, this group including also, the larger feed rolls 256 and 257. This roll group 254 is representative, in a general way, of several other groups of rolls hereafter referred to, all of which are most conveniently arranged and driven in a generally similar manner. Each roll is fixed on or formed as a part of a shaft, roll 233 being mounted on a shaft 260, roll 234 on a shaft 261, roll 256 on a shaft 262, and roll 257 on a shaft 263. The shafts are rotatably mounted in bearing blocks and these blocks are located in vertical frame channels 266 and 267. The lower bearing blocks are adjustably supported to present the upper surfaces of rolls 264 and 267 in the proper horizontal plane, and the upper bearing blocks are adjusted and held downward by screws 269 passing through cross pieces 270 secured at the top of the bearing channels. In most cases it is sufficient to arrange one shaft of each roll group as the initial driving member of that group, and this initial driving member is driven from shaft 61. For this purpose bevel gears 272 are fixed on shaft 61 at proper intervals corresponding to the different roll groups, and each of these gears engages a bevel gear 274 on a short vertical shaft 276, each of these short shafts, as best shown in Fig. 13, and in Fig. 1ᴮ, near the left end thereof, being mounted rotatably in a bearing sleeve housing 278, and at the upper end, each shaft 276 has a bevel gear 280 engaging a bevel gear 282 fixed on the adjacent end of the initial driving shaft of the roll group in question. Thus, for roll group 254, bevel gear 282 is secured on the end of roll shaft 261. At the opposite side of the machine the various roll shafts are connected by gears sufficiently identified by numeral 234, in the case of roll group 254, these gears including idlers wherever necessary, and the shafts of corresponding upper and lower rolls, such as the pair of rolls 233 and 234, or the pair 256 and 257, being usually directly connected by certain of the gears 284 located on the respective shaft. The upper and lower shafts of any co-operative pair of rolls usually have slight vertical movement to provide for the thickness of the materials passing between them, and this slight movement may be allowed for by reasonable play between the teeth of the gear, the gear teeth whenever necessary being cut with slightly greater length, or with slightly greater clearance for this purpose.

All of the web rolls, and especially those which positively engage and drive the shell web or other parts of the continuous assembly, are preferably of two sizes, the smaller rolls of any group, such as 233 and 234 of group 254, being one-half the diameter of the larger rolls, such as 256 and 257 of the same group. Since many of the large rolls have devices which positively engage the blank to perform cutting or slitting operations on each successive portion of the continuous web or assembly which corresponds to a definite blank subsequently to be cut therefrom, each of these large rolls is preferably of such a diameter that in one revolution its periphery is traversed by a length of the web or continuous assembly equal to the length of an individual blank; and for convenience in driving connections, the small rolls, although they usually do not positively cut or otherwise operate upon the blank except to advance it by frictional contact, are desirably made one-half of the diameter of the large rolls. The main longitudinal drive shaft 61 is desirably driven at a rather high speed in relation to web travel, for instance, it is desirable to rotate shaft 61 twice during web advance equal to one blank length. Each roll group therefore is conveniently driven by connection of the shaft of one of its small rolls to shaft 61 through bevel gears and one of the short vertical shafts 276, as above referred to, so that the small rolls travel at the same angular speed as shaft 61 and therefore two revolutions of the small rolls correspond to one blank length travel of the web. The gears, such as 284 of group 254, connecting the other roll shafts of the group with the initial drive shaft of that group, are arranged to drive the respective shafts at the proper speeds, for instance, one of the gears 284 on a shaft such as 262, carrying one of the large rolls 256, is twice the size of the gear on the initial roll drive shaft 260; and therefore the large rolls rotate once for each blank length travel of the web, this corresponding, of course, to the circumferential dimension of the roll.

While one pair of feed or tractor rolls, such as the rolls 256 and 257, may be sufficient in some cases to properly draw the shell web from the web roll and start it on its way through the machine, the provision of an additional pair of rolls, such as 233 and 234 increases the tractive effect and insures the positive and satisfactory feed of the web and also gives an opportunity for one of the rolls such as 234, through which the web initially passes as it begins its straight line movement through the machine proper, to be made of small diameter and to serve as a web straightener.

Somewhat beyond the feed rolls the shell web passes over grinding wheels 290 carried by a shaft 292, Figs. 1, 2, 3 and 4, which produce the longitudinal folding channels 3, these being broadly representative of any suitable fold lines. For instance, rotary cutters or stationary blades might be substituted for the grinding wheels, to produce score lines or any known or suitable type, or creasing devices may be substituted to produce "bead" or other creases in the shell material. In a broader aspect of the invention also, it is not necessary to locate the fold line producing devices at the point shown, where they operate on the shell web before any other materials are applied to it, and where in fact the fold line production is the first forming operation in the process of producing the continuous assembly. These devices may be arranged to act upon the shell material or upon combined materials after one or more additional pieces or webs of material have been applied to the shell web, for example, after the cover web has been applied to one face of it, the other face of the shell web may be routed or ground to produce longitudinal fold channels, or scored or creased, to provide longitudinal fold lines. It is sufficient for the broader aspects of the invention to represent the longitudinal fold line producing means as located substantially at or near the front end of the machine as shown, and in a more limited aspect of the invention this particular location is desirable, since for many purposes it is more convenient to produce the longitudinal fold lines, and especially to produce them by grinding operations, at an early stage of the assembly formation and before the shell web is associated with other materials.

The shell web is held against the grinders by abutment rolls 294 running on the upper surface of the web. These rolls are mounted on short shafts secured to elbowed carriers 296, and each carrier is pivotally connected at 298 to a block 300. Inserted in the block is a screw 302 having a lock nut and bearing against one end of the elbowed carrier 296 to adjust the vertical position of the individual abutment roll, and thus to regulate the depth of the channel routed out by the corresponding grinding wheel. Wheels 290 of different face widths may, of course, be provided to vary the width of the fold channel. Shaft 292 is rotatably mounted in suitable bearings, and these bearings may be located in bearing blocks 304 arranged for vertical adjustment in channels 306 formed in the side walls of a dust box 308 enclosing the grinding wheels, and referred to hereafter. The adjustability of bearing blocks 304 provides a rough adjustment for the channel depth or otherwise provides for locating shaft 292 at the proper level with reference to web movement, and then a final adjustment for grinding depth may be obtained by means of screws 302 above referred to.

The grinding wheels 290 are detachably secured to cylindrical blocks 310 by nuts 312 and washers 314. The cylindrical wheel blocks are arranged for longitudinal adjustment on the shaft to provide for variations in the width of web between the longitudinal fold channels. For this purpose the blocks 310 are provided with split clamping members 316 which are also partly separated from the main body of the block by slots 318, and the split members 316 are drawn together, after the block is adjusted on the shaft, to secure it in position thereon, by screws 320. The abutment rolls 294 have a substantial face width so that some adjustment of the grinding wheels may be made without lateral adjustment of the abutment rolls. To provide a greater range of adjustment, however, blocks 300 which carry the abutment rolls are mounted for longitudinal adjustment (transversely of the machine) on a cross bar 322 secured to frame side uprights 324. For this purpose the bar has a flared flange 326 on its lower face and blocks 300 have sockets substantially embracing the flange and fitting it at one side and at the other side are provided with set screws 328 to lock them in adjusted position.

Adjacent to the channel grinders, and conveniently arranged to act on the web after it passes them, are other grinding wheels 331 secured for longitudinal adjustment (transversely of the machine) on a shaft 333, substantially as in the case of wheels 290. The supporting and adjusting means for the wheels 331 are therefore identified by the same reference numerals (Figs. 1, 2, 3, and 5). Shaft 333 is supported and arranged substantially as in the case of shaft 292. The grinding faces 335 of wheels 331 are beveled or in other words are segments of a cone of suitable angle or taper, and are designed to produce the beveled shell surfaces 4, sufficiently described above. The wheels 331 may be described as skiving devices or skiving wheels, and broadly represent any suitable means for producing skived or beveled surfaces on the shell web, although in a more limited sense these particular devices are preferred in many cases. The shell web is intermittently brought and held in contact with the skiving wheels by abutment rolls 337, each of which is mounted on a shaft 339 which runs in bearings in the lower ends of arms 341, which are connected by a flange 343 and are pivotally mounted on a pin 345 which passes through hub member 347 of a carrier 349. The carrier is formed with a fork substantially embracing flange 343. A spring 351 is compressed between one arm of the fork and the flange, and a set screw 353 passes through the other fork arm and bears against the flange in opposition to the spring. In this way arms 341 are extended angularly from the carrier 349, as best shown in Figure 1, and may be adjusted in relation to the carrier to properly regulate the depth of the skiving action when the abutment rolls 337 are advanced to press the web against the grinders.

The carriers 349 are mounted for adjustment on a rock shaft 355 by means of sleeve members 357 and set screws 359 to secure the carriers in adjusted position longitudinally of the shaft (transversely of the machine) so that the abutment rolls 337 may be adjusted in accordance with lateral adjustment of the skiving wheel to suit the positions of the skived surfaces 4 laterally of the web. Rock shaft 355 is mounted in bearings in brackets 261ª and is provided with an arm 363 connected by a link 365, which may be made adjustable in any convenient way, to a lever 367, fulcrumed at 369 on a bracket 371. The lever has a cam roller 373 running on the periphery of a cam 375 carried by a shaft 377. A spring 379 located at any convenient point serves to hold the cam roller against the cam and to retract the abutment roll 337. Cam 375 is so contoured that shaft 355 is oscillated at the proper intervals to advance the abutment rolls and hold the shell web 1 against the skiving wheels 331 at the proper intervals and for the proper time, to produce the beveled surfaces 4 adjacent to folding channels 3, as heretofore sufficiently described.

The grinding wheels 290 and 331 may be driven in any suitable way, for instance, directly or indirectly from shaft 61, but since it is usually desirable to drive these grinding wheels at high speed and it is inconvenient to provide geared-up driving devices, and since it is also desirable for other reasons to provide an independent drive for these wheels, they are preferably driven by an independent electric motor 381 mounted on a cross piece at the top of frame side members 324. The shaft of this motor has adjacent pulleys 383, one of which is connected by a belt 385 to a pulley 387 on grinder shaft 292, and the other pulley is connected by a belt 389 to a pulley 391 on shaft 333. In this way the grinders are driven at a desirable high speed in a convenient manner and the speed may, of course, be regulated by adjusting the speed of the motor.

The grinding wheels are desirably enclosed in a dust box 308 above referred to. This box has a top wall 393 located somewhat below the line of web travel and apertured to accommodate upper segments of the grinding wheels. These apertures admit a certain amount of air and other air openings 395 may be provided in side walls of the box. A pipe 397 is connected to the lower part of the box and this leads to the intake of an exhaust fan or blower 399, the discharge pipe 401 of which goes to any convenient point for disposal of the particles ground away from the shell web. The exhauster may be driven in any convenient way. In the present instance, it is driven by a chain 403 connecting it to a sprocket on grinder shaft 292.

Channel guides 405 are desirably provided, embracing the longitudinal edges of the shell web, and properly guiding it during the grinding operations and from the point where it leaves feed rolls 256 and 257 until it reaches the next pair of pressing or feed rolls, beyond the grinding position. These guide channels are conveniently located on top plate 393 of the dust box, and may be made laterally adjustable in any convenient way, not particularly shown. One function of these guides is to support the shell web with a certain freedom in the vertical direction, so that by reason of the natural flexibility of the web, it is easily brought and held in proper contact with the grinding wheels.

Beyond the grinding position the shell web passes between upper and lower rolls 407 and 409, which may, in some cases, serve merely as feed or tractor rolls and otherwise may serve also as pressing rolls to press other material in contact with the shell web. In the present specific arrangement of the machine a web 31 of suitable lining material is drawn from a roll 32 carried by a shaft 411, which runs in half-bearings 413 supported by frame brackets 415. The lining web may be any suitable material, usually paper of a suitable grade, and is applied to the under (inner) surface of the shell web when it is desired to produce a lined box or similar article. It may be remarked at this point that the use of such words as "Upper" and "Lower", or other words indicating the relative position of parts, and especially of materials employed in the assembly, are not intended necessarily as limitations, since evidently the machine can be arranged so that the grinding operations can be performed on the upper surface of the web, also the lining web when so provided might be applied to the upper surface of the web instead of the lower, depending upon the manner in which the individual blanks to be produced are handled in the folding operations, or other conditions not necessary to detail. Similarly, reference is made shortly below to the application of the cover web to the upper surface of the shell web, and this may be a preferred arrangement for many purposes; but evidently the arrangement can be reversed. It is considered unnecessary to further refer to such positional variations.

The lining web is conducted in any convenient way over roll 409 and pressed by it on the under face of the shell web. Prior to contact of the webs adhesive is supplied in any convenient way. In some cases, it may be applied to the under surface of the shell web, but in the present example, it is applied to the surface of the lining web, which is to come in contact with the shell web, by passing the lining web over a glue roll 417, which forms a part of a gluing unit 419 suspended from the frame side rails 51 and 52. The glue roll may be positively driven, as by a chain 421 from a shaft 423 which forms a part of the driving train of roll group 425, of which rolls 407 and 409 are a part. A presser roll 427 impelled by springs 429 may be applied to the upper surface of the lining web as it passes over the glue roll, and the web may then be conducted under a guide roll 431 and so to roll 409. Glue is applied to roll 417 by a dipper roll 433 running in a glue tank 435, and all of the rolls in the gluing unit, or any of them, may be positively driven by suitable gear connections to the glue roll shaft.

It is desirable in many cases to apply reinforcing material to the shell web, or to otherwise incorporate it in the continuous assembly. The lining web applied as above described, or at some other convenient point in the advance of the assembly materials, may be considered as a reinforcing, rather than as a mere lining or surface finishing material. Instead of a lining web the complete width of the shell web, one or more separate narrower strips may be arranged on a shaft and applied to the under surface of the shell web in a similar manner. The invention also provides for applying reinforcing material to the upper surface of the shell web and this may be done at any suitable or convenient point in the advance of the assembly materials. The reinforcements are not necessarily applied directly to the shell web, but in some cases may be applied in continuous or strip form to the cover web, later referred to, or additional reinforcements may be applied to the lining or surface finishing material.

In the present specific example, the reinforcements consist of separate strips of suitable reinforcing material, usually paper of suitable strength and thickness, which may in some cases be of the kind known as kraft paper. These reinforcing strips are, in the present instance, applied to the upper surface of the shell web in centered relation to the longitudinal fold lines or channels; or in other words, they overlap these channels on the opposite surface of the web and reinforce the web against strains incident to subsequent folding operations. The width of these strips may vary, but in the present instance, they are moderately wider than the folding channels and sufficiently wide to substantially overlap the skived surfaces 4, when these surfaces are formed in the shell. The separate reinforcing strips here shown, are in one aspect representative of a variety of relatively narrow reinforcing members, such for instance, as tapes or cords which may be substituted for paper strips in some instances. Many other variations in the reinforcing materials and means for suplying them will be understood without further detail explanation.

In the present embodiment of the invention, the paper reinforcing strips 33 are provided in the form of rolls 34 mounted on a shaft 437 which is carried in socket bearings 439 at the top of frame uprights 441. Gluing mechanism 443 is provided for each strip, comprising a glue roll 445, a dipper roll 447 and a glue trough 449, and moving parts of the gluing mechanism may be positively driven when desired, as for example, by a chain 451 connecting the dipper roll shaft to one of the shafts 377 of roll group 425, and by gears 453 connecting the dipper roll shaft to the shaft of glue roll 445. The reinforcing strips are passed over the glue roll and around and under pressing roll 407 which in this instance, presses and adhesively secures the reinforcing strips on the upper surface of the shell web at the same time that the lining web is pressed and secured to the lower surface of the shell.

In the further advance of the shell web or of the combined materials, they pass between an abutment roll 455 and an upper cooperating roll 457, which is arranged in this embodiment of the invention to prick or punch and transversely cut or slit the shell web or the combined materials. For this purpose the upper roll 457 (see Figs. 1A, 2A and 6), has sockets 459 in which pointed pricking blades 461 are inserted and secured by clamping plates 463 and locking screws 465, the points cooperating with abutment blocks 467 of hard metal inserted in the lower roll and secured by clamping screws 469. The pricking blades are also located and spaced peripherally of the upper roll so as to produce the pricks or holes 5 in the shell web (Fig. 7), and, of course, when reinforcing strips have been previously applied to the shell as above described, and as shown in Fig. 2A, the holes 5 will be punched through the reinforcing strips and the shell.

Cutting or slitting blades 471 are also inserted in sockets 473 in the upper roll and are secured by set screws 475. These blades cooperate with an abutment block 477 inserted in the lower roll and held by screws 479. Blades 471 are arranged to make the transverse cuts or slits 7, Fig. 7.

The web now passes through devices for forming the longitudinal cuts 9 and 10, Fig. 11. These devices consist (Figs. 8, 9 and 10) of upper discs 481 carried on a shaft 483, and cooperating lower discs 485 carried by a shaft 487. The lower discs have peripheral channels 489 formed between annular cutting discs 491 secured to disc 485 by screws 493, and the upper discs have cutter blades 495 of arcuate form, of suitable length for the length of cuts to be made, detachably secured to their faces, and arranged to cooperate with the annular channels of the lower discs to make the longitudinal cuts and produce the strips 11 and center pieces 8, which are to be removed from the shell. To prevent cutting across the ends of the center waste pieces 8, the cutter blades may be provided with indentations 497 which correspond to the break in the longitudinal cutting line 10 represented by the intersecting scrap piece 8. This arrangement is made as a matter of convenience, since it is easier to remove the waste members 8 and 11 as a single piece, than to handle small scraps which would be produced by cutting straight along the lines 10 and across the ends of the pieces 8. Strippers are desirably provided in cooperation with the lower channels 489, in the form of blades or fingers 499 carried by a cross bar 501 and inserted in the channels to clear the scrap strips 11 therefrom, as clearly indicated in Figure 8. Desirably, also, a yieldable scrap ejector 503 is located above the center line of the web between discs 481, and the end of this ejector bears on the central zone of the web, and as each of the center scrap members 8 is formed by the completion of the longitudinal cuts, the ejector presses this scrap piece down and ejects it from the web; so that by the combined action of the strippers and ejector the scraps are effectively cleared from the web.

The web then passes between upper and lower feed or tractor rolls 505. The rolls which constitute machine sections D, E, F, and also the tractor rolls 505, constitute the roll group 425, Fig. 2A, which is driven from the main longitudinal shaft 61 by one of the bevel gears 272 and short vertical shaft 276, the initial drive to the whole group being in this case, by means of one of the bevel gears 282, which is fixed on shaft 507 which carries the lower tractor roll 505; and the other shafts of the group are driven from the farther end of shaft 507 by a train of gears 509 at the right hand side of the machine. Since the shaft supports and general driving arrangement are substantially as in the group 254, it is unnecessary to further describe these details or refer to the shafts for each roll, except as above or hereafter specially mentioned.

The shell web, with or without additional materials, such as the lining web and reinforcing strips, now passes on to a point where the cover web is to be applied to it. If this cover web is to be applied directly to the shell web without preliminary treatment other than gluing, the point of application may, of course, be relatively near roll group 425. In the present embodiment of the machine, as shown in Figs. 1^A and 2^A, individual labels are to be applied to the cover web in positions corresponding to the individual composite blanks to be produced, and for this purpose the point of application of the cover web to the shell web is somewhat remote from roll group 425. It should be remarked here that in the broader aspect of the invention, the application of the shell facing or covering material in the form of a continuous strip or web, is only one representative method of applying covering material, since, as an alternative, as more fully explained hereafter, the cover material may be furnished in the form of individual sheets or blanks and these may be applied successively to the shell web in such fashion that the latter is continuously covered with suitable facing material.

Where a continuous cover web is to be employed, this web 13 of suitable facing or cover material, usually paper of suitable grade and quality depending upon the character or quality of boxes desired, is advanced from a roll 14 carried by a center shaft 511 which is mounted in vertical guide channels 513 in frame uprights 515, after the general fashion of the shell roll 2 previously described. The cover roll rests on a roller 517 carried by a shaft 519. Desirably a brake or tension device is provided, consisting of a brake band 521 cooperating with a drum 523 fixed on shaft 511. The brake band is provided with a lug 525 which fits in one of the vertical guide channels 513 to prevent rotation of the band and permit it to move along with the roll shaft as the latter drops in the guide channels. The free ends of the brake band are acted upon by a spring 527 in cooperation with a bolt 529 and adjusting nut 531, to apply suitable resistance to rotation of the cover roll and to prevent overrunning.

From supporting roll 517, the cover web passes angularly downward and horizontally under guide rolls 533 and 535 which direct it below gluing mechanism 537. This mechanism is for the purpose of applying spots of glue for the adhesive attachment of labels, one label on each glue spot, these label positions corresponding to one or more parts of each of the individual blanks to be produced from the continuous web or web assembly. The gluing mechanism comprises a glue roll 539 supplied by dipper roll 541, which takes glue from a trough 543, and a regulating roll 545 may be applied to the periphery of the dipper roll to regulate the amount of glue applied by it to the glue roll. Adjacent to the glue roll is an abutment roll 547, the main periphery of which is spaced away from the glue roll. On the abutment roll is a raised surface 549 corresponding to the area of the glue spot to be provided on the web. The gluing mechanism is driven by a chain 551 connecting a roll shaft 553 to abutment roll shaft 555, and the glue roll is positively connected to rotate at the same speed as the abutment roll by gears 557, and the dipper roll 541 and regulating roll 545 may also be driven by gear connections to the glue roll shaft.

From guide roll 535, the cover web passes up and around the abutment roll 547 between it and the glue roll, and in every rotation of the abutment roll the raised abutment surface 549 brings the cover web in contact with the glue roll to apply a "spot" or area of adhesive of suitable size and in the proper position on the web.

The web then passes over a guide roll 559 adjacent to the bottom of a stack 35 of blanks or labels 36 supported on a tilting base 561, which is pivotally mounted on a shaft 563. The base extends across substantially one-half of the stack bottom, and the stack is further supported and guided by uprights 565 secured to the base. The stack base is oscillated at proper intervals by an arm 567 secured to its shaft 563 and a link 569 connecting the arm to a lever 571 fulcrumed at 573 on a frame upright 575 and provided with a cam roller 577 engaging a cam 579 on a shaft 581. This shaft is driven by gear connection to a lower shaft 583 which is in turn driven by a chain 585 from shaft 553 previously mentioned, and the last named shaft is driven from the main drive shaft 61 by one of the short vertical shafts 276.

In every rotation of the shaft 581 its cam 579, through link 569, depresses stack base 561 and brings the projecting portion of the lowest blank in contact with the upper surface of the cover web as it passes over the supporting roll, the movement of the stack being timed so that the left hand edge of the blank as viewed in Fig. 1^A, is applied along the foremost margin of one of the glue spots on the web. Adhesion of the blank causes it to be drawn forward along with the web from the stack, and off of the base, and immediately the foremost edge of the blank is gripped under a presser roll 587 carried by arms 589 pivoted at 591 on frame brackets 593, and urged downward by springs 595. The tractive effect of the cover web together with the pressure of the gripper 587 then completes withdrawal of the blank from the stack, the blank being advanced with the cover web and pressed firmly on it by the pressure roll 587. Figure 1^A shows one of the applied blanks 36 advancing with the cover web. These blanks or labels are omitted in illustration of the assembly beyond this point, to avoid confusion in illustration.

The cover web now passes over a glue roll 597 forming a part of suitable gluing mechanism 599 which can be driven in any suitable way, for instance, by a chain 601 from shaft 581 previously mentioned. The under surface of the web is thus adhesively coated, and the web then passes under a roll 603 on shaft 581 previously mentioned, and is pressed in contact with the upper surface of the shell web, which passes over a cooperating pressure roll 605 on shaft 583. The cover web is usually of such width that when applied to the shell web, as described, margins 15 of the cover web extend beyond the shell web at each side. These margins are, of course, adhesively coated on the under surfaces and are to be subsequently folded around the shell edges and secured to margins of the under shell surface.

When it is not desired to apply labels to the cover web, the labeling mechanism may, of course, be omitted and the cover web may be led more directly from roll 14 over a suitable glue roll and applied to the shell web in the manner described.

The upper roll 603 may serve simply as a pressing and tractor roll, but otherwise, when it is desired to emboss the cover paper, this roll may be an embossing roll, as sufficiently indicated in Figure 2^A, and for that purpose its surface is suitably engraved or configurated to produce any suitable embossed or relief pattern upon the cover paper. This operation is facilitated by the fact that when the embossing action is performed, the cover paper rests on the shell material, which is supported by roll 605, and the shell affords a yielding or compressible medium for the formation of the embossed design by pressure of the embossing roll; and the cover paper is moreover somewhat moistened by the previously applied adhesive, which enables it to more readily take the pattern and the glue thereafter sets with considerable rapidity and retains or "fixes" the embossed design.

Shaft 553, above mentioned, which is connected to drive roll shafts 581 and 583 and the gluing mechanisms 537 and 599 in the manner described, is itself driven from shaft 61 by one of the short vertical shafts 276, as best shown in Fig. 2^A. Shaft 553 is directly connected by gears 607 to an upper shaft 609, and the two shafts carry web supporting and feed rolls 611 and 613 to support and properly advance the stretch of shell web between rolls 505 and 603 and 605.

Figs. 40, 41 and 42 show mechanism for applying separate or preformed cover sheets or blanks to the shell web, which may be substituted for the continuous cover web applying means shown in Figures 1^A and 2^A, by merely removing that mechanism and placing the side frame members 615 of the blank-applying mechanism, Figs. 40, 41 and 42, on the main frame side rails 51 and 52. This mechanism includes a carriage 617 arranged to reciprocate on ways 619 carried by side frame extensions 621. A lever 623 fulcrumed at 625 and provided with a cam roller 627, engaging a cam 629 on a shaft 631, is connected by a link 633 to a lug 635 projecting from carriage 617, and the link and cam arrangement may be duplicated, if desired, at the opposite side of the machine, as shown in Fig. 42. A spring 637 urges the carriage to move to the left, Fig. 40, and holds the cam roller on the cam; otherwise a double-acting cam arrangement may be provided. A stack base 639 is pivotally mounted on the carriage by means of a transverse shaft 641. A stack 37 of cover blanks 38, usually of rectangular outline, rests on the stack base with a portion of the stack projecting beyond the base edge 643, and the stack is guided by uprights 645 which may be made adjustable to suit the dimensions of the blanks. The guide members 645 which engage the free or rearward edges of the blanks may have an inturned lip or fingers 647 engaging under the free edge of the bottom blank, to support the free portions of the stack. Shaft 631 carries a cam 649 (and this may be duplicated near the other end of the shaft) engaging under side extension 651 of stack base 639, which project alongside the stack and terminate at 653. On shaft 631 below the stack, is a feed roll 655 which has a longitudinal channel 657, in which is inserted a suction fitting 659, including an air passage 661 and spaced surface apertures or suction cups 663. Any suitable connection, including a pipe 665, is provided for exhausting air at suitable intervals through the shaft center, with a suitable packed and swivel joint, or any other known or suitable exhausting arrangement as employed in suction devices of this character may be provided.

Adjacent to feed roll 655 and supported on a shaft 667 is a glue applying roll 669, and this is in contact with one of two glue-supply rolls 671 and 673 of resilient or compressible material, such as rubber or rubber composition, having their adjacent faces in contact along a substantially horizontal line. Glue is supplied to the space or trough formed by surfaces of these glue supply rolls above their contact line, by means of a valved spout 675 connected to a glue tank 677. The glue supply rolls are driven positively (by means referred to below) in the direction of the arrows, or so that their meeting faces move downward, and preferably, one roll is driven faster than the other to provide a rubbing, as well as a squeezing action. By the described arrangement, a puddle or mound 679 of glue is maintained upon the roll surface above their contact line, excess of glue running off at the ends of the rolls and being caught in a trough 681. A film of glue is thus applied to roll 671, this film being uniformly regulated and distributed by the squeezing action of the rolls, and also by the rubbing action provided by the differential speeds. This glue film is transferred to the glue applying roll 669. A gripper roll 683 is arranged to cooperate with the large feed roll 655, and is carried on a shaft 685 supported in arms 687 pivotally mounted at the axis of glue roll 669, and yieldable pressure is supplied by springs 689.

In advance of the glue supply rolls 671 and 673, are upper and lower feed or traction rolls 691 and 693, carried by shafts 695 and 697, and shaft 697 may be driven by one of the short vertical shafts 276, as sufficiently explained above. An abutment roll 699 mounted on shaft 701 cooperates with the large feed roll, and the abutment roll may be driven by a chain 703 from shaft 697. The other rolls or roll shafts in the group, for instance, the shafts of the glue-supply rolls, the glue applying roll and the large upper feed roll, may be driven by gear connections from shaft 631, as sufficiently indicated in Figure 42.

In the position of parts shown in Fig. 40, stack base 639 is held in raised position by cam 649, the lower blank in the stack has been seized by the suction cups on feed roll 655, and the edge of the sheet has been gripped between the large feed roll and the co-operating gripper roll 683, and the sheet is being carried around on the large feed roll, and pulled out from the bottom of the stack. At about the position shown in Fig. 40, suction is cut off from the suction fitting. As the blank continues to move around the large feed roll, the carriage with the stack holder is moved to the right by cam 629. As the blank passes the glue roll, glue is applied to its outer surface, and the blank is then rolled upon the advancing shell web and pressed thereon by the large feed roll and abutment roll. When the rear edge of a blank is about clear of the stack, and has reached substantially the position shown in Fig. 41, the abrupt shoulder of cam 649 passes from under the end of 653 of stack base extension 651, and the end of this extension drops into the cam depression 650 as shown in Fig. 41, bringing the left-hand margin of the lower blank in contact with the suction cups 663 on the feed roll 665, and suction is applied to grip the blank. Concurrently with these operations the blank carriage commences to move to the left under the influence of spring 637, as controlled by cam 629 or in other words, the blank is moved along with the continuously moving periphery of the feed roll. Shortly thereafter the stack base is elevated by cam 649, and at or just before this time, the left hand edge of the blank is pulled away from the supporting lip or fingers 647, and is carried under the gripper roll. The movements are so timed that the forward edge of each blank is applied to the large feed rolls close alongside the rear edge of the preceding blank, with little or no intervening space, and a continuous succession of glued cover blanks is thus advanced by the feed roll and applied to the shell web directly, or over any reinforcing web or strips that may previously have been placed thereon, as sufficiently described above.

The lines of intersection of the successive cover blanks are so arranged as to agree approximately or absolutely with the division lines of the successive individual blanks to be produced from the continuous assembly, or, in other words, the blanks are cut off from the continuous web along lines which agree exactly or approximately with the intersections of the cover sheets. In this way any slight variation in the matching or approximate contiguity of the cover blanks is of little or no consequence, for the reason that slight variations in the blank margins will not be apparent in the finished boxes, since these margins in many cases form inturned parts of the completed box structure, which are either invisible or not easily noticed.

When this separate cover blank feed mechanism is used instead of the continuous cover web supplying mechanism, it will be evident that while the operation is not continuous in respect to the nature of the material to the advancing shell web is substantially continuous and does not necessarily involve any pause or intermittent movement of the main web or continuous assembly.

At a suitable point in the progress of the materials, means may be provided to moisten the shell web along the longitudinal fold lines. It is desirable to place this moistening means at a point relatively near the place where the individual blanks are produced by severing the web, so that the shell material will remain moist until it is folded. It is, however, unnecessary to arrange the moistening means immediately at or adjacent the point where the individual blanks are severed, since the web progresses rapidly through the machine and there is no considerable opportunity for moisture to dry out to an undue extent after it is applied, if the moistening means is arranged at any reasonable point in the advance of the cut-off and folding positions. In the present example, the moistening means is located at the station or section I, just beyond the embossing or pressing roll station H, and consists of two parallel series of moistening rolls 705 carried by shafts 707, with upper abutments or pressing rolls 709 carried by shafts 711. Each moistening roll consists of plates 713 secured together and retaining between them discs 715 of felt or similar absorptive material, these discs being arranged to run in a water tank 717 supported on the side frame members. The faces of the moistening rolls are usually wide enough, as shown in Fig. 14, to moisten the shell material in strips or zones which are substantially wider than the fold channels. The moistening means may be employed or dispensed with in accordance with the nature of the shell material, or the character of the fold lines, or of the fold to be produced.

At a suitable point beyond the point of cover web application, the projecting cover margins 15 are folded over and secured to under marginal surfaces of the shell. In the present embodiment of the invention, stationary folders 719 are provided for this purpose, Figs. 1$^B$, 2$^B$ and 14. The web then runs between pressing and driving or traction rolls 721 and 723 to press the folded margins in position.

Transverse fold lines or creases 16 are formed in the continuous assembly at a suitable point in its progress, and desirably these formations are made after the cover margins are turned and secured, since in most cases the transverse fold lines, or some of them, run to the edges of the blank and should include the folded-over cover margins. To produce two fold lines for each blank, for the type of blanks shown in Fig. 18, a single pair of fold-line-producing instrumentalities or rolls 725 and 727, as shown at station K, is sufficient, since the spacing of the fold lines may usually be so arranged that the actual scoring or creasing devices may be properly arranged on a single pair of rolls or equivalent instrumentalities. Where more than two transverse fold lines are formed for each individual blank to be produced, for instance, where there are two long fold lines 16 and two short central fold lines 29 to define end wing extensions 30, as sufficiently shown and heretofore explained in connection with Fig. 18$^A$, two sets of fold-line-producing instrumentalities will usually be provided, the actual scoring or creasing devices on the respective instrumentalities or pairs of creasing rolls being arranged to produce the long and short fold lines in the desired manner and arrangement.

While the nature of the transverse fold lines may vary, and in some cases they may be merely score lines produced by blades, such as the blades employed on roll 457 heretofore described, but adjusted to form merely an indentation or crease, instead of a complete severing operation, it is usually preferable to provide an actual crease of the nature that I described as a "crimp crease", to facilitate the operations of the automatic folding mechanism, and to produce satisfactory fold or corner formations in the completed box part.

For this purpose the fold line producing means are actually cooperating creasing rolls, as shown in Figs. 16 and 17. The upper roll structure 725 is carried by a shaft 729 forming a part of roll group 731, Fig. 2$^B$, and the lower creasing structure 727 is carried by a shaft 733, the shafts being positively driven by a gear train 735 from shaft 737 of the lower feed and pressing roll 723 previously mentioned, which is in turn driven from shaft 61 by a short vertical shaft 276, substantially as in the case of the other roll groups. The upper creasing structure comprises heads 739 connected to rotate with the shaft by keys and adjustable longitudinally, and secured in adjusted position by set screws 741, in order to adapt the creasers to webs of different widths. Between the heads 739, two bars 743 are provided, each of these having a portion 745 resting against head flanges 749, and held by screws 751 passing through elongated slots 753 in the head flanges, so that the bars may be set in different angular positions on the shaft and so secured. Each bar has in its outer face a longitudinal channel 755, and in the channel is located a creasing abutment, which consists of outer plates 757 and a central plate or blade 759 located between them. The outer plates have bevel faces 761, sloping inward to a point where they meet the center blade, whose edge projects in the angle formed by the outer plate faces to an extent which may be regulated by set screws 763, the heads of which are accommodated in sockets 765 in the bar, and secured in adjusted positions by lock nuts 767. The abutment plates 757 are then clamped tightly on the center blade by set screws 769.

The lower creasing roll structure comprises main bars 771 of generally similar construction and arrangement to the upper bars, and adjustably secured to heads 773 in a similar way. Centrally located in the outer face of each bar 771 is a channel 775 accommodating a spreader bar 777, cooperating with creaser bars 779 of generally rhomboidal cross-section. One of the acute-angled edges 781 of each creasing bar is located in a substantially V-shaped socket 783 adjacent to the central socket, and the diagonally-opposite actuate-angled edge 785 acts as a creasing element, in cooperating with the abutment elements previously described. The creasing blades 779 are held by springs 787 against the spreader bar, which is normally urged outward to separate the active edges of the creasing blades by springs 789 located in sockets 775 in the main bar, and the outward movement of the spreader bar is limited by studs 791 provided with adjusting nuts 793 located in recesses 795 in the main bar.

Just before the cooperating creasing elements approach the position shown in Fig. 17, the spreader is in its outward position and serves to separate creasing edges 785. As the cooperating elements reach the position shown in Fig. 17, the creasing edges engage the composite blank materials and converge by cooperation with beveled outer faces 761 of plates 757, and squeeze the materials against the central abutment blade 759, with accompanying gathering or breaking down to a certain extent of the fibrous shell material, to form a well-fixed and definite crease of substantial width, and having decided convexity at the lower side of the continuous assembly, and a corresponding concavity at the upper side. These operations are then repeated for the next transverse crease, and when additional creases such as the short creases, Fig. 18ᴬ, are to be provided, another cooperating set of creasing elements may be provided. In such cases it is usually impracticable to place the creasing elements for forming the closely-adjacent short creases on the same pair of rotary creasing instrumentalities and therefore each pair of creasing roll structures will usually be arranged to make one long crease adjacent to one end of an individual blank which is subsequently to be severed from the continuous assembly, and one short crease on the adjacent end of the next blank; and the other pair of rotary creasing instrumentalities will be arranged to make the short crease on the first named blank; and the other pair of rotary creasing instrumentalities will be arranged to make the short crease on the first named blank, and the long crease on the succeeding blank, these operations being, of course, repeated adjacent to each point of individual blank intersection. Other arrangements of creasing devices may be made as will be sufficiently understood by skilled persons, in view of the preceding example.

The web now passes over rotary slitting discs 797 carried by a shaft 799, Figs. 1ᴮ, 2ᴮ, 19 and 20, and adjustable longitudinally of the shaft, which is screw threaded for that purpose, each cutter disc being held between washers 801 and nuts 803, engaging the screw thread. Above the web at this point, is an abutment roll 805 carried by a shaft 807, and on this roll are arc shaped cutting abutment segments 809, which depress the web materials to bring the peripheries of the cutters in engagement with the cover material overlying the longitudinal slots 11 previously formed in shell web 1 and to sever the cover material, producing the slots 17, Fig. 21. For certain classes of boxes in which it is not necessary to completely cover the edges of the shell adjacent to the longitudinal severing lines 17, the slotting of the shell previous to application of the cover web may be omitted, and the slitters may then be arranged to cut through the combined shell and cover material, or where it is desired to form slots similar to the slots 11, but including both shell and cover material, slotting instrumentalities, such as the punching or slotting rolls 457 and 481 at stations E and F, or the slotting rolls at station F alone, may be inserted at station L in lieu of the slitters, and in that case the slots may be formed in the combined materials.

To properly support and advance the continuous assembly between stations L and N, Figs. 1ᴮ and 2ᴮ, a supporting and feed roll 811 is provided, carried by a shaft 813 which is arranged at the initial driving member of the roll group 815, and is itself driven by one of the short vertical shafts 276 from longitudinal driving shaft 61. A pressure roll 817 carried by arms 819 pivoted at 821 holds the web in contact with the supporting roll and provides sufficient traction or driving effect to properly advance the web to the transverse cutting or severing devices at station N.

The continuous web now passes beneath the abutment roll 823 (Fig. 22) and over the transverse cutting or severing roll 825 provided with blades 827 and 828 arranged to produce the transverse cuts or severing lines 26 and 27, Fig. 23. The cutters may be arranged in almost any desired fashion by providing the face of the cutter roll with a longitudinal recess 829 and arranging the cutters between spacing bars 831 and clamping bars 833, which may be locked in position by set screws 835. A central cutter blade 828 may be arranged to merely sever the cover paper overlying the central shell openings, these cuts being indicated by the line 26, Fig. 23, and other blades 827 may be arranged to sever the combined materials on the parallel lines 27 extending from the longitudinal fold lines 3 to the outer edges of the assembly. In that case scrap pieces 28 which are t be subsequently removed, are defined by the lines 17 and 27. In the case of a continuous blank, such as shown in Fig. 18ᴬ, the central cutter will sever the combined shell and cover material along the line 26ᵃ, and outer blank portions may be severed along the parallel lines 27. As an alternative, in either general type of continuous blank, the combined materials may be severed by a single transverse cut at the point indicated by the line 26, Fig. 23, this cut in such a case extending straight across the composite web. These variations are dependent on the type or dimensions of the box to be produced.

Where the transverse cutting or severing operations produce scrap pieces such as 28, a scrap breaker or ejector is desirably provided, (see Fig. 25), which consists of an upper roll 837 having lugs or cam like projections 839 arranged to strike the scrap pieces as they advance and depress them into pockets or sockets 841 formed in a lower roll 843. These sockets may actually be formed in separate blocks 845 detachably secured to the ends of the central roll 843. The edges of the blocks which define the sockets may be spaced so that the scraps depressed into the sockets by the projections 839 will fall out at the next half revolution of roll shaft 847.

The central portion of the roll structure on shaft 847, that is the roll body 843, may be arranged as a printing roll to imprint suitable indicia on the inner (under) surface of the shell or of the lining web. Figure 24 sufficiently illustrates suitable printing mechanism including a raised printing surface 849 formed on the roll body 843 and bearing the desired indicia, ink applying rolls 851, an ink transfer roll 853 driven from shaft 847 by a cam, and link and bell crank mechanism 857. The transfer roll intermittently engages with a main ink roll 859 running in contact with a body of ink in a trough 861, and driven by any known or suitable ratchet mechanism, as sufficiently indicated by the annular ratchet 863 shown in dotted lines. The inking surface may be arranged to print repetitiously on areas of the shell or lining surface, corresponding to certain portions or areas of the inner surface of the completed box. Other arrangements of the printing surface may be made, as will be sufficiently obvious without detail explanation.

The printing mechanism may, in some cases, be arranged at other points along the path of the shell web or the continuous assembly.

The operation of coating one surface of the continuous cover web, or of each successive cover sheet when separate cover sheets are used, provides the entire adhesive supply necessary for securing the cover material to the shell web, including the securing of the projecting cover margins when they are folded about the edges of the shell, and in the case of a pre-punched shell web, also provides adhesive on the cover margins 25 projecting at the outer ends of the end wings of the individual blanks, Fig. 23ᴬ, and in some kinds of boxes the adhesive on these cover margins is sufficient, when the end portions of the blank are folded as hereafter described, to retain the end structure in proper form. It is usually desirable, however, and necessary in many cases, to provide additional adhesive to secure together adjacent faces of the corner laps and end wings when the blank end structure is folded, and for reasons incident to the continuous assembly production, and the manner of advancing the individual blanks to the folding mechanism, and also on account of the nature and mode of operation of the preferred folding devices, it is preferred to apply this additional adhesive on the inner (under) faces of the end wings 21, the application being, of course, to the lining paper when a lining has been applied to the shell, otherwise the adhesive is applied to the shell surface and in the type of blanks shown in Fig. 18ᴬ, adhesive is at the same time applied to the inner (under) surfaces of the end wing extensions 30 to provide for the adhesion of these members to inner surfaces of the corner laps in the folding operation. While this adhesive application may be made at different points of assembly travel, it is more convenient to apply it as the last operation of the continuous assembly producing and individual blank forming mechanism. This adhesive applying mechanism, which may also be referred to as spot gluing means, is therefore arranged in the present embodiment of the invention at the station P, Figs. 1ᴮ, 1ᶜ, 2ᴮ and 39.

A glue-printing or stencil roll 865 is arranged below the line of blank advance on a shaft 867 and is provided with a raised glue printing surface 869 of proper shape and area to coat all or desired portions of the inner (under) surface of each end wing, including the end wing extensions 30 of blanks shown in Fig. 18ᴬ, and when desired the under surface of the projecting cover wing margins 25 of the blanks shown in Fig. 23ᴬ, may also be recoated at this point. An upper abutment roll 871 carried by a shaft 873 holds the blank in proper contact with the raised glue printing surface. Glue is supplied to the surface 869 by any suitable gluing mechanism including, in the present structure, a glue-applying roll 875 carried by a shaft 877 mounted in bearings in a swinging gluer frame comprising the plates 879 pivoted on a fixed axis at 881. The glue applying roll is properly positioned for application of glue to the glue printing surface 869 by adjustment of the swinging gluer frame about its axis, this adjustment being effected by stub shafts 883 rotatably mounted in brackets secured to or formed as parts of side frame members 887, and provided with eccentric pins 889, engaging sockets 891 formed in the upper ends of side plates 879. The stub shafts are also provided with heads 893, lying against outer faces of the brackets 885, and screws 895 pass through arc-shaped slots 897 in the adjusting heads, so that when these heads are rotated to properly position the glue applying roll, the adjustment may be fixed by setting up the screws. A glue transfer roll 899 runs in the glue trough 901 and is carried by arms 903 pivoted at 905 on side plates 879, and screws 907 passing through the lower ends of the side plates bear against lugs 909 on the arms and serve to bring the transfer roll in proper contact with the glue applying roll 875.

It is desirable to provide means to insure the proper straight advance of the individual blanks after they are severed at station N.

For this purpose channel guides 911 are provided, supported and adjusted in any convenient way, for instance, on transverse rods 913, Fig. 2ᴮ. These channel guides have flanges engaging above and below the longitudinal edges of the blanks and also direct the blanks for the proper straight line movement to the conveying devices which transfer them to the folding mechanism.

In the broader aspect of the invention any suitable folding mechanism may be provided, but new and peculiar problems are involved in properly handling, advancing and folding box blanks produced in the manner described and having the described characteristics. The end structures of preferred types of boxes to be produced by the machine, are such that it is probably impracticable to fold and secure these end structures while the blanks are in continuous movement. The folding mechanism in the present particular embodiment is therefore devised so that different operations are performed on the blanks at a plurality of different stations, and the blanks are brought to rest temporarily for brief fractions of time at some of these stations, and the blanks are also moved in a somewhat irregular or circuitous course, as distinguished from mere straight line movement; but the progress of the blanks through the folding mechanism is nevertheless rapid, and in effect practically constant, since there are only a few actual pauses in the blank progress, and these pauses occupy only a part of the total time required in the folding operations.

In some cases a single folding mechanism may be provided to take care of the blank output of the main assembly-forming mechanism, and when the complete machine is so arranged, it will produce a large number of finished boxes in a given time, and on a very economical production basis. The general nature and organization of the folding mechanism in the present embodiment is such, however, that it is usually undesirable or impracticable to run it at a speed equivalent to the speed at which the assembly producing section of the machine can easily be run, and therefore the folding mechanism is usually constructed or arranged as here shown, substantially in duplicate, each main folding section including complete folding apparatus for manipulating one-half of the blank output of the web forming section, and the successive blanks are therefore advanced, fed or transferred alternately to the two folding mechanisms which, therefore, operating at practically one-half the blank producing rate of the web forming section can properly handle and fold the blanks and turn out finished boxes at a rate equal to the desired high speed travel of the materials through the web forming section.

While the two folding sections are, as just stated, mainly duplicates of each other, so far as the actual folding instrumentalities are concerned, one of the sections may have additional parts, such especially as certain driving means or connections, so that that section is initially driven from the web forming part of the machine and is in turn connected to the other folding section to drive the latter.

The provision of two folding mechanisms will usually be sufficient to properly care for the maximum blank product of the web section, but in the broader aspect of the invention it is not limited to the employment of two of these folding mechanisms, and any suitable plurality may be provided, with appropriate modifications in the blank handling or distributing mechanism.

In the preferred embodiment of the invention, therefore, the folding mechanism, as shown generaly in Figs. 1ᶜ, 2ᶜ, 27 and 28, consists of the two main sections R¹ and R², Fig. 2ᶜ, which are as to their main essentials practically duplicates, each section including complete devices for handling, advancing and folding succesive blanks in entirely automatic fashion. One of the sections, such as R¹, however, usually includes additional paits such as driving connections for it and the other section from the web forming part of the machine. Blank feeding mechanism Q, Figs. 1ᶜ and 2ᶜ, is also provided, to advance the successive blanks rapidly from the main web forming and blank producing section of the machine, and lateral blank transfer mechanism S is also provided for shifting successive blanks laterally, alternately to the two folding sections, these mechanisms Q and S being common to the two folding mechanisms.

Each folding section R¹ and R² is built on and about a frame comprising a table 920 supported by side plates or uprights 922 and 924 connected by various cross pieces including tie bars 926 and 928, and a rear cross frame member 930. The two folder frames are connected at their forward ends by a box frame 932 which also serves to connect the folder frames to the rear end of the assembly forming section, as best shown in Figs. 1ᶜ and 39. All moving parts of the folder R¹ except for certain incidental blank feed devices as explained hereafter, are driven from the assembly producing section in the following way: Near its rear end, longitudinal drive shaft 61 of the assembly forming section carries a gear 934 engaging an adjustable idler gear 936, which meshes with a gear 938 on a shaft 940, gear 934 being one-half the diameter of gear 938 to provide for driving the folding mechainsm at one-half the speed of the web forming section. Shaft 940 is supported in a bearing 942 and 944 in box frame 932. Parallel with shaft 940 in the same horizontal plane and behind it, as viewed in Fig. 39, is a shaft 946 supported in a bearing 948 in the box frame and another bearing 950 connected to a side frame member 924 of folding unit R¹. Shaft 940 is connected to shaft 946 by gears 941 and 947 of the same diameter. At its rear end shaft 946 has a bevel gear 952 engaging a similar gear 954 on a short transverse shaft 956, and this shaft also has a pinion 958 engaging a gear 960 of twice its diameter on a transverse cam shaft 962. Arranged parallel to shaft 962 are two other cam shafts 964 and 966 driven from gear 960 by gears 968 and 970 respectively, of the same size. The cam shafts are arranged to drive most of the moving parts of the folding mechanism proper, and each shaft makes one revolution for each operation or series of operations performed on any one blank by mechanism controlled by it. The described driving connections therefore are such that each of the cam shafts makes one-quarter revolution for each revolution of shaft 61 of the assembly forming mechanism, or one-half turn for each two turns of shaft 61, which correspond to the production of one blank; and since the blanks are diverted alternately to the two folding mechanisms, this provides for the desired complete rotation of each cam shaft for each blank supplied to the folding mechanism of which it forms a part.

The folding section R² includes cam shafts arranged in line with those of section R¹ and similarly numbered, and adapted for convenient coupling to the shafts of section R¹ when the other section is positioned against it and secured in the manner described, these connections including flanges 972 secured to the shafts of of section R² and bolted to the gears 960, 968 and 970 respectively, of the corresponding shafts of section R¹, as sufficiently shown in Fig. 27.

In cases where it is desired to operate only a single folding mechanism in connection with the web forming mechanism, section R¹ may be employed, and in that case its primary drive shaft 940 would be driven at the same speed as shaft 61 by substitution of other gears for the gears 934 and 936, and the web forming mechanism would then be driven at a blank producing speed within the capacity of the folding mechanism.

In line with the advancing continuous assembly and the individual blanks cut therefrom and glued at station P, is blank feed mechanism Q for properly grasping and rapidly advancing the individual blanks to a point where they may be diverted alternately to the two folding mechanisms. This feed or longitudinal blank transfer mechanism comprises a shaft 974 revolubly mounted in frame brackets 976 and carrying feed rolls 978. Above shaft 974 is another shaft 980, which may be fixedly mounted in the frame brackets and carries or positions loose rolls 982 whose shaft apertures are larger than the shaft, to permit eccentric positioning of the rolls, which are not positively driven, but bear by their weight on the advancing blank and advance it by frictional engagement with the lower rolls 978, which are positively driven as presently explained. Beyond the vertical plane of roll shafts 974 and 980, an upper roll shaft 984 is mounted in fixed bearings in the frame brackets 976, and feed rolls 986 are secured on this shaft. Below shaft 984 is a shaft 988 carried in bearings in arms 990 which are pivotally mounted on or about the axis of shaft 974. Rolls 989 are fixed on shaft 988. A cross bar 992 has its ends pivotally connected to lugs formd at the rear ends of arms 990. Springs 994 are compressed between fixed abutments and the under sides of arms 990 to normally elevate shaft 988 and its rolls and grip the blanks against the upper rolls 986. The lower rolls are periodically retracted by a link 996 connected to the center of cross bar 992 and also connected to a lever 998 fulcrumed in the box frame 932 at 1000, Figs. 1ᶜ and 26. The lever has a cam roller 1002 which engages the periphery of a cam 1004 secured on shaft 946, which makes one turn for each blank produced by the blank forming mechanism, and is contoured so that the lower roll shaft 988 is retracted as the foremost part of a blank passes between the upper and lower rolls 986 and 989, and the movable shaft is then permitted to rise under the influence of springs 994 and the blank is gripped between the positive feed rolls at about the moment that its rear edge leaves the gluing rolls at station P, and advances to a proper position in relation to the lateral blank transfer mechanism, and then shaft 988 is again retracted before the next blank advances, and so on. Upper roll shaft 984 is driven at a relatively high speed to rapidly advance the blanks to the lateral transfer mechanism, by a vertical shaft 1006 connected to shaft 940 by small and large spiral gears 1008 and 1010, and connected at its upper end to shaft 984 by spiral gears 1012. The corresponding lower roll shaft is connected to the upper shaft by spur gears 1014 and the gear teeth remain in mesh during the slight vertical movement of the shaft. Roll shaft 974 is driven from shaft 988 by an idler gear 1016 on one of the arms 990. The upper and lower rolls 982 and 978, and also the rolls 986 and 989 are arranged as clearly shown in the plan view, Fig. 2ᶜ, so that they engage only the outer or side wing and corner lap portions of the blanks, and do not come in contact with the glue applied to end wing surfaces at station P.

Each advancing blank first passes over the lower rolls 978 and is held on them with considerable friction effect by the loose upper rolls 982, the lower rolls running at high speed to exert a considerable friction pull on the blank and insure its proper movement to the positively driven upper and lower rolls 986 and 989, which grip the blank after it is free from the gluing mechanism as above explained, and rapidly advance it against a vertical end stop 1018, Fig. 2$^c$, arranged to engage the ends of either the blank end wing or of the corner laps, depending on the nature of the blank. Side guide members 1020 may also be provided to locate the blank laterally. The blank comes in at an upper level indicated by dotted lines 39, at Fig. 39, and settles down below the level of the stop 1018 and side guides 1020, ready for lateral transfer.

The lateral transfer mechanism comprises transverse rails 1022 on which the blank rests after it settles below the stop and guides, as just above stated. Two parallel transfer chains 1024 pass about sprockets 1026 on longitudinal shafts 1028 and 1030, with the upper stretches of the chains arranged to move below the guide rails. In the same relative position on each of the chains is connected a blank pusher 1032. These pushers have heads 1034 with a blank engaging lip or flange 1036 at each end. The upper portions of the pusher heads are arranged to travel above the level of rails 1022 during the major part of their movement. The chains are driven so that pusher heads are simultaneously moved to and fro, with a pause at each end of their movement, by a pinion 1038 on the extended end of one of the sprocket shafts such as 1028. This pinion engages a vertical rack 1040 directed by guides 1042. A link 1044 is pivotally connected to the lower end of the rack and is also connected to a lever 1046 fulcrumed on a stud 1048 secured to a lower part of one of the side frame members 924. On the lever is a cam roller 1050 engaging a cam track in one side of a cam body 1052 on shaft 962.

As a blank is rapidly advanced by the feed rolls 986 and 989, the pusher heads 1034 are either in the position shown in Fig. 26 or else at the opposite end of their travel, and at rest. One edge of the blank runs in under the lips or flanges 1036 at corresponding ends of both pusher heads. As the blank strikes stop 1018 and settles, the pushers begin to move, to the left in the particular instance shown in Fig. 26, and the blank is pushed over the rails and over one of the stationary shoes or folding heads 1054 and against vertical stops 1056 carried by frame brackets 1058, against which a longitudinal edge of one of the blank side wings is located to properly position the blank upon the folding head. Another blank is then brought over rails 1022 and against stop 1018, the chains are moved in the opposite direction, and a blank is properly located over the other folding head 1054. Fig. 26 shows a blank positioned properly over the folding head of folding section R$^1$, and the pushers are about to advance to place a blank over the similar folding head of section R$^2$.

Each of the folding heads 1054 is supported on a pedestal or upright bracket 1060 resting on table 920. It has angular, downwardly converging longitudinal faces 1062, and folder or breaker blades 1064 are secured to these faces with their upper edges projecting slightly above the upper face of the head. This fixed folding head or abutment may otherwise be designated as a side wing folding form or breaker form, since the operation of folding down the side wings and forming the longitudinal corners of the box may be considered or described as a breaking operation, although, of course, the box material is not actually broken, but is only bent down or formed to properly produce the crease fold or box corner formation and also to properly position the side wings and their connected corner laps for the further advance and handling of the blank in subsequent folding operations.

Cooperating with the fixed form are folder or breaker bars 1066 normally located above and near opposite sides of the form. Each of these bars is connected to the lower end of a lever 1068, in such a way that the under and inner faces of the bars confronting the blank are straight and smooth. Levers 1068 are pivotally mounted on pins 1070 secured in blocks 1072 and these blocks are pivotally mounted on studs 1074, secured in the lower ends of arms 1076, and the arms are located for adjustment, longitudinally on rock shafts 1078 and 1080, being secured to rotate with the shafts by keys or splines 1082, and secured in adjusted position by set screws 1084. Levers 1068 have upper arms 1086 located close to lugs 1088 on blocks 1072, and springs 1090 guided by spring bolts 1092 act on the levers to urge the breaker or folder bars 1066 inward, this movement being limited by nuts 1094 on the outer ends of the spring bolts.

At the forward end of each folding bar 1066 is a blank pusher, comprising an arm 1096 secured to the bar and having an offset or rearwardly extending pusher face 1098, spaced away from the bar, thus providing a space above the pusher face to accommodate the blank end wings when the pushers move down to active position, and also to accommodate end portions of the blank as it moves in place against the stops 1056, before the folding movement of the bars commences. Arms 1076 which carry the bars are sufficiently connected, to move always in parallel positions, by the bars themselves or otherwise, if necessary, shafts 1078 and 1080 may be connected by gears or a suitable linkage to preserve the desired parallel movement. The shafts are simultaneously oscillated by a pinion 1100 secured on one of the shafts, such as 1080, and a vertical rack bar 1102 engaging the pinion and moving in vertical guides 1104. A link 1106 is connected to the lower end of the rack bar 1102, and also to one arm of a bell crank lever 1108 mounted to oscillate on the transverse tie bar 926 and provided with a cam roller 1110 engaging a cam track in one face of a cam body 1112 fixed on cam shaft 962.

After the blank has been positioned as described upon the folder or breaker form 1054, the cam, lever and rack mechanism oscillates shafts 1078 and 1080 simultaneously, bringing the bars 1066 down upon the upper surfaces of the blank side wing and corner lap structure adjacent to the longitudinal fold lines 3, which lie directly above the upper ends of the folder plates 1064. The side wing structure is thus bent down and creased over the folding plates, the bars yielding outward by movement of their levers as they pass the edges of the folding plates, and then the blank side wing structure is folded in at a considerable angle to its normal vertical or right-angle position, as shown at the left in Fig. 26. At the same time that the folding bars move downward they swing forward, and as the side wings are turned down the pusher faces 1098 encounter rear ends of the down turned corner laps, and the blank is pushed forward over the breaker head. The side wings are folded beyond the normal right angle position in order to fully break or form the folding lines. The folding bars then swing back and up to normal elevated position, as the blank moves onward through fold-creasing rollers.

Cooperating upper and lower fold creasing and feed rolls 1114 and 1116 are arranged in line with the blank at each side thereof. The two upper rolls are carried by a shaft 1118 mounted in bearings 1120 and 1122 and driven by a chain 1124, and a sprocket 1126 on the outer end of cam shaft 962. The lower rolls are carried by short shafts 1128 running in bearings 1130 and driven from the upper shaft by gears 1132. Each upper roll has a cylindrical portion 1134 adjacent to an outer flange 1136, which overlaps a flange 1138 on the corresponding lower roll 1116, the last named flange having a rounded peripheral surface 1140. The roll and flange arrangement is such, as best shown in Fig. 27$^A$, that as the blank advances with the side wings turned angularly inward, as above described, the longitudinal box creases or corners are squeezed and fully formed or set by the action of the rolls. The rolls act also as driving elements to advance the blank to the next position.

The blank now passes over a straightening shoe 1142, the forward end 1144 of which extends between the lower fold-creasing rolls 1116. The shoe is supported on a block 1146 secured to table 920, this block being the fixed or abutment block of toggle mechanism hereafter referred to. At a point beyond its forward end 1144, the sides 1148 of the straightening shoe are approximately vertical and are spaced apart sufficiently to straighten out the side wings of the blank to approximately vertical or right angle position in relation to the blank body portion 19. As the blank moves over the rearward part of the straightening shoe, the lower edges of the corner laps and side wings rest on lateral flanges 1150 to support the blank with its body portion somewhat above the level of the shoe top.

The blank is now grasped and advanced by pairs of cooperating feed rolls 1152 and 1154 shortly to be described, until checked by contact of the forward edges of the corner laps at the foremost end of the blanks with stops 1156, in the proper position upon a stationary former 1158 mounted on a pedestal 1160 secured to the table. As the blank comes into position on the former, the lower edges of the side wings run on horizontal rails 1162 having vertical outer flanges 1164. The rails are supported on rods 1166 by light springs 1168 located in housings 1170, and the blank is thus yieldably supported so that its upper or body portion is spaced above the top of the former. The end wings extend horizontally at each end of the body portion, the side wings are turned down vertically or at right angles to the body portion, and the corner laps extend in the same vertical planes as the end wings. The blank end portions are now to be acted upon by end-folding mechanism which completes the end formation of the box.

This mechanism includes end folding or forming heads 1172, one located normally above and near each end of the former. Each head, is arranged substantially as a part of a vertically movable frame comprising vertical bars 1174 to the upper ends of which the head is connected. Bars 1174 move in guides 1176. The outer portion 1178 of each head is of reduced width (Fig. 2$^c$), and the outer face of this portion is arranged to cooperate with a pressing block 1180 which is the movable member of the toggle mechanism above and hereafter referred to. The lower ends of vertical bars 1174 are connected by a cross piece 1182, and a link 1184 is pivotally connected to this cross piece and is also connected to a lever 1186 fulcrumed on tie bar 926, and provided with a cam roller 1188, engaging a cam track in one face of cam body 1052 previously mentioned. The cam is designed to impart the necessary vertical movements and dwells to the frame and folding head, and the arrangement of link 1184 also permits necessary movement of the frame and head in the longitudinal direction of the machine or toward and from the blank ends. The guides 1176 which support and direct the frame bars 1174 in their vertical movements are formed as parts of a yoke 1190 secured to an inward face of a horizontally slidable head 1192 on which the movable toggle block 1180 is secured or formed as an integral part. The slidable head 1192 has spaced arms 1194 arranged to run on guides 1196 formed on the sides of the fixed toggle block 1146 previously referred to.

As a matter of convenience, the feed rolls 1152 and 1154 above mentioned are arranged to move with the slidable head 1192 which carries the folding head 1172. The positively driven rolls 1152 are mounted on shafts which run in vertical bearing sleeves 1198 secured to one of the yoke members 1190. At their lower ends these shafts are connected by spiral gears 1200 to horizontal shafts 1202 mounted in bearings in bearing frames 1204 secured to one of the bearing sleeves. The shafts 1202 are driven by pulleys 1206 and belts 1208 from pulleys 1210 on a shaft 1212, carried by bearings formed on frame uprights 1214, secured to the table of the folding section $R^1$. An independent electric driving motor 1216 is mounted on this table and drives shaft 1212 by spiral gears 1218. The independent drive for the feed roll 1152 is provided in order to conveniently provide for driving them at the desired speed and also to conveniently provide for driving the feed rolls of the two main folding sections from a common source and without the complication incident to connecting these feed rolls to some main driving element of the folding mechanisms; but in a broad sense the described arrangement is only representative of any suitable driving means.

Cooperating with each of the positively driven feed rolls 1152 is a roll 1154 carried by a short shaft mounted in an arm 1220 pivoted on the adjacent bearing sleeve 1198 and urged by a spring 1222 (Fig. 29), to normally hold roll 1154 against the driven roll. As each blank advances over the straightening shoe 1142 the foremost ends of its vertically positioned corner laps pass between the pairs of rolls 1152 and 1154 and are frictionally held by the small rolls against the large ones, and the blank is then driven forward by the rolls, which traverse the corner laps, the side wings and then the trailing corner laps of the blank, the driving grip of the rolls on the blank commencing while the blank is still engaged and driven by the corner creasing rolls 1114 and 1116, and the blank is frictionally driven by feed rolls 1152 and 1154, until it is properly positioned on the stationary former with the ends of the corner laps against the stops 1156 above mentioned, which are secured to the upright portions of the yokes 1190 of the rearward folding head frame.

As the corner laps and side wings of the blank advance they pass stops or detents 1224 carried by flat springs 1226 secured to brackets 1228, which are mounted on a yoke 1190. When the blank comes into position against stops 1156, the rear edges of the rearmost corner laps snap into engagement with detents 1224, and the blank is thus properly retained in position on the former.

The fixed and movable toggle blocks 1146 and 1180 are connected by toggle links 1230, the central connection of the toggle links being made to the upper end of a link 1232, provided with a cam roller 1234 and cam yoke 1236, this yoke and cam roller, in the case of the forward toggle mechanism (as the right in Fig. 1$^c$) cooperating with cam shaft 962 and a cam track formed in one side of cam body 1112, and in the case of the rear toggle mechanism, (at the left, Fig. 1$^c$), the yoke cooperates with cam shaft 966, and the roller, with a cam track formed in one face of cam body 1238 on that shaft. The cam tracks are contoured to give the necessary horizontal movements of the movable toggle blocks, and the parts connected therewith, including the end-folding heads and their supporting frame.

Each of the folding head frames carries two corner-lap turn-in fingers or blades 1240 mounted on stud shafts 1242 secured to the upright frame side bars 1174. Each of these stud shafts has a pinion 1244 engaging a fixed vertical rack 1246 secured to an outer end portion of yoke 1190.

The box end folding devices built upon or around each vertically and horizontally movable folding head 1172, as best shown in Figs. 29 to 34 inclusive and 37, comprise a top plate 1250 secured to the top of the head and projecting inwardly beyond the vertical flat pressing head face 1252. Along the lower edge of the pressing face is a shallow horizontal flange 1254 forming a shoulder 1256. Rods 1258 are mounted for vertical movement in holes 1260 in the head. The rods have stems 1262 of reduced diameter passing through holes 1264 in plates 1250. Springs 1266, located in the upper portions of the holes 1250 normally urge the rods downward to an extent limited by nuts 1268 adjustably screwed on the outer ends of the stems. An end-wing-margin or extension turning and securing, and box stripping member 1270 in the shape of an angle bar, having a vertical flange 1272, is secured to the lower ends of each pair of rods 1258. One face 1274 of the vertical flange is arranged to move close to the outer vertical face of flange 1254 on the folding head. The opposite face 1276 of the vertical flange 1272 is arranged to move at times in close proximity to the vertical face 1278 of a flange 1280 formed at the lower side of the stationary former near the end thereof, this flange being located at the bottom of a transverse recess 1282 just below the main vertical end pressing face 1284 of the former. The under face of the horizontal flange of angle bar 1270 is arranged to cooperate at times with bases or stop blocks 1286 carried by stationary frame brackets 1288.

When a blank is positioned on the former as above described and as shown in 1 g. 29, the folding heads and the frames supporting them are elevated and are also horizontally retracted, the open central portions of the frames permitting the movement of the blank to the described position. The corner lap turning fingers are in substantially upright position. Cam bodies 1052 and links 1184 now act to move the frames and folding heads downward. In the first part of this movement, pinions 1244 are actuated by their stationary racks 1246 to swing fingers 1240 inward. The ends of the fingers encounter the outer faces of the corner laps and turn them inward (Fig. 30) toward the end faces of the former and at about this time the horizontal flanges of angle bars 1270 engage the upper faces of the end wings and turn them down. In the meantime, fingers 1240 have moved farther down and out of the way of the end wings, which are brought flat against the outer faces of the inturned corner laps, glue having been supplied in the manner previously explained, to the inner faces of the end wings to cause adhesion to the contacting surfaces.

The toggle mechanism is now actuated sufficiently to move the toggle block 1180 and all parts carried by it, including the head frame and head 1172 and all of the connected parts, inward or toward the former to the position shown in Fig. 32. In this movement the upper end of vertical flange of angle bar 1272 turns the projecting end wing cover margin 25 or the end wing extension 30, consisting of combined shell and cover material, as the case may be, horizontally inward, this movement of the blank portions being permitted by the recess or channel 1282 of former 1158. The pressing face 1252 of the folding head is now so located as to hold the blank end wings and corner laps in the proper position against the vertical pressing face 1284 of the former, and some pressure may be maintained upon the blank parts, this pressure, however, not being sufficient to prevent ready vertical sliding of the nearly formed box upon the former. Face 1276 of vertical flange 1272 of angle bar 1270 is positioned against the vertical face of former flange 1280, this contact aiding in limiting the stated inward movement of the folding head.

The folding head is now moved downward again to the position shown in Fig. 33. In this movement the horizontal flanges of angle bars 1270 strike the abutment blocks 1286 and the angle bars are therefore prevented from moving downward while the heads descend, carrying with them the box, which slides downward upon the former, the blank supporting rails 1162 moving downward meantime, by compression of their supporting springs 1168. In the downward movement of the box, the upper edge of flange 1272 of angle bar 1270 first turns the blank cover margin 25 or end wing extension 30 as the case may be, upward to vertical position against the inward edge margins of the corner-lap, and in the further downward movement of the box, the vertical face 1274 of flange 1272 smoothly and lightly compresses the blank margin or extension in position. When the parts reach the position shown in Fig. 33, the outer end 1178 of the folding head is in line and in approximate contact with the inward face of movable toggle block 1180. The toggle mechanism is now actuated again to move the toggle block powerfully inward, this pressure being communicated through the folding head to vertical flange 1272 which in turn rests against the former flange 1280. Powerful pressure is thus applied to the inturned blank margin or extension to cause it to adhere to the corner laps.

The toggle pressure is now sufficiently relaxed and the folding unit is moved upward to the position of Fig. 34. In this movement folding head flange 1254, which has been positioned beneath the lower edge of the box end, acts as a lifter, and moves the formed box upward sufficiently to clear the edges of the box ends from flanges 1272. In this movement of the head structures, angle bars 1270 are held down by springs 1266 until stop nuts 1268 engage plate 1250, thus bringing the parts to the position of Fig. 34. The head structures then move outward to bring inward vertical faces 1276 of flanges 1272 far enough out to slide up alongside the end faces 1284 of former 1158, and also to bring the upper edges of the flanges beneath the edges of the box ends. The heads are then moved simultaneously upward as indicated in Fig. 37, stripping the box from the former, and this movement continues until the head structures and their frames return to the position of Fig. 29, the box being supported in the heads as shown in Fig. 1ᶜ. In the upward movements of the box, supporting rails 1162 are returned to normal upward position by their springs 1168. The corner lap turn-in fingers 1240 are returned to normal upright position, and everything is ready for another folding operation. The folding head frames are elevated and clearance is provided for the movement of another blank into position on the former.

The box for some purposes may now be considered as completed, and it may be ejected or removed from the folding heads in any desired manner. It is desired, however, in many cases to additionally press the box to insure proper adhesion of the parts and to otherwise properly shape and finish it. The box is therefore to be moved to another pressing station W.

At station W, each folding mechanism includes a repressing former or mandrel 1292 located outwardly from the first pressing former in the transverse direction of the machine, Figs. 2ᶜ, 28 and 39. This former is fixed on the upper end of a plunger 1294 arranged to move vertically in a bearing sleeve 1296 secured to the table. A cross head 1298 is secured to the plunger and this has blocks 1300 adjusted by screws 1302 and bearing against a flat face guide 1304 to prevent rotation of the former and also to adjust it in the proper position, parallel to the longitudinal center line of the machine. At the lower end of the plunger is a cam yoke 1306 cooperating with shaft 964 and provided with a cam roller 1308 engaging a cam track in a cam body 1310 fixed on the shaft. Near each end of the vertically movable former is toggle mechanism substantially similar to the toggle mechanism previously described and including fixed toggle blocks or link mountings 1312 arranged in or as parts of box frames 1314 secured to the table. Movable toggle blocks 1316 are slidably mounted in the box frames, and the two blocks of each toggle mechanism are connected by toggle links 1318, which are actuated by vertical links 1320 provided with yokes 1322 and cam rollers 1324 cooperating with cam shafts 962 and 966, and with cam tracks formed in outer faces of the cam bodies 1326 and 1328 fixed on the respective shafts.

Box guides 1330 are carried by movable toggle blocks 1316, each guide comprising upper and lower angle bars 1332 and 1334. The lower flanges 1136 of the lower angle bars of the opposite guide members are cut back at points adjacent to the ends of the former to permit the former to move up into the box without striking the flanges.

When a box is stripped from the main folding former and elevated by the folding head, it is positioned, as shown at the left in Fig. 28, at the entrance of the guide channel leading to and beyond the re-pressing position. The box is carried through this channel and positioned above the re-pressing plunger by any suitable conveying mechanism, such as a chain 1340 running over sprockets 1342 and 1344. Pushers 1346 are provided on the chain to engage a side of the box and advance it through the conveyor channel. The chain may be moved intermittenly in any suitable way. In the present arrangement sprocket 1342 is rotatably mounted on a hub 1348 and connected to the hub by a one-way ratchet driving mechanism, such as ratchet rollers 1350. The hub is carried by a shaft 1352 mounted in bearings at the top of an upright frame bracket 1354. On the shaft is a pinion 1356 engaging a vertical rack 1358 moving in guides 1360 at the top and bottom of the bracket. The lower end of the rack bar is connected by a link 1362 to a lever 1364 fulcrumed on tie bar 928 and provided with a cam roller 1366 engaging a cam track in one side of cam body 1052 on shaft 966.

When the box is stripped from the folding former and elevated, as shown at the left in Fig. 28, it is positioned in front of one of the pushers 1346. The described driving mechanism now operates rack bar 1358 and drives sprocket 1342 so that pusher 1346 advances the box in the guide channel to a point directly above the re-pressing plunger 1292, where it is brought to rest. The plunger is now elevated by its driving mechanism, and enters the box, being brought to such a position that the lower edges of its pressing faces 1368 (Fig. 39) are slightly above the lower edge of the box and above supporting flanges 1336 of lower guide bars 1334. The toggle mechanism is then operated to advance the movable toggle blocks 1316 and the box guide members carried by them, which press the end structures of the box against the vertical ends of the plunger. The toggle blocks are then retracted, freeing the ends of the box from active pressure. The described toggle movement may be very slight, and is not sufficient to involve any dislocation of the box guiding and supporting rails from proper relation to the box. The re-pressing plunger is now retracted, and in the next movement of the chain conveyor the box is ejected at the outer end of its conveyor channel, any suitable table or receptacle being provided to receive the finished box or, of course, if desired, the conveyor channel may be extended to move the completed boxes to some suitable point of utilization.

In the described particular arrangement of the two folding sections, the similar parts of the two mechanisms usually operate in alternation, so that, generally speaking, while a blank or box is stationary at one of the stations in one folding mechanism, a blank or box is moving from one station or position to another in the other folding mechanism. In each folding mechanism, obviously a series of blanks or boxes is always in transit or undergoing operations at the different positions, so that, for instance, while one blank is having its side wings turned down at station T, another blank is having its end structures folded at station V, and another blank is being re-pressed at station W.

To allow for the thickness of the shell material when shell end wing extensions 30 are provided for the style of box shown in Fig. 36, it is usually desirable to trim down the underlying edges of the corner laps. This may be accomplished in the machine section F, by merely providing additional cutters 495 on the shafts 483, and complemental cutters 485 on shaft 487, the cutters being arranged to trim back the opposite edges of the continuous shell web co-extensive with the length of the corner laps. When the cover paper is applied and folded over, the outer corner lap margins will be inset slightly from the normal longitudinal edges of the composite blank, as sufficiently shown in Fig. 18ᴬ, and when the blanks are finally severed and folded up, as shown in Fig. 36, the overturned wing extensions 30, which are of substantial thickness, on account of including the shell as well as the cover material, are accommodated by the trimmed off edges of the corner laps, and the entire open edge contour of the box is made uniform. Where the turn over at the ends of the box consists merely of cover paper as at 25, Figs. 35 and 38, the thickness of this cover paper is negligible and there is no need to trim the shell material in the manner just described.

I claim:

1. Box folding and forming mechanism designed for co-operation with blanks advanced substantially in the plane of the blank body section, comprising a substantially stationary former arranged to co-operate with the blank with its side wings turned down alongside the former and its body section located above the former, corner lap turners normally out of the path of blank advance and acting after the blank is positioned to turn in the corner laps, and end wing folders normally out of the path of blank advance and arranged for movement after the blank is positioned to position the blank end wings.

2. Box folding and forming mechanism designed for co-operation with blanks advanced substantially in the plane of the blank body section, comprising a substantially stationary former arranged to co-operate with the blank with its side wings turned down alongside the former and its body section located above the former, corner lap turners normally out of the path of blank advance and acting after the blank is positioned to turn in the corner laps, and end wing folders normally out of the path of blank advance and arranged for movement after the blank is positioned to position the blank end wings and to turn in and secure blank end wing extensions.

3. Box folding and forming mechanism designed for co-operation with blanks advanced substantially in the plane of the blank body section, comprising a substantially stationary former arranged to co-operate with the blank with its side wings turned down alongside the former and its body section located above the former, corner lap turners normally out of the path of blank advance and acting after the blank is positioned to turn in the corner laps, and end wing folding instrumentalities arranged for reciprocation nearly in the plane of the former ends and also for movement toward and from the former ends and including means for turning down blank end wings, turning in end wing extensions and stripping the formed blank from the former.

4. Box folding and forming mechanism designed for co-operation with blanks advanced substantially in the plane of the blank body section, comprising a substantially stationary former arranged to co-operate with the blank with its side wings turned down alongside the former and its body section located above the former corner lap turners normally out of the path of blank advance and acting after the blank is positioned to turn in the corner laps, and end wing folding instrumentalities arranged for reciprocation nearly in the plane of the former ends and also for movement toward and from the former ends and including means for turning down blank end wings, turning in end wing extensions, squeezing them against inner faces of the box end structure, and stripping the formed blank from the former.

5. Box folding and forming mechanism designed for co-operation with blanks advanced substantially in the plane of the blank body section, comprising a substantially stationary former arranged to receive the blank with its side wings turned down alongside the former and its body section located above the former, corner lap turners normally out of the path of blank advance and acting after the blank is positioned to turn in the corner laps, and end wing folders normally out of the path of blank advance and arranged to move nearly in the plane of the former ends after the blank is positioned to fold, position and secure the blank end wings.

6. Box folding and forming mechanism designed for co-operation with blanks advanced substantially in the plane of the blank body section, comprising a substantially stationary former arranged to receive the blank with its side wings turned down alongside the former and its body section located above the former, corner lap turners normally out of the path of blank advance and acting after the blank is positioned to turn in the corner laps, and end wing folders normally out of the path of blank advance and arranged to move nearly in the plane of the former ends after the blank is positioned to fold, position and secure the blank end wings, and to turn in and secure blank end wing extensions.

7. An automatic box machine comprising means for advancing a continuous web of box shell material, means for producing narrow longitudinal slots in the shell material, means for producing longitudinal fold channels therein, means for adhesively applying cover material to one surface of the shell web, means for producing box blank formations on the combined materials, and means for severing the continuous assembly transversely at regular intervals.

8. An automatic box machine comprising means for advancing a continuous web of box shell material, rotary grinding wheels, means for holding the advancing shell web in contact with the wheels to produce parallel longitudinal folding channels in the web, means for adhesively applying cover material on one surface of the shell web, means for producing box blank formations on the combined materials, and means for severing the continuous assembly transversely at regular intervals.

9. An automatic box machine comprising means for advancing a continuous web of box shell material, means for producing longitudinal folding channels therein, means for producing narrow longitudinal slots in the shell material, means for adhesively applying cover material on one surface of the shell web, means for producing box blank formations on the combined materials, means for severing the continuous assembly transversely at regular intervals, and means for automatically folding and securing the successive blanks so produced in box form.

10. An automatic box machine comprising means for advancing a continuous web of box shell material, rotary grinding wheels, means for holding the advancing shell web in contact with the wheels to produce parallel longitudinal folding channels in the web, means for adhesively applying cover material on one surface of the shell web, means for producing box blank formations on the combined materials, means for severing the continuous assembly transversely at regular intervals, and means for automatically folding and securing the successive blanks so produced in box form.

11. A box blank machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for producing blank end formations in the web, means for advancing and adhesively securing sheet cover material to one surface of the web, and means for severing the assembly transversely to produce individual box blanks.

12. A box blank machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for adjusting the abutment rolls toward and from the grinding wheels, means for producing blank end formations in the web, means for advancing and adhesively securing sheet cover material to one surface of the web, and means for severing the assembly transversely to produce individual box blanks.

13. A box blank machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for adjusting the abutment rolls and grinding wheels laterally of the web, means for producing blank end formations in the web, means for advancing and adhesively securing sheet cover material to one surface of the web, and means for severing the assembly transversely to produce individual box blanks.

14. A box blank machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for producing blank end formations in the web, means for advancing and adhesively securing sheet cover material to one surface of the web, means for producing blank end formations in the continuous assembly so produced, and means for severing the assembly transversely to produce individual box blanks.

15. A box blank machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for adjusting the abutment rolls toward and from the grinding wheels, means for producing blank end formations in the web, means for advancing and adhesively securing sheet cover material to one surface of the web, means for producing blank end formations in the continuous assembly so produced, and means for severing the assembly transversely to produce individual box blanks.

16. A box blank machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for adjusting the grinding wheels, means for adjusting the abutment rolls and grinding wheels laterally of the web, means for producing blank end formations in the web, means for advancing and adhesively securing sheet cover material to one surface of the web, means for producing blank end formations in the continuous assembly so produced, and means for severing the assembly transversely to produce individual box blanks.

17. A box machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for producing blank end formations in the web, means for advancing and adhesively securing sheet cover material to one surface of the web, means for severing the assembly transversely to produce individual box blanks, and means for folding the blanks in box formation.

18. A box machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for adjusting the abutment rolls toward and from the grinding wheels, means for producing blank end formations in the web, means for advancing and adhesively securing sheet cover material to one surface of the web, means for severing the assembly transversely to produce individual box blanks, and means for folding the blanks in box formation.

19. A box machine, comprising means for advancing a continuous shell web, grinding wheels arranged at one side of the web to produce longitudinal fold channels therein, means for driving the wheels, abutment rolls at the opposite surface of the web arranged to hold the web in contact with the grinding wheels, means for adjusting the abutment rolls and grinding wheels laterally of the web, means for producing blank end formations in the web, means for advancing and adhesively securing sheet cover material to one surface of the web, means for severing the assembly transversely to produce individual box blanks, and means for folding the blanks in box formation.

20. A box blank machine comprising means for advancing a continuous web of shell material, means for cutting the web longitudinally on parallel lines to form narrow slots which separate end formations of individual blanks to be produced, means for advancing and adhesively securing sheet cover material to one surface of the shell web, means for longitudinally slitting the cover material between the edges of the shell slots, and means for severing the continuous assembly so provided at regular intervals to form individual composite box blanks.

21. A box blank machine comprising means for advancing a continuous web of shell material, means for forming longitudinal fold lines therein, means for cutting the webs longitudinally on parallel lines adjacent the fold lines to form narrow slots which separate end formations of individual blanks to be produced, means for advancing and adhesively securing sheet cover material to one surface of the shell web, means for longitudinally slitting the cover material between edges of the shell slots, means for producing additional blank formations on the combined materials, and means for severing the continuous assembly so produced at regular intervals to form individual composite box blanks.

22. A box machine comprising means for advancing a continuous web of shell material, means for forming longitudinal fold lines therein, means for cutting the web longitudinally on parallel lines adjacent the fold lines to form narrow slots which separate end formations of individual blanks to be produced, means for advancing and adhesively securing sheet cover material to one surface of the shell web, means for longitudinally slitting the cover material between the edges of the shell slots, means for producing additional blank formations on the combined materials, means for severing the continuous assembly so produced at regular intervals to form individual composite box blanks, and means for folding and securing the blanks in box form.

23. A box blank machine comprising means for advancing a continuous web of shell material, means for forming longitudinal fold lines therein, means for cutting the web longitudinally on parallel lines to form narrow slots which separate end formations of individual blanks to be produced, subsequently acting means for forming substantially rectangular openings in the web between the fold lines and connecting said slots, means for advancing and adhesively securing sheet cover material to one surface of the shell web, and means for severing the continuous assembly so produced at regular intervals to form individual composite box blanks.

24. A box blank machine comprising means for advancing a continuous web of shell material, means for forming longitudinal fold lines therein, means for cutting the web longitudinally on parallel lines adjacent the fold lines to form narrow slots which separate end formations of individual blanks to be produced, subsequently acting means for forming substantially rectangular openings in the web between the fold lines and connecting said slots, means for advancing and adhesively securing sheet cover material to one surface of the shell web, means for producing additional blank formations on the combined materials, and means for severing the continuous assembly so produced at regular intervals to form individual composite box blanks.

25. A box machine comprising means for advancing a continuous web of shell material, means for forming longitudinal fold lines therein, means for cutting the web longitudinally on parallel lines adjacent the fold lines to form narrow slots which separate end formations of individual blanks to be produced, subsequently acting means for forming substantially rectangular openings in the web between the fold lines and connecting said slots, means for advancing and adhesively securing sheet cover material to one surface of the shell web, means for producing additional blank formations on the combined materials, means for severing the continuous assembly so produced at regular intervals to form individual composite box blanks, and means for folding and securing the blanks in box form.

26. A box machine comprising means for advancing a continuous web of shell material, means for forming longitudinal fold lines therein, means for cutting the web longitudinally on parallel lines adjacent the fold lines to form narrow slots which separate end formations of individual blanks to be produced, subsequently acting means for forming substantially rectangular openings in the web between the fold lines and connecting said slots, means for advancing and adhesively securing sheet cover material to one surface of the shell web, means for slitting the cover material longitudinally along the lines of said shell slots, means for producing additional blank formations on the combined materials, means for severing the continuous assembly so produced at regular intervals to form individual composite box blanks, and means for folding and securing the blanks in box form.

27. A box blank machine comprising means for advancing a continuous web of shell material, means for perforating the web to define the ends of slots to be subsequently formed, means for slitting the web longitudinally on adjacent parallel lines between the perforations to produce longitudinal web slots, means for applying sheet cover material adhesively to one surface of the shell web, means for operating upon the combined materials to produce box blank end formations, and means for severing the combined materials transversely to produce individual blanks.

28. A box blank machine comprising means for advancing a continuous web of shell material, means for perforating the web to define the ends of slots to be subsequently formed, means for slitting the web longitudinally on adjacent parallel lines between the perforations to produce longitudinal web slots, means for making parallel transverse cuts to form central web openings connecting with the slots, means for applying sheet cover material adhesively to one surface of the shell web, means for operating upon the combined materials to produce box blank end formations, and means for severing the combined materials transversely to produce individual blanks.

29. A box blank machine comprising means for advancing a continuous web of shell material, means for perforating the web to define the ends of slots to be subsequently formed, means for slitting the web longitudinally on adjacent parallel lines between the perforations to produce longitudinal web slots, means for removing from the web strips produced in the formation of said web slots, means for applying sheet cover material adhesively to one surface of the shell web, means for operating upon the combined materials to produce box blank end formations, and means for severing the combined materials transversely to produce individual blanks.

30. A box blank machine comprising means for advancing a continuous web of shell material, means for perforating the web to define the ends of slots to be subsequently formed, means for slitting the web longitudinally on adjacent parallel lines between the perforations to produce longitudinal web slots, means for making parallel transverse cuts to form central web openings connecting with the slots, means for removing from the web the scrap pieces produced in the formation of said central openings, means for applying sheet cover material adhesively to one surface of the shell web, means for operating upon the combined materials to produce box blank end formations, and means for severing the combined materials transversely to produce individual blanks.

31. A box machine comprising means for advancing a continuous web of shell material, means for perforating the web to define the ends of slots to be subsequently formed, means for slitting the web longitudinally on adjacent parallel lines between the perforations to produce longitudinal web slots, means for applying sheet cover material adhesively to one surface of the shell web, means for operating upon the combined materials to provide box blank end formations, means for severing the combined materials transversely to produce individual blanks, and means for folding the succcessive blanks in box form.

32. A box machine comprising means for advancing a continuous web of shell material, means for perforating the web to define the ends of slots to be subsequently formed, means for slitting the web longitudinally on adjacent parallel lines between the perforations to produce longitudinal web slots, means for making parallel transverse cuts in the web connecting the longitudinal cuts and forming central web openings connecting with the slots produced as above stated, means for applying sheet cover material adhesively to one surface of the shell web, means for operating upon the combined materials to provide box blank end formations, means for severing the combined materials transversely to produce individual blanks, and means for folding the successive blanks in box form.

33. A box machine comprising means for advancing a continuous web of shell material, means for perforating the web to define the ends of slots to be subsequently formed, means for slitting the web longitudinally on adjacent parallel lines between the perforations to produce longitudinal web slots, means for removing from the web strips produced in the formation of said web slots, means for applying sheet cover material adhesively to one surface of the shell web, means for operating upon the combined materials to provide box blank end formations, means for severing the combined materials transversely to produce individual blanks, and means for folding the successive blanks in box form.

34. A box machine comprising means for advancing a continuous web of shell material, means for perforating the web to define the ends of slots to be subsequently formed, means for slitting the web longitudinally on adjacent parallel lines between the perforations to produce longitudinal web slots, means for making parallel transverse cuts in the web connecting the longitudinal cuts and forming central web openings connecting with the slots produced as above stated, means for removing from the web the center scrap piece produced in the formation of said central openings, means for applying sheet cover material adhesively to one surface of the shell web, means for operating upon the combined materials to provide for blank end formations, means for severing the combined materials transversely to produce individual blanks, and means for folding the successive blanks in box form.

35. A box or box blank machine comprising means for advancing a continuous web of shell material, means for perforating the web to define the ends of slots to be subsequently formed, means for slitting the web longitudinally on adjacent parallel lines between the perforations to produce longitudinal web slots, means for making parallel transverse cuts to form central web openings connecting with the slots, means for removing from the web strips and center scrap pieces produced in the formation of said web slots and central openings, means for applying sheet cover material adhesively to one surface of the shell web, means for operating upon the combined materials to provide box blank end formations, and means for severing the combined materials transversely to produce individual blanks.

36. A box blank machine comprising means for advancing a continuous shell web, means for forming longitudinal fold lines therein, means for perforating the web, co-operating upper and lower rolls having co-operating male and female cutting elements for excising longitudinal strips from the web between certain of said perforations, means for clearing said strips from said female elements, means for advancing and applying sheet cover material adhesively to one face of the shell web, means for producing blank end formations in the combined materials, and means for severing the combined materials transversely to produce individual blanks.

37. A box blank machine comprising means for advancing a continuous shell web, means for forming longitudinal fold lines therein, co-operating web rolls having means thereon for perforating the web, co-operating upper and lower rolls having co-operating male and female cutting elements for excising longitudinal strips from the web between certain of said perforations, means for clearing said strips from said female elements, means for advancing and applying sheet cover material adhesively to one face of the shell web, means for producing blank end formations in the combined materials, and means for severing the combined materials transversely to produce individual blanks.

38. A box machine comprising means for advancing a continuous shell web, means for forming longitudinal fold lines therein, co-operating web rolls having means thereon for perforating the web, co-operating upper and lower web rolls having co-operating male and female cutting elements for excising longitudinal strips from the web between certain of said perforations, means for clearing said strips from said female members, means for advancing and applying sheet cover material adhesively to one face of the shell web, means for producing blank end formations in the combined materials, means for severing the combined materials transversely to produce individual blanks, and means for folding successive blanks in box form.

39. An automatic box or box blank machine comprising means for advancing a continuous web of box shell material, means for producing beveled wing margin formations at intervals on the web, means for adhesively securing cover material to substantially cover one surface of the shell web, and means for making transverse cuts to sever the continuous assembly at regular intervals.

40. An automatic box blank machine comprising means for advancing a continuous web of box shell material, means for producing parallel longitudinal fold lines therein, means for producing beveled formations at intervals adjacent to the fold lines, means for advancing and adhesively securing sheet cover material to substantially cover one surface of the shell web, and means for making transverse cuts to sever the continuous assembly at regular intervals.

41. An automatic box blank machine comprising means for advancing a continuous web of box shell material, means for producing longitudinal parallel fold lines therein, means for producing beveled wing margin formations at intervals adjacent to the fold lines, means for advancing and adhesively securing sheet cover material to substantially cover one surface of the shell web, means for producing transverse fold lines in the combined materials, means for producing longitudinal slits in the cover material, and means for making transverse cuts to sever the continuous assembly at regular intervals.

42. An automatic box machine comprising means for advancing a continuous web of box shell material, means for producing longitudinal parallel fold lines therein, means for producing beveled wing margin formations at intervals adjacent to the fold lines, means for advancing and adhesively securing sheet cover material to substantially cover one surface of the shell web, means for producing transverse fold lines in the combined materials, means for producing longitudinal slits in the cover material, means for producing transverse cuts to sever the continuous assembly at regular intervals, and means for folding and securing in box form the successive blanks so produced.

43. A box blank machine comprising means for advancing a continuous web of shell material, means for producing parallel longitudinal fold lines therein, means for cutting the web longitudinally at intervals along said fold lines, means for producing at intervals in the web beveled formations adjacent to the fold lines and cuts, means for advancing and applying sheet cover material adhesively to one surface of the shell web, and means for severing the combined materials transversely at regular intervals to produce individual box blanks.

44. A box blank machine comprising tractor rolls for advancing a continuous web of shell material, means for producing parallel longitudinal fold lines therein, means for cutting the web longitudinally at intervals along said fold lines, means for producing at intervals in the web beveled formations adjacent the fold lines and cuts, means for advancing and applying sheet cover material adhesively to one surface of the shell web, means for producing additional blank end formations on the combined materials, and means for severing the combined materials transversely at regular intervals to produce individual box blanks.

45. A box machine comprising tractor rolls for advancing a continuous web of shell material, means for producing parallel longitudinal fold lines therein, means for cutting the web longitudinally at intervals along said fold lines, means for producing at intervals in the web beveled formations adjacent to the fold line and cuts, means for advancing and applying sheet cover material adhesively to one surface of the shell web, means for producing additional blank end formations on the combined materials, means for severing the combined materials transversely at regular intervals to produce individual box blanks, and means for folding the individual blanks in box form.

46. A box blank machine comprising means for advancing a continuous shell web, means for forming longitudinal fold lines therein, rotary skiving wheels, means for bringing the advancing shell web at intervals in contact with the skiving wheels to produce beveled wing margin formations, means for advancing and adhesively securing sheet cover material to one surface of the shell web, means for producing blank formations in the combined materials, and means for severing the combined materials transversely at regular intervals.

47. A box blank machine comprising means for advancing a continuous shell web, means for forming longitudinal fold lines therein, rotary skiving wheels, means for bringing the advancing shell web at intervals in contact with the skiving wheels to produce beveled wing margin formations, means for advancing and adhesively securing sheet cover material to one surface of the shell web, means for producing blank formations in the combined materials, means for severing the combined materials transversely at regular intervals, and means for automatically folding and securing the individual blanks so produced in box form.

48. A box or blank machine, comprising means for advancing a continuous shell web, means for producing longitudinal fold line formations therein, grinding wheels at one face of the web arranged to produce beveled formations in the web adjacent to the longitudinal fold formations, abutment rolls at the opposite face of the web to co-operate with the grinding wheels, and means for moving the co-operating abutment and grinding elements at intervals relatively toward each other to produce longitudinally spaced beveled formations in the web.

49. A box or box blank machine, comprising means for advancing a continuous shell web, means for producing longitudinal fold line formations therein, grinding wheels at one face of the web arranged to produce beveled formations in the web adjacent to the longitudinal fold formations, abutment rolls at the opposite face of the web to co-operate with the grinding wheels, means for supporting said abutment rolls, and automatic means for moving the supporting means at intervals to advance and retract the abutment rolls.

50. A box or box blank machine, comprising means for advancing a continuous shell web, means for producing longitudinal fold line formations therein, grinding wheels at one face of the web arranged to produce beveled formations in the web adjacent to the longitudinal fold formations, abutment rolls at the opposite face of the web to co-operate with the grinding wheels, means for moving the co-operating abutment and grinding elements at intervals relatively toward each other to produce longitudinally spaced beveled formations in the web, and means for adjusting the grinding and abutment rolls laterally.

51. A box or box blank machine, comprising means for advancing a continuous shell web, means for producing longitudinal fold line formations therein, grinding wheels at one face of the web arranged to produce beveled formations in the web adjacent to the longitudinal fold formations, abutment rolls at the opposite face of the web to co-operate with the grinding wheels, means for moving the co-operating abutment and grinding elements at intervals relatively toward each other to produce longitudinally spaced beveled formations in the web, and adjusting means for regulating the depth of the beveled formations.

52. An automatic box machine comprising means for advancing a continuous web of shell material, means for advancing relatively narrow strips of reenforcing material adjacent one face of the shell web, means for advancing sheet cover material and applying it adhesively over the reenforcements to substantially cover one surface of the shell web, means for producing blank formations in certain of the materials, and means for severing the continuous assembly transversely at regular intervals.

53. An automatic box machine comprising means for advancing a continuous web of shell material, means for advancing relatively narrow strips of reenforcing material adjacent one face of the shell web, means for advancing sheet cover material and applying it adhesively over the reenforcements to substantially cover one surface of the shell web, means for producing blank formations in certain of the materials, means for severing the continuous assembly transversely at regular intervals, and means for folding the individual blanks so produced in box form.

54. An automatic box machine comprising means for advancing a continuous web of shell material, means for advancing relatively narrow continuous strips of sheet reenforcing material adjacent one face of the shell web, means for advancing sheet cover material and applying it adhesively over the reenforcements to substantially cover one surface of the shell web, means for producing blank formations in certain of the materials, and means for severing the continuous assembly transversely at regular intervals.

55. An automatic box machine comprising means for advancing a continuous web of shell material, means for advancing relatively narrow continuous strips of sheet reenforcing material adjacent one face of the shell web, means for advancing sheet cover material and applying it adhesively over the reenforcements to substantially cover one surface of the shell web, means for producing blank formations in certain of the materials, means for severing the continuous assembly transversely at regular intervals, and means for folding the individual blanks so produced in box form.

56. A box blank machine comprising means for advancing a continuous web of shell material, means for producing blank formations therein, means for advancing and adhesively securing individual labels successively on a surface of the advancing shell web in definite positions with respect to individual blanks to be produced, and means for severing the assembly transversely at blank intervals.

57. A box blank machine comprising means for advancing a continuous web of shell material, means for advancing and adhesively securing individual labels successively on a surface of the advancing shell web in definite positions with respect to individual blanks to be produced, means for producing blank formations on the continuous assembly, and means for severing the assembly transversely at blank intervals.

58. A box blank machine comprising means for advancing a continuous web of shell material, means for producing blank formations therein, means for advancing and adhesively securing individual labels successively on a surface of the advancing shell web in definite positions with respect to individual blanks to be produced, means for producing additional blank formations on the continuous assembly, and means for severing the assembly transversely at blank intervals.

59. A box machine comprising means for advancing a continuous web of shell material, means for producing blank formations therein, means for advancing and adhesively securing individual labels successively on a surface of the advancing shell web in definite positions with respect to individual blanks to be produced, means for producing additional blank formations on the continuous assembly, means for severing the assembly transversely at blank intervals, and means for folding the successive blanks in box form.

60. A box blank machine comprising means for advancing a continuous web of shell material, means for advancing sheet cover material and securing it adhesively on a surface of the advancing shell web to substantially cover said surface, means for advancing and adhesively securing individual labels on the cover material in definite position with respect to individual box blanks to be produced, and means for severing the assembly transversely at regular intervals to produce individual composite blanks.

61. A box blank machine comprising means for advancing a continuous web of shell material, means for producing blank formations thereon, means for advancing sheet cover material and securing it adhesively on a surface of the advancing shell web to substantially cover said surface, means for advancing and adhesively securing individual labels on the cover material prior to its application to the shell web and in definite position with respect to individual box blanks to be produced, means for producing additional blank formations on the continuous assembly, and means for severing the assembly transversely at regular intervals to produce individual composite blanks.

62. A box machine comprising means for advancing a continuous web of shell material, means for advancing sheet cover material and securing it adhesively on a surface of the advancing shell web to substantially cover said surface, means for advancing and adhesively securing individual labels on the cover material in definite position with respect to individual box blanks to be produced, means for severing the assembly transversely at regular intervals to produce individual composite blanks, and means for folding the successive blanks in box form.

63. A box machine comprising means for advancing a continuous web of shell material, means for producing blank formations thereon, means for advancing sheet cover material and securing it adhesively on a surface of the advancing shell web to substantially cover said surface, means for advancing and adhesively securing individual labels on the cover material in definite position with respect to individual box blanks to be produced, means for producing additional blank formations on the continuous assembly, means for severing the assembly transversely at regular intervals to produce individual composite box blanks, and means for folding the successive blanks in box form.

64. A box blank machine comprising means for advancing a continuous web of shell material, means for advancing a continuous web of sheet cover material and adhesively securing it to the advancing shell web, means for advancing individual labels and adhesively securing them on the cover web in positions corresponding to definite locations on individual blanks to be produced, and means for severing the continuous assembly transversely at regular intervals to produce individual composite blanks.

65. A box blank machine comprising means for advancing a continuous web of shell material, means for producing blank formations therein, means for advancing a continuous web of sheet cover material and adhesively securing it to the advancing shell web, means for advancing individual labels and adhesively securing them on the cover web prior to its application to the shell web in positions corresponding to definite locations on individual blanks to be produced, means for producing additional blank formations on the continuous assembly, and means for severing the continuous assembly transversely at regular intervals to produce individual composite blanks.

66. A box blank machine comprising means for advancing a continuous web of shell material, means for producing blank formations therein, means for advancing a continuous web of sheet cover material and adhesively securing it to the advancing shell web, means for advancing individual labels and adhesively securing them on the advancing cover web prior to its application to the shell web in positions corresponding to definite locations on individual blanks to be produced, means for producing additional blank formations on the continuous assembly, and means for severing the continuous assembly transversely at regular intervals to produce individual composite blanks.

67. A box machine comprising means for advancing a continuous web of shell material, means for producing blank formations therein, means for advancing a continuous web of sheet cover material and adhesively securing it to the advancing shell web, means for advancing individual labels and adhesively securing them on the advancing cover web prior to its application to the shell web, and in positions corresponding to definite locations on individual blanks to be produced, means for producing additional blank formations on the continuous assembly, means for severing the continuous assembly transversely at regular intervals to produce individual composite blanks, and means for folding the successive blanks in box form.

68. A box blank machine comprising means for advancing a continuous shell web, means for advancing and securing sheet cover material to substantially cover one surface of the shell web and produce a continuous assembly, means for making repetitious imprints on a component material of the continuous assembly in locations corresponding to definite positions on surfaces of individual blanks to be produced, and means for severing the assembly transversely at regular intervals to produce individual blanks.

69. A box blank machine comprising means for advancing a continuous shell web, means for producing blank formations thereon, means for advancing and securing sheet cover material to substantially cover one surface of the shell web and produce a continuous assembly, means for making repetitious imprints on a combination material of the continuous assembly in locations corresponding to definite positions on an inner surface of individual blanks to be produced, means for producing additional blank formations on the continuous assembly, and means for severing the assembly transversely at regular intervals to produce individual blanks.

70. A box machine comprising means for advancing a continuous shell web, means for producing blank formations thereon, means for advancing and securing sheet cover material to substantially cover one surface of the shell web and produce a continuous assembly, means for making repetitious imprints on a combination material of the continuous assembly in locations corresponding to definite positions on an inner surface of individual blanks to be produced, means for producing additional blank formations on the continuous assembly, means for severing the assembly transversely at regular intervals to produce individual blanks, and means for folding the successive blanks in box form.

71. A box blank machine comprising means for advancing a continuous shell web, means for advancing and securing sheet cover material to substantially cover one surface of the shell web and produce a continuous assembly, means for making repetitious imprints on a surface of the continuous assembly corresponding to inner surfaces of the box parts to be produced and in definite position with respect to the individual blanks, and means for severing the continuous assembly at regular intervals to produce individual box blanks.

72. A box machine comprising means for advancing a continuous shell web, means for producing blank formations thereon, means for advancing and securing sheet cover material to substantially cover one surface of the shell web and produce a continuous assembly, means for making repetitious imprints on a surface of the continuous assembly corresponding to inner surfaces of the box parts to be produced and in definite position with respect to the individual blanks, means for severing the continuous assembly at regular intervals to produce individual box blanks, and means for folding the blanks in box form.

73. A box blank machine comprising means for advancing a continuous shell web, means for advancing and securing sheet cover material to substantially cover one surface of the shell web and produce a continuous assembly, means for making a repetitious imprint on an exposed surface of the shell web, in locations corresponding to definite positions on individual blanks to be produced, means for producing additional blank formations on the continuous assembly, and means for severing the assembly transversely at regular intervals to produce individual blanks.

74. A box machine comprising means for advancing a continuous shell web, means for producing blank formations thereon, means for advancing and securing sheet cover material to substantially cover one surface of the shell web and produce a continuous assembly, means for making a repetitious imprint on an exposed surface of the shell web, in locations corresponding to definite positions on individual blanks to be produced, means for producing additional blank formations on the continuous assembly, means for severing the assembly transversely at regular intervals to produce individual blanks and means for folding the successive blanks in box form.

75. A box blank machine comprising means for advancing a continuous shell web, means for producing blank formations thereon, means for advancing and adhesively securing sheet cover material on a surface of the shell web, means for producing additional blank formations on the assembly so produced and for severing it at regular intervals to produce individual blanks, and co-operating rolls between which the assembled materials pass and having means for co-operatively acting on the materials incidental to blank formation, one of said rolls having a platen surface and the other roll having a printing surface and inking means for producing a repetitious imprint in the advancing assembly materials in definite locations with reference to the individual blanks.

76. A box blank machine comprising means for advancing a continuous shell web, means for producing blank formations thereon, means for advancing and adhesively securing sheet cover material on a surface of the shell web, means for producing additional blank formations on the assembly so produced and for severing it at regular intervals to produce individual blanks, and co-operating rolls between which the assembled materials pass and having means for co-operatively acting on the materials incidental to blank formation, one of said rolls having a platen surface and the other having a printing surface and inking means for producing a repetitious imprint in the advancing shell materials in definite locations with reference to the individual blanks.

77. A box machine comprising means for advancing a continuous shell web, means for producing blank formations thereon, means for advancing and adhesively securing sheet cover material on a surface of the shell web, means for producing additional blank formations on the assembly so produced and for severing it at regular intervals to produce individual blanks, co-operating rolls between which the assembled materials pass and having means for co-operatively acting on the materials incidental to blank formation, one of said rolls having a platen surface and the other roll having a printing surface and inking means for producing a repetitious imprint in the advancing assembly materials in definite locations with reference to the individual blanks, and means for folding the successive blanks in box form.

78. A box machine comprising means for advancing a continuous shell web, means for producing blank formations thereon, means for advancing and adhesively securing sheet cover material on a surface of the shell web, means for producing additional blank formations on the assembly so produced and for severing it at regular intervals to produce individual blanks, co-operating rolls between which the assembled materials pass and having means for co-operatively acting on the materials incidental to blank formation, one of said rolls having a platen surface and the other roll having a printing surface and inking means for producing a repetitious imprint in the advancing shell material in definite locations with reference to the individual blanks, and means for folding the successive blanks in box form.

79. A box blank machine comprising means for advancing a continuous shell web, means for producing blank formations thereon, means for advancing sheet cover material and securing it adhesively to substantially cover one surface of the shell web, means for embossing the cover material, means for producing individual bank formations on the continuous assembly, and means for severing the assembly transversely at regular intervals to produce individual box blanks.

80. A box blank machine comprising means for advancing a continuous shell web, means for producing blank formations thereon, means for advancing sheet cover material and securing it adhesively to substantially cover one surface of the shell web, means for embossing the cover material during advance, substantially at the point of application of the cover material to the shell web, means for producing individual blank formations on the continuous assembly, and means for severing the assembly transversely at regular intervals to produce individual box blanks.

81. A box machine comprising means for advancing a continuous shell web, means for producing blank formations thereon, means for advancing sheet cover material and securing it adhesively to substantially cover one surface of the shell web, means for embossing the cover material, means for producing individual blank formations on the continuous assembly, means for severing the assembly transversely at regular intervals to produce individual box blanks, and means for folding the successive blanks in box form.

82. A box or box blank machine comprising means for advancing a continuous shell web, means for producing blank formations thereon, means for advancing sheet cover material and securing it adhesively to substantially cover one surface of the shell web, means for embossing the cover material during advance substantially at the point of application of the cover material to the shell web, means for producing individual blank formations on the continuous assembly, means for severing the assembly transversely at regular intervals to produce individual box blanks, and means for folding the successive blanks in box form.

83. A box blank machine comprising means for advancing a continuous shell web, means for producing blank formations thereon, means for advancing and adhesively conditioning sheet cover material, upper and lower pressing rolls between which the shell web and cover material pass and are pressed in surface contact, one of the rolls being provided with embossing formations to emboss the cover material, means for producing additional blank formations on the continuous assembly, and means for severing the assembly transversely at regular intervals to produce individual blanks.

84. A box blank machine comprising means for advancing a continuous shell web, means for producing blank formations thereon, means for advancing a continuous web of sheet cover material, upper and lower pressing rolls between which the shell web and cover material pass and are pressed in surface contact, the roll in contact with the cover material being provided with embossing formations to emboss the cover material, means for supplying adhesive to secure the cover material prior to its contact with the shell web, means for producing additional blank formations on the continuous assembly, and means for severing the assembly transversely at regular intervals to produce individual blanks.

85. A box machine comprising means for advancing a continuous shell web, means for producing blank formations thereon, means for advancing and adhesively securing sheet cover material, upper and lower pressing rolls between which the shell web and cover material pass and are passed in surface contact, the roll in contact with the cover material being provided with embossing formations to emboss the cover material, means for producing additional blank formations on the continuous assembly, means for severing the assembly transversely at regular intervals to produce individual blanks, and means for folding the successive blanks in box form.

86. A box blank machine comprising means for advancing a continuous shell web, means for producing blank formations thereon, means for advancing a continuous web of sheet cover material, means for embossing the advancing cover web, means for adhesively securing the cover web on a surface of the shell web, means for producing additional blank formations on the continuous assembly, and means for severing the assembly transversely at regular intervals to produce individual blanks.

87. A box blank machine, comprising means for advancing a continuous web of shell material, means for producing blank end formations therein, means for advancing and adhesively securing sheet cover material on one surface of the shell web, means for slitting the cover material at intervals to provide for blank end member separation, and means for cutting the assembly transversely to produce individual blanks.

88. A box machine, comprising means for advancing a continuous web of shell material, means for producing longitudinal fold lines and blank end formations therein, means for advancing and adhesively securing sheet cover material on one surface of the shell web, means for slitting the cover material at intervals to provide for blank end member separation, means for cutting the assembly transversely to produce individual blanks, and means for folding the successive blanks in box form.

89. A box blank machine, comprising means for advancing a continuous web of shell material, means for producing blank end formations therein, means for advancing and adhesively securing sheet cover material on one surface of the shell web, rotary slitters located at one face of the assembly, co-operating rolls at the other face of the assembly, raised segmental abutment faces thereon to co-operate with the slitters and produce longitudinally spaced wing separating slits in the assembly, and means for severing the assembly transversely to produce individual blanks.

90. A box machine, comprising means for advancing a continuous web of shell material, means for producing longitudinal fold lines and blank end formations therein, means for advancing and adhesively securing sheet cover material on one surface of the shell web, rotary slitters located at one face of the assembly, co-operating rolls at the other face of the assembly, raised segmental abutment faces thereon to co-operate with the slitters and produce longitudinally spaced wing separating slits in the assembly, means for severing the assembly transversely to produce individual blanks, and means for folding the successive blanks in box form.

91. An automatic box making machine comprising means for forming and advancing a continuous composite blank assembly including shell material and cover material overlying one surface of the shell and adhesively secured thereto, means for producing wing and lap formations repetitiously in the continuous shell material, means for producing at regular intervals, parallel longitudinal slits in the cover material to provide end-wing corner-lap separation, means for severing the assembly transversely at intermediate points of said formations to produce individual blanks, and means for folding and securing the successive blanks in box form.

92. An automatic box machine comprising means for advancing a continuous web of box shell material, means for producing parallel longitudinal slots in the shell web, means for adhesively coating and applying cover paper to substantially cover one surface of the advancing shell web with coated portions of the cover material overlying said slots, means for severing on longitudinal lines the cover material overlying said slots, and means for severing the continuous assembly transversely.

93. An automatic box machine comprising means for advancing a continuous web of box shell material, means for producing parallel longitudinal slots in the shell web, means for adhesively coating and applying cover paper to substantially cover one surface of the advancing shell web with coated portions of the cover material overlying said slots, means for severing on longitudinal lines the cover material overlying said slots, and means for severing the continuous assembly transversely.

94. An automatic box machine comprising means for advancing a continuous web of box shell material, means for producing longitudinal fold lines thereon, means for producing longitudinal slots in the shell substantially along said fold lines, means for producing central openings in the shell web connecting said slots, means for adhesively coating and applying cover paper to substantially cover one surface of the advancing shell web with coated portions of the cover material overlying said slots and central openings, means for severing on longitudinal cover lines the cover material overlying said slots, and means for severing the continuous assembly transversely, at least a portion of the severing cut intersecting substantially centrally one of said shell openings.

95. An automatic box machine comprising means for advancing a continuous web of box shell material, means for producing longitudinal fold lines thereon, means for producing longitudinal slots in the shell substantially along said fold lines, means for producing central openings in the shell web connecting said slots, means for adhesively coating and applying cover paper to substantially cover one surface of the advancing shell web with coated portions of the cover material overlying said slots and central openings, means for severing on longitudinal cover lines the cover material overlying said slots, means for severing the continuous assembly transversely, at least a portion of the severing cut intersecting substantially centrally one of said shell openings, and means for automatically folding and securing the successive blanks so produced in box form.

96. An automatic box machine comprising means for advancing a continuous web of box shell material, means for producing longitudinal parallel fold lines therein, means for producing beveled wing margin formations at intervals adjacent to the fold lines, means for advancing and adhesively securing cover material to substantially cover one surface of the shell web, means for producing transverse fold lines in the combined materials, means for producing longitudinal slits in the cover material, means for producing transverse cuts to sever the continuous assembly at regular intervals, and means for folding and securing the successive blanks so produced in box form.

97. An automatic box machine comprising means for advancing a continuous web of box shell material, means for producing longitudinal parallel fold lines therein, rotary skiving wheels and means for bringing the skiving wheels in contact with the advancing shell web at intervals to produce beveled wing margin formations therein, means for advancing and adhesively securing sheet cover material to one surface of the shell web, means for producing blank formations in the combined materials, means for severing the combined materials transversely at regular intervals, and means for automatically folding and securing the individual blanks so produced in box form.

98. A box blank making machine comprising means for producing a continuous blank assembly, means for severing the assembly to produce a succession of individual box blanks, and means for applying adhesive to certain areas of the blanks after the severing operation and while the blanks are advancing for folding operations.

99. A box making machine comprising means for producing a continuous assembly, means for severing the assembly to produce a succession of individual box blanks, means for applying adhesive to the advancing blanks after severing and during blank advance, and means for folding and securing the successive blanks in box form.

100. A box blank machine, comprising means for producing a continuous box blank assembly having blank end formations at intervals therein, means for severing the assembly transversely at regular intervals in generally central relation to the assembly blank end formations to produce individual blanks, means for advancing the individual blanks and means for applying adhesive to certain blank areas during such advance.

101. A box machine, comprising means for producing a continuous box blank assembly having blank end formations at intervals therein, means for severing the assembly transversely at regular intervals in generally central relation to the assembly blank end formations to produce individual blanks, means for folding the successive blanks in box form, means for advancing the successive blanks after severing to the folding means, and means acting during such advance to apply adhesive to certain areas of the blanks.

102. A box blank machine comprising means for advancing a continuous shell web and producing blank formations thereon, and adapted for interchangeable co-operation with cover material advancing and applying mechanisms arranged to co-operate with the web advancing and forming means, one of said mechanisms including means for advancing, adhesively conditioning and applying a continuous web of cover material, and the other mechanism comprising means for advancing and adhesively conditioning successive individual cover sheets and applying them to a surface of the shell web.

103. A box machine comprising means for advancing a continuous shell web and producing blank formations thereon, and adapted for interchangeable co-operation with cover material advancing and applying mechanisms arranged to co-operate with the web advancing, adhesively conditioning and applying a continuous web of cover material, and the other mechanism comprising means for advancing and adhesively conditioning successive individual cover sheet and applying them to a surface of the shell web to substantially continuously cover the same, means for producing additional blank formations on the combined shell and cover materials, and means for severing the combined materials transversely to produce individual blanks.

104. A box blank machine, comprising a plurality of pairs of rolls arranged to operate upon and advance sheet box forming materials to form a continuus blank assembly, means for driving the rolls of each pair at the same surface speed, rotary fold line producing instrumentalities arranged to operate upon certain of the materials, and means for independently driving said instrumentalities.

105. A box blank machine, comprising a plurality of pairs of rolls arranged to operate upon and advance sheet box forming materials in a substantially linear direction to form a continuous blank assembly, means comprising shafts and gearing for driving the rolls of each pair simultaneously at the same surface speed, a main driving element for said driving means, other rotary instrumentalities arranged to produce box blank formations upon certain of the materials, and means for independently driving said instrumentalities at relatively high speed.

106. A box blank machine, comprising a plurality of pairs of rolls arranged to operate upon and advance sheet box forming materials in a substantially linear direction to form a continuous blank assembly, means comprising shafts and gearing for driving the rolls of each pair simultaneously at the same surface speed, a main driving element for said driving means, rotary fold line producing instrumentalities arranged to operate upon certain of the assembly materials, and means for driving said instrumentalities at relatively high speed.

107. An automatic box making machine comprising means for producing a continuous composite blank assembly, means for severing the assembly transversely to produce individual box blanks, a plurality of folding mechanisms each including means for folding and securing successive blanks in box form, and means for advancing and distributing the individual blanks from the severing means to the different mechanisms.

108. An automatic box making machine comprising means for producing a continuous composite blank assembly, means for severing the assembly transversely to produce individual box blanks, a plurality of folding mechanisms each including means for folding and securing successive blanks in box form, means for advancing the blanks rapidly toward the folding mechanisms, and means for distributing the blanks to the different folding mechanisms.

109. An automatic box machine comprising means for producing a continuous composite blank, means for severing the continuous blank to produce individual box blanks, a plurality of automatic mechanisms for folding and securing successive blanks in box form, means for advancing the successive blanks from the severing means, and means for diverting individual blanks successively and in regular order to different ones of the folding mechanisms.

110. In box mechanism of the class described, means for producing a continuous blank assembly and severing it to form a succession of individual composite box blanks, a plurality of blank folding mechanisms adjacent the continuous assembly producing means, means for advancing the individual blanks rapidly from the point of severing toward the folding mechanism, and means for diverting the blanks alternately to the different folding mechanisms.

111. In box mechanism of the class described, means for producing a continuous blank assembly and severing it to form a succession of individual composite box blanks, a plurality of blank folding mechanisms adjacent the continuous assembly producing means, means for advancing the individual blanks rapidly from the point of severing toward the folding mechanism, means for diverting the blanks alternately to the different folding mechanisms, said diverting means comprising a blank pusher, means for moving it regularly to and fro, and means for receiving the successive blanks at a central position with regard to the pusher movements and for supporting and directing them to the respective folding mechanisms.

112. An automatic box machine comprising means for producing and advancing a continuous composite box form assembly in a substantially linear direction, means for severing the assembly transversely at regular intervals, a plurality of automatic folding mechanisms each comprising means for folding and securing successive blanks in box form, means for advancing the successive blanks at accelerated speed and substantially in line with the assembly advance to an initial position in relation to the folding mechanisms, and means for diverting the successive blanks laterally and in regular order to different ones of the folding mechanisms.

113. In a box producing machine, folding mechanism comprising means for folding blank side wings beyond normal box position, means for restoring the said wings to normal box position, and means for folding and securing blank end portions to complete the box formation.

114. Box-forming or folding mechanism comprising means for folding blank side wings beyond normal box position, means for restoring the said wings to normal position, and means for folding and securing blank end portions to complete the box formation.

115. In a box producing machine, folding mechanism comprising means for breaking down and folding blank side wings inward to positions beyond the normal box position of the wings, means for restoring the side wings to normal position, and means for folding and securing blank end portions to complete the box formation.

116. In a box producing machine, folding mechanism comprising means for breaking down and folding blank side wings inward to positions beyond the normal box position of the wings, means for squeezing and setting the fold formations thus produced, means for restoring the side wings to normal position, and means for folding and securing blank end portions to complete the box formation.

117. In a box producing machine, folding mechanism comprising means for breaking down and folding blank side wings inward to positions beyond the normal box position of the wings, means for squeezing and setting the fold formations thus produced and simultaneously advancing the blank, means for restoring the side wings to normal position, and means for folding and securing blank end portions to complete the box formation.

118. In box producing machines of the class described, folding mechanism comprising a stationary folding head, means for positioning box blanks successively on the head, side wing folders arranged to swing down and forward and bend blank side wings down and inward against convergent faces of the head, and means for folding and securing blank end portions to complete the box formation.

119. In box producing machines of the class described, folding mechanism comprising a stationary folding head, side wing folders arranged to swing down and forward and bend blank side wings down and inward against convergent faces of the head and simultaneously forward the blank, means for squeezing and setting the fold formations thus produced, and means for folding and securing blank end portions to complete the box formation.

120. In box producing machines of the class described, folding mechanism comprising a stationary folding head, means for positioning box blanks successively on the head, side wing folders arranged to swing down and forward and bend blank side wings down and inward against convergent faces of the head and simultaneously forward the blank, means for squeezing and setting the fold formations thus produced and simultaneously advancing the blank, and means for folding and securing blank end portions to complete the box formation.

121. In box producing machines of the class described, folding mechanism comprising means for folding box blank side wings and advancing the blanks, a stationary folding former, means for positioning partly folded blanks upon the former, and blank end folding mechanism comprising means for folding down blank end wings, turning in and securing blank end wing extensions, removing the formed box from the former, and means for inturning blank corner laps prior to the end wing folding action.

122. In box producing machines of the class described, folding mechanism comprising means for folding box blank side wings, means for advancing the blanks, a folding former, means for positioning the partly folded blanks upon the former, blank end folding mechanisms, comprising means for folding down blank end wings, turning in and securing blank end wing extensions, removing the formed box from the former, and inturning blank corner laps prior to the end wing folding action, means for moving said mechanisms up and down adjacent the former ends, and means for moving said mechanisms toward and from the former ends.

123. In box machinery of the class described, folding mechanism comprising a stationary folding former, means for positioning successive blanks thereon, and folding means co-operating with the former to turn in blank corner laps and turn down other opposite blank wings and also acting to turn in and secure projecting wing margins.

124. In box machinery of the class described, folding mechanism comprising a stationary folding former, means for positioning successive blanks thereon, folding means cooperating with the former to turn in blank corner laps and turn down other opposite blank wings and also acting to turn in and secure projecting wing margins, and means for removing the box from the former.

125. In box machinery of the class described, folding mechanism comprising a stationary folding former, means for positioning successive blanks thereon, folding means cooperating with the former to turn in blank corner laps and turn down other opposite blank wings, said folding means being constructed and arranged to then strip the formed box from the former.

126. In box machinery of the class described, folding mechanism comprising a folding shoe, means for positioning successive composite blanks thereon, means for folding opposite blank wings down and inwardly upon the shoe and simultaneously advancing the blank, a straightening shoe to restore said wings to substantially right-angle relation to the blank body section, an end-folding former, means for positioning successive blanks thereon, and folding means co-operating with the former to turn in blank corner laps and turn down other opposite blank wings and also acting to turn in and secure projecting wing margins.

127. In box machinery of the class described, folding mechanism comprising a folding shoe, means for positioning successive composite blanks thereon, means for folding opposite blank wings down and inwardly upon the shoe and simultaneously advancing the blank, a straightening shoe to restore said wings to substantially right-angle relation to the blank body section, an end-folding former, means for positioning successive blanks thereon, folding means co-operating with the former to turn in blank corner laps and turn down other opposite blank wings and also acting to turn in and secure projecting wing margins, and means for removing the box from the former.

128. In box machinery of the class described, folding mechanism comprising a folding shoe, means for positioning successive composite blanks thereon, means for folding opposite blank wings down and inwardly upon the shoe and simultaneously advancing the blank, a straightening shoe to restore said wings to substantially right-angle relation to the blank body section, an end-folding former, means for positioning successive blanks thereon, folding means co-operating with the former to turn in blank corner laps and turn down other opposite blank wings and also acting to turn in and secure projecting wing margins, said folding means being constructed and arranged to then strip the formed box from the former.

129. Box folding and forming mechanism designed for co-operation with blanks advanced substantially in the plane of the blank body section, comprising a substantially stationary former arranged to receive the blank with its side wings turned down alongside the former and its body section located above the former, corner lap turners normally out of the path of blank advance and acting after the blank is positioned to turn in the corner laps, and end wing folding instrumentalities arranged for reciprocation nearly in plane of the former ends and also for movement toward and from the former ends and including means for turning down blank end wings, turning in end wing extensions and stripping the formed blank from the former.

130. Box folding and forming mechanism designed for co-operation with blanks advanced substantially in the plane of the blank body section, comprising a substantially stationary former arranged to receive the blank with its side wings turned down alongside the former and its body section located above the former, corner lap turners normally out of the path of blank advance and acting after the blank is positioned to turn in the corner laps, and end wing folding instrumentalities arranged for reciprocation nearly in plane of the former ends and also for movement toward and from the former ends and including means for turning down blank end wings, turning in end wing extensions and squeezing them against inner faces of the box end structure, and stripping the formed blank from the former.

131. Box forming mechanism comprising a former having a flat end face to locate and press a box end formation and also having a folding recess adjacent said face, a movable folding unit comprising a member to engage a box blank body portion and move the blank in relation to the former, a face arranged to press the blank end structure against the former face, means for moving the unit in a plane close to the plane of the former face, and means for moving the unit toward and from the former face.

132. Box forming mechanism comprising a former having a flat end face to locate and press a box end formation and also having a folding recess adjacent said face, a movable folding unit comprising a member to engage a box blank body portion and move the blank in relation to the former, a face arranged to press the blank end structure against the former face, a stripping element to engage the edge of the box end structure and strip the formed box from the former, means for moving the unit in a plane close to the plane of the former face, and means for moving the unit toward and from the former face.

133. Box forming mechanism comprising a former having a flat end face to locate and press a box end formation and also having a folding recess adjacent said face, a movable folding unit comprising a member to engage a box blank body portion and move the blank in relation to the former, a face arranged to press the blank end structure against the former face, an independently-movable member for turning a blank end wing extension into the former recess and thereafter further bending the extension and pressing it against an inner face of the blank end structure, means for moving the unit in a plane close to the plane of the former face, and means for moving the unit toward and from the former face.

134. A box blank folding unit designed for cooperation with a forming head and comprising supports on which the unit is moved substantially in the plane of the former ends and also toward and from said ends, a main folding member having a pressing face, and a relatively movable member designed to turn blank wing extensions inward and then relatively upward and press them against an inner face of the blank end structure in cooperation with said pressing face.

135. A box blank machine comprising rotary grinders, means for advancing a sheet of box material in contact with the grinders to produce fold formations in the sheet, and cutters for producing additional box blank formations in the sheet.

136. A box machine comprising rotary grinders, means for advancing a sheet of box material in contact with the grinders to produce fold formations in the sheet, guiding and pressing devices for applying cover material on one surface of the sheet, and cutters for producing box blank formations in the combined materials.

137. A box blank machine comprising means for advancing sheet box material, means for cutting the material to form slots which separate wing formations of a blank, means for applying sheet cover material to one surface of the first named sheet box material, and means for longitudinally slitting the cover material between the edges of said slots to provide for wing separation in the composite blank.

138. A box blank machine comprising means for advancing a continuous web of shell material, means for cutting the web to form relatively narrow slots which separate wing formations of individual blanks to be produced, means for advancing and affixing sheet cover material to one surface of the web and overlying said slots, means for slitting the cover material between edges of said slots to provide for blank wing separation, and means for severing the continuous assembly so produced at intervals to form individual composite blanks.

139. A box blank machine comprising means for advancing a sheet of box material, means for perforating the material to define the ends of slots, and means for cutting the material to complete the slots.

140. A box blank machine comprising means for advancing a sheet of box material, means for perforating the material to define the ends of slots, means for cutting the material to complete the slots, and means for producing blank wing formations in the material, said wing formations including the slots as parts thereof.

141. A box blank machine comprising means for advancing a continuous web of box material, means for perforating the material to define the ends of slots, means for slitting the material on lines meeting the perforations to complete the slots, and means for severing individual blanks from the web.

142. A box blank machine comprising means for advancing a web of box material, means for perforating the material to define the ends of slots, means for slitting the material to furnish the sides of said slots, means for operating upon the material to produce box blank end formations, and means for severing the individual blanks from the thus-formed material.

143. A box blank machine comprising means for advancing a web of box material, means for perforating the material to define the ends of slots, means for slitting the material to furnish the sides of said slots, means for applying sheet covering material to one face of the web, means for operating upon the assembly so produced to provide blank wing formations, and means for severing the continuous assembly at intervals to produce individual blanks.

144. A box blank machine comprising means for advancing sheet box material, means for perforating the material to define the ends of slots to be formed, means for slitting the material on substantially parallel lines intersecting the perforations to produce said slots, and means for removing from the sheet material produced in the formation of the slots.

145. A box blank machine comprising means for advancing a continuous web of shell material, means for perforating the web to define the ends of slots, means for slitting the web longitudinally on adjacent lines meeting the perforations to complete the slots, means for removing from the web strips produced in the formation of the slots, and means for severing the web transversely to produce individual blanks.

146. A box blank machine comprising means for advancing sheet box material, and means for producing beveled formations at intervals thereon.

147. A box blank machine comprising means for advancing a web of box material, means for producing beveled formations at intervals thereon, and cutting means for producing wing formations adjacent said beveled formations.

148. A box blank machine comprising means for advancing a continuous web of shell material, means for producing beveled formations at intervals thereon, and means for severing the web transversely at intervals to produce individual blanks.

149. A box blank machine comprising means for advancing a continuous web of shell material, means for producing beveled formations at intervals thereon, means for producing blank wing formations adjacent the beveled formations, and means for severing the web transversely at intervals to produce individual blanks.

150. A box blank machine comprising means for advancing sheet box material, means for removing substantial portions of the sheet material at one face thereof to produce spaced areas of reduced thickness, and means for producing blank wing formations adjacent said areas.

151. A box blank machine comprising means for advancing a continuous shell web, means for skiving one surface of the web in spaced zones to provide web areas of reduced thickness, means for producing blank wing formations in the web adjacent said areas, and means for severing the web transversely at intervals to produce individual blanks.

152. A box or box blank machine comprising means for advancing box material, skiving and abutment members arranged for contact with opposite faces of the material, and means operating at intervals to move the skiving and abutment members relatively into effective engagement with the material.

153. A machine for producing box blanks and the like, comprising means for advancing a continuous web of box material, a label holder, and coordinated means for operating the label holder with relation to the web advancing means to apply individual labels successively to a surface of the web.

154. A machine for producing box blanks and the like, comprising means for advancing a continuous web of box material, a label holder, coordinated means for operating the label holder with relation to the web advancing means to apply individual labels successively to surface of the web in definite positions with respect to individual blanks to be produced, and means for severing the assembled materials transversely at blank intervals.

155. A machine for producing box blanks and the like, comprising a label stack holder mounted for to-and-fro movement, means for advancing a continuous web of box material, means for directing the web in proximity to an end label of the stack supported in the holder, and means for operating the holder in conjunction with the web advancing means to apply successive individual labels to the web.

156. A machine for producing box blanks and the like, comprising a label stack holder mounted for to-and-fro movement, means for advancing a continuous web of box material, means for directing the web in proximity to an end label of the stack supported in the holder, means for adhesively conditioning the web anterior to the point of label application, and means for operating the holder in conjunction with the web advancing means to apply successive individual labels to the web.

157. A box or box blank machine comprising means for advancing a continuous shell web, means for advancing sheet cover material and securing it to one face of the shell web, means at a point anterior to its contact with the shell web for embossing the cover material, and means for severing the assembly transversely at intervals to produce individual blanks.

158. A box machine comprising means for producing a continuous blank assembly, means for severing the assembly transversely to produce individual blanks, a plurality of forming mechanisms each including means for operating upon successive blanks, and means for advancing and distributing the individual blanks to the different forming mechanisms.

159. In a box producing machine, folding mechanism comprising means for folding blank portions beyond normal box position, means for restoring said portions to normal position, and means for securing the portions to complete the box formation.

160. In a box producing machine, mechanism for folding box blank portions, means for advancing the blanks by contact with the folded portions, and means for setting the fold formations thus produced during the advance of the blanks.

161. In box producing mechanism of the class described, folding mechanism comprising a relatively stationary former, means for positioning blanks successively with relation to the former, and swinging wing folders arranged to bend blank wings downward and inward against the former.

162. In box producing mechanism of the class described, folding mechanism comprising a former, means for positioning blanks successively with relation to the former, and wing folders arranged to swing inward and forward to bend blank wings downward and inward against the former and simultaneously forward the blanks.

163. In box producing mechanism of the class described, folding mechanism comprising a former, means for positioning blanks successively with relation to the former, wing folders arranged to swing inward and forward to bend blank wings downward and inward against the former, and means acting thereafter to fold and secure the blank in box form.

164. Blank folding mechanism comprising means for advancing a blank and during advance folding side wing formations thereof beyond final position, means acting during further advance of the blank to restore said wing formations to normal position, and subsequently acting mechanism for folding and securing blank end wing formations.

165. Blank folding mechanism comprising means for advancing a blank and folding side wing formations thereof, subsequently acting means for setting the creases at intersections of the blank body and side wings, and subsequently acting means for folding and securing blank end wing formations in position.

166. Blank folding mechanism comprising a side wing former, means for advancing a blank over the former and bending its side wings by co-operation with the former, a straightening former, means for advancing the blank over the straightening former and thereon positioning the side wings, end folding mechanism, means for advancing the blank from the straightening former to the end folding mechanism, and means included in the end folding mechanism for folding and securing the blank end formations.

167. Blank folding mechanism comprising a side wing former, means for advancing a blank over the former and bending its side wings by co-operation with the former, a straightening former, means for advancing the blank over the straightening former and thereon positioning the side wings, end folding mechanism, means for advancing the blank from the straightening former to the end folding mechanism, and means included in the end folding mechanism for inturning blank corner laps and turning and securing blank end wings thereto.

168. In a box-producing machine, a blank-supporting former, a folding head co-operating therewith, and means for imparting successive relative movements to the former and head to first fold wings of a blank over the former and thereafter to fold in wing-extensions.

169. In a box-producing machine, a blank-supporting former, a folding head movable in co-operation therewith, means for folding the corner-laps of a blank against the former, means for imparting movement to the head longitudinally of the former to fold the end-wings of the blank against the outside of the corner-laps, and means for moving the head transversely and longitudinally of the former to fold the end-wing-extensions upon the insides of the corner-laps.

170. In a box-folding machine, means comprising oppositely disposed wings reciprocatorily movable longitudinally of the machine for engaging and folding the stock.

171. A box-folding machine including, in combination, means comprising oppositely disposed swingably and reciprocatorily movable wings for engaging and folding the stock, and means for feeding the stock to the folding-wings.

Signed at New York city, in the county of New York and State of New York, this 14th day of Decbr., A. D. 1923.

HARRY BRIDGMAN SMITH.